US012749896B2

(12) United States Patent
Kobayashi

(10) Patent No.: US 12,749,896 B2
(45) Date of Patent: Sep. 29, 2026

(54) RENEWABLE ENERGY SUPPLY SYSTEM, FLOATING OFFSHORE SOLAR POWER GENERATING PLANT, AND RENEWABLE ENERGY SUPPLY METHOD

(71) Applicant: Hiroshi Kobayashi, Tokyo (JP)

(72) Inventor: Hiroshi Kobayashi, Tokyo (JP)

( * ) Notice: Subject to any disclaimer, the term of this patent is extended or adjusted under 35 U.S.C. 154(b) by 295 days.

(21) Appl. No.: 18/576,911

(22) PCT Filed: Jul. 9, 2021

(86) PCT No.: PCT/JP2021/026006
§ 371 (c)(1),
(2) Date: Aug. 2, 2024

(87) PCT Pub. No.: WO2023/281748
PCT Pub. Date: Jan. 12, 2023

(65) Prior Publication Data
US 2025/0273961 A1 Aug. 28, 2025

(51) Int. Cl.
*H02J 3/28* (2026.01)
*H02J 15/00* (2026.01)
(Continued)

(52) U.S. Cl.
CPC ................ *H02J 3/28* (2013.01); *H02J 15/50* (2026.01); *H02J 2101/24* (2026.01); *H02J 2101/28* (2026.01); *H02J 2105/31* (2026.01)

(58) Field of Classification Search
CPC ........ H02J 3/28; H02J 15/008; H02J 2300/24; H02J 15/00; H02J 2101/24
(Continued)

(56) References Cited

U.S. PATENT DOCUMENTS

2016/0264221 A1* 9/2016 Barnes ...................... B63C 1/02

FOREIGN PATENT DOCUMENTS

JP H06136896 A 5/1994
JP 2001059472 A * 3/2001
(Continued)

OTHER PUBLICATIONS

International Search Report and Written Opinion received for PCT/JP2021/026006, mailed Sep. 21, 2021.
(Continued)

*Primary Examiner* — Daniel Kessie
*Assistant Examiner* — Dru M Parries
(74) *Attorney, Agent, or Firm* — Greer, Burns & Crain, Ltd

(57) ABSTRACT

A carbon-free energy supply system generates hydrogen from electricity generated by a floating offshore photovoltaic power generation plant, synthesizes energy carriers using the hydrogen as a raw material, stores the energy carriers, converts the energy carriers into a predetermined energy form to supply the energy to each of the supply destination facilities. The floating offshore plant is composed of multiple photovoltaic panels, each of which is substantially hexagonal in plan view, by connecting the photovoltaic panels in a honeycomb structure in plan view. Each photovoltaic panel functions as a floating body, panel housings of the adjacent photovoltaic panels are capable of swinging relative to each other in a vertical direction, and each photovoltaic panel can be submerged and floated to a predetermined depth by pouring water into and draining water from the panel housing.

14 Claims, 29 Drawing Sheets

(51) Int. Cl.
*H02J 15/50* (2026.01)
*H02J 101/24* (2026.01)
*H02J 101/28* (2026.01)
*H02J 105/30* (2026.01)

(58) Field of Classification Search
USPC .......................................................... 307/43
See application file for complete search history.

(56) References Cited

FOREIGN PATENT DOCUMENTS

| | | | | |
|---|---|---|---|---|
| JP | 2003072675 | A | * | 3/2003 |
| JP | 2012094363 | A | | 5/2012 |
| JP | 5754029 | B2 | | 7/2015 |
| JP | 2016150890 | A | | 8/2016 |
| JP | 6683480 | B2 | | 4/2020 |
| JP | 2020058168 | A | | 4/2020 |
| JP | 6737610 | B2 | | 8/2020 |
| JP | 6780838 | B2 | | 11/2020 |
| JP | 6896264 | B2 | | 6/2021 |

OTHER PUBLICATIONS

Kirezci, E., et al., “Projections of global-scale extreme sea levels and resulting episodic coastal flooding over the 21st Century,” Nature, Scientific Reports 10, No. 11629, 2020, 12 pages.

Randers, J., et al., “An earth system model shows self-sustained thawing of permafrost even if all man-made GHG emissions stop in 2020,” Nature, Scientific Reports 10, No. 18456, 2020, 9 pages.

Snider, E., et al., “Room temperature superconductivity in a carbonaceous sulfur hydride” Nature, News, 586, 349, 2020, 26 pages.

* cited by examiner

[FIG. 1A]
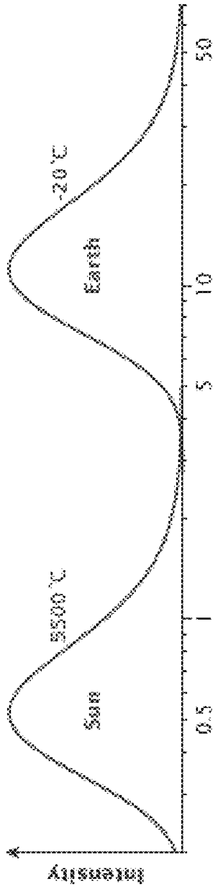
(Source: Climate and Earth's Energy Budget, NASA, 2020)
[FIG. 1B]
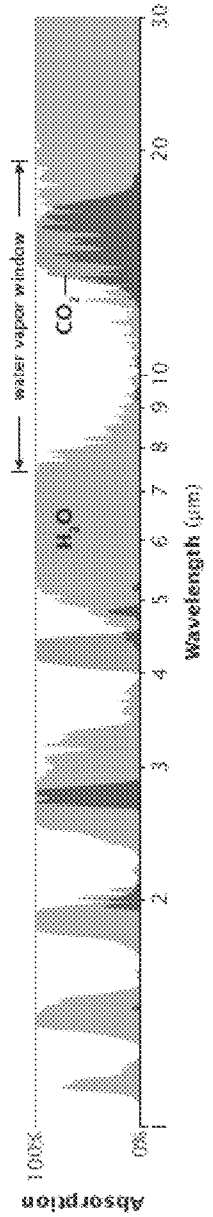
(Source: Climate and Earth's Energy Budget, NASA, 2020)

[FIG. 2A]
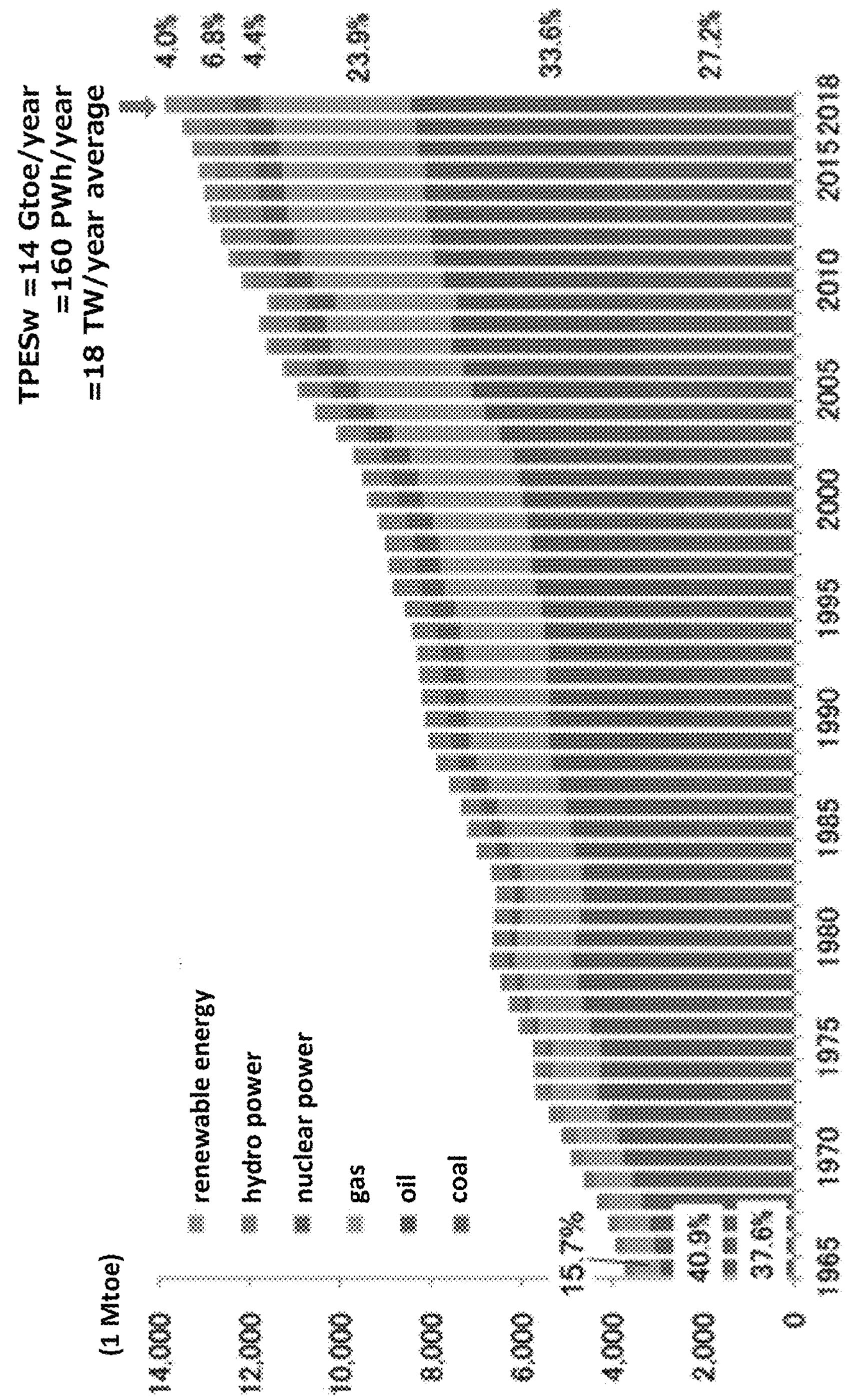
(Source: Energy White Paper 2019)

[FIG. 2B]
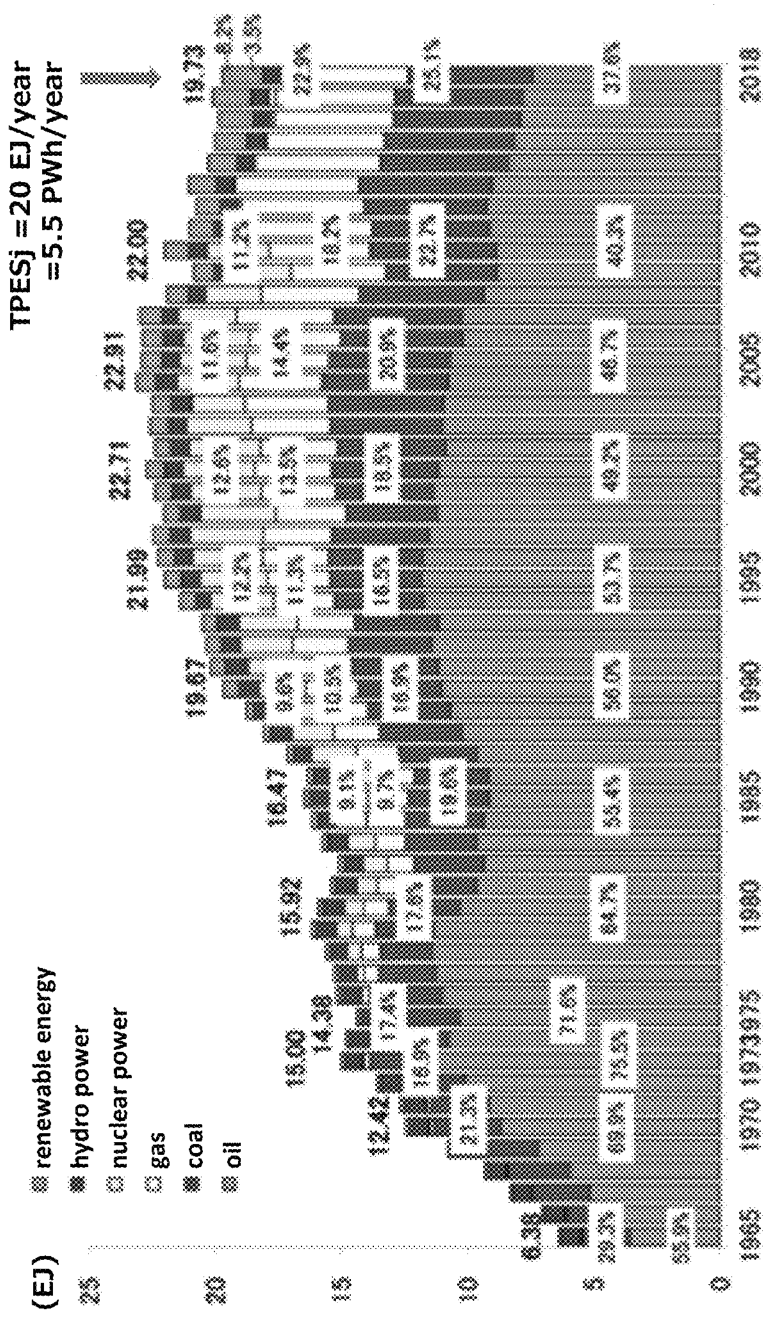
(Source: Energy White Paper 2019)

[FIG. 3]

| Type of energy | | Introduction potential | Generated power by scenario | |
|---|---|---|---|---|
| | | Generated power | Purchase Price | Generated power |
| Solar power | Residential, etc. | (Capacity)<br>(Generated power)<br>(Efficiency)<br>210 GW<br>253 TWh/year<br>13.8% | 【Residential, etc.】<br>① 22 yen/kWh×20 years<br>② 24 yen/kWh×20 years<br>③ 26 yen/kWh×20 years<br>【Industrial】<br>① 12 yen/kWh×20 years<br>② 14 yen/kWh×20 years<br>③ 16 yen/kWh×20 years | ① 47 TWh/year<br>② 86 TWh/year<br>③ 137 TWh/year |
| | Public sector, etc. | 2.54 TW<br>2.97 PWh/year<br>13.4% | ① 12 yen/kWh×20 years<br>② 14 yen/kWh×20 years<br>③ 16 yen/kWh×20 years | ① 0.2 TWh/year<br>② 26 TWh/year<br>③ 367 TWh/year |
| Wind power | Onshore | 285 GW<br>686 TWh/year<br>11.5% | ① 17 yen/kWh×20 years<br>② 18 yen/kWh×20 years<br>③ 19 yen/kWh×20 years | ① 351 TWh/year<br>② 406 TWh/year<br>③ 454 TWh/year |
| | Offshore | 1.12 TW<br>3.46 PWh/year<br>35.3% | ① 32 yen/kWh×20 years<br>② 34 yen/kWh×20 years<br>③ 36 yen/kWh×20 years | ① 617 TWh/year<br>② 1,001 TWh/year<br>③ 1,558 TWh/year |
| ΣIntroduction potential /*TPESj* | | 134% | Σ①(solar+wind)/*TPESj*<br>Σ②(solar+wind)/*TPESj*<br>Σ③(solar+wind)/*TPESj* | 18%<br>29%<br>46% |

[FIG. 4]
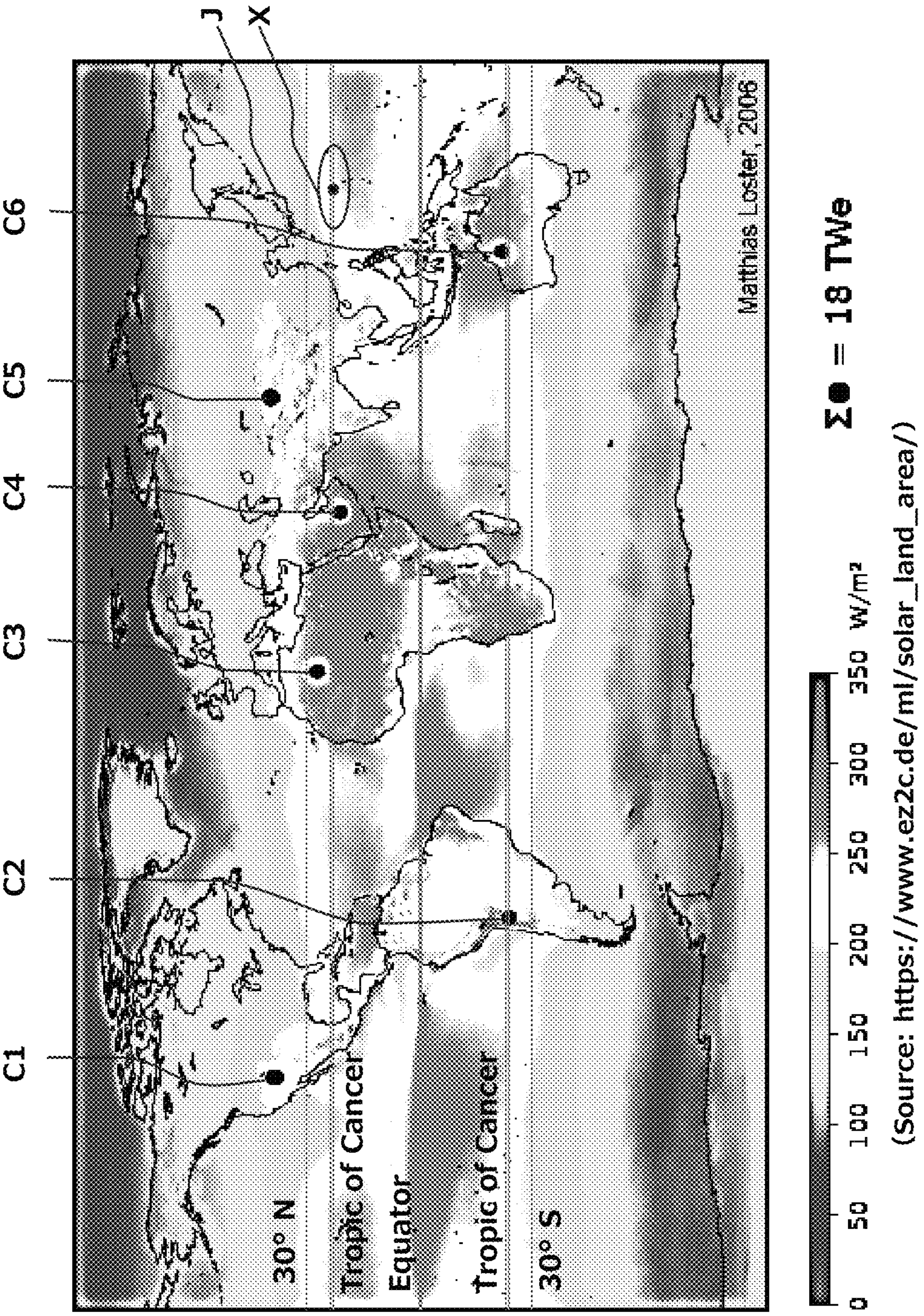

[FIG. 5]
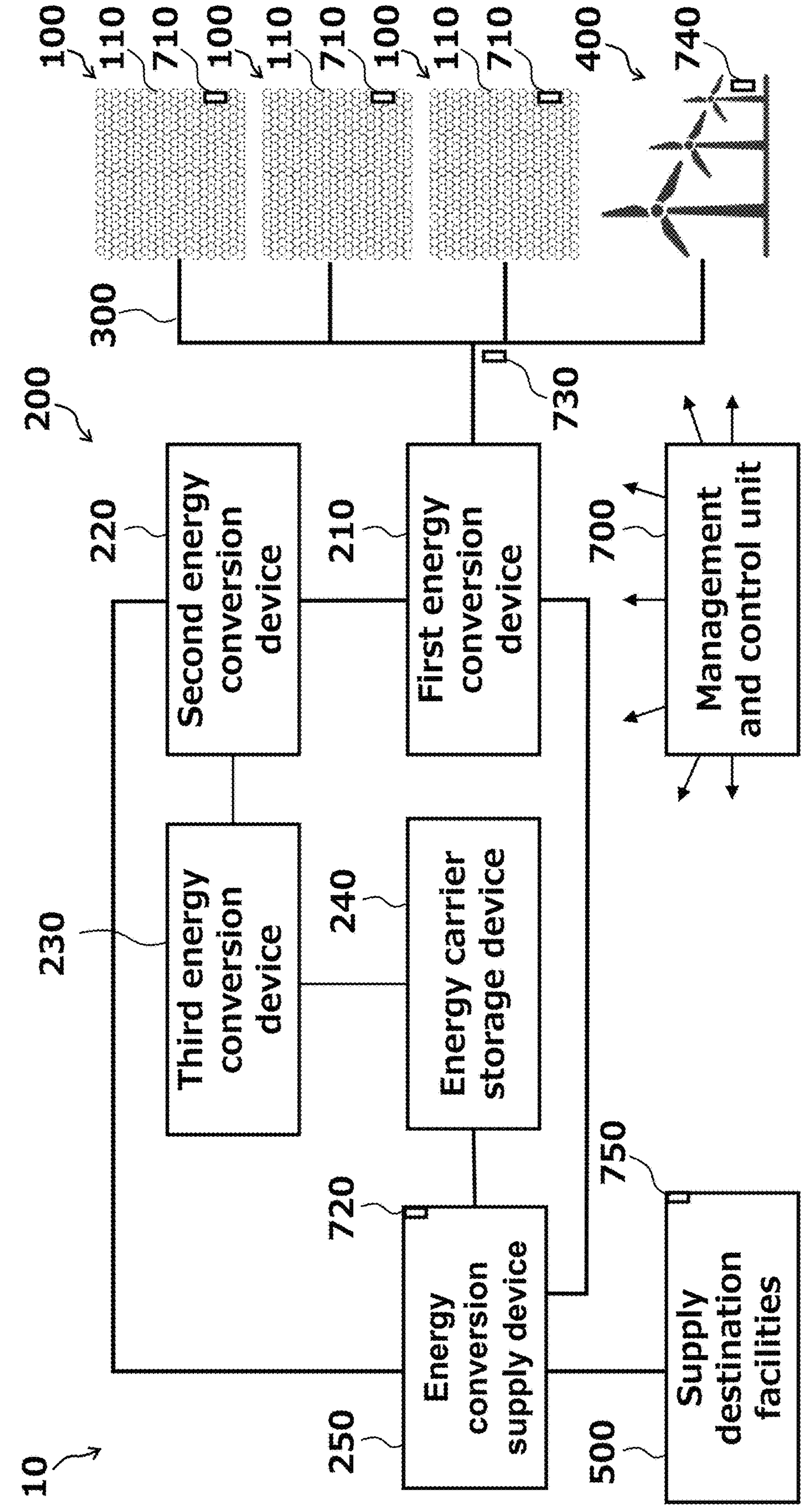

[FIG. 6]

| Energy carriers | Volumetric energy density | Mass energy density | Storage conditions | Long-term storage | Remarks |
|---|---|---|---|---|---|
| High pressure hydrogen gas ($H_2$) | △ 1,200 Wh/L | ◎ 32,900 Wh/kg | △ 70MPa | △ | △ Highly flammable, explosive |
| Liquid hydrogen ($LH_2$) | ○ 2,330 Wh/L | ◎ 32,900 Wh/kg | × −253°C | × | △ Highly flammable, explosive |
| Fuel liquefied ammonia ($LNH_3$) | ○ 3,960 Wh/L | ○ 5,810 Wh/kg | ◎ Room temp., 0.86MPa | ◎ | △ Acute toxicity, ○ Many achievements |
| Methylcyclohexane (MCH) | △ 1,550 Wh/L | △ 2,010 Wh/kg | ◎ Room temperature | ○ | ○ Flammability comparable to gasoline |
| (ref.) Li-ion secondary battery | × 520 Wh/L | × 201 Wh/kg | ◎ Room temperature | × | × Lithium is a rare metal and expensive |

Legend
◎: Quite suitable
○: Suitable
△: Minimally adequate
×: Not suitable

[FIG. 7]
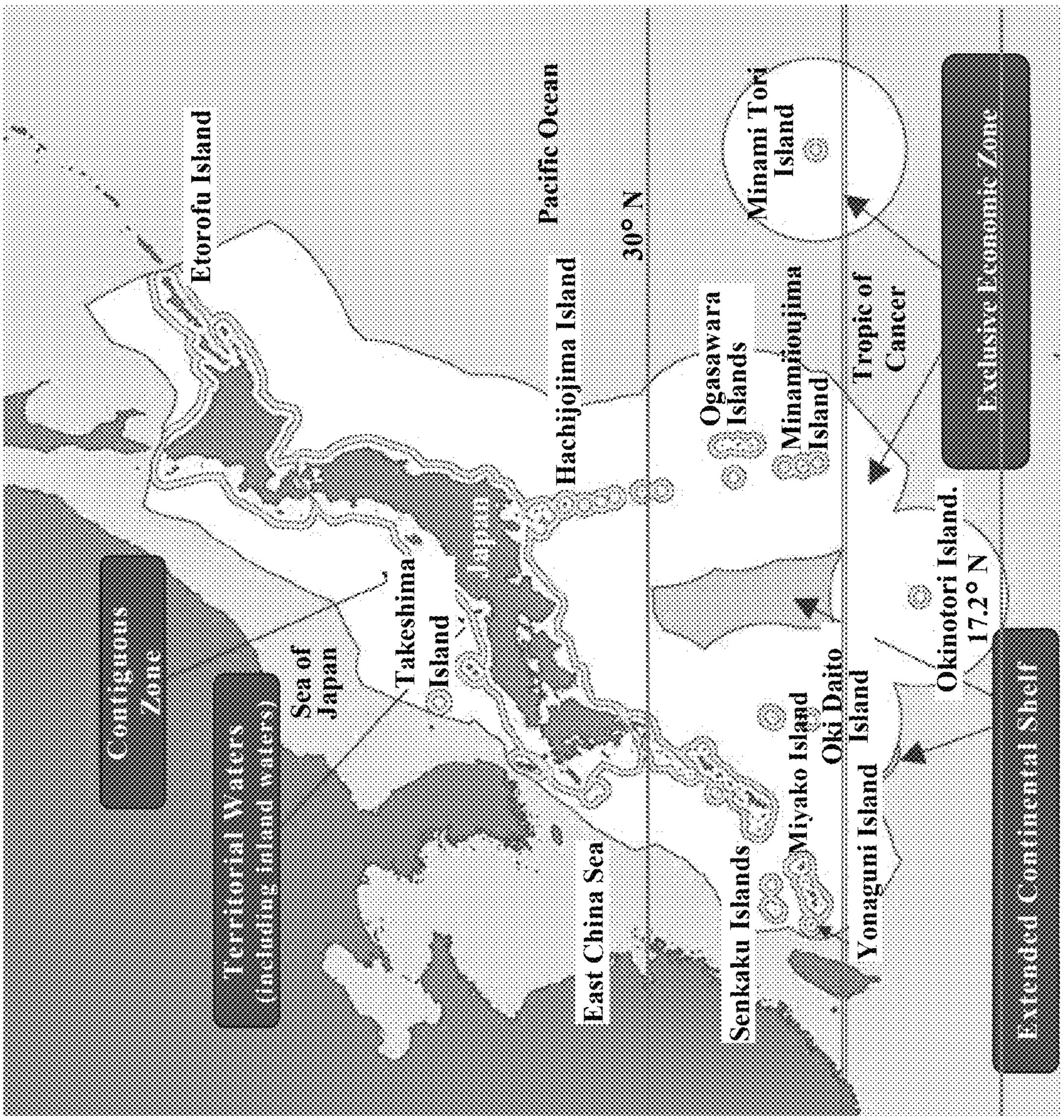
Source: Japan Coast Guard, Conceptual Diagram of Japan's Territorial Waters

[FIG. 8]

| Names of islands | Latitude(° ) | Longitude(° ) | Annual hours of sunshine(h) | Percentage of sunshine hours |
|---|---|---|---|---|
| Ishigaki Island | 24.3 | 124.2 | 1849.5 | 21.1% |
| Minamitori Island | 24.3 | 153.9 | 2805.3 | 32.0% |
| Minamidaito Island | 25.8 | 131.2 | 2123.5 | 24.2% |
| Chichijima Island | 27.1 | 142.2 | 2038.4 | 23.3% |
| Japan Average | | | 1850 | 21.1% |

[FIG. 9]

| | |
|---|---|
| FOPV structure | Three-layer honeycomb structure |
| Solar panel shape | Hexagonal shape with 3m per side |
| Solar panel area | $23.4m^2$ |
| Solar panel thickness | 60 cm |
| Number of panels in small aggregate | 100 Solar panels |
| Medium aggregate capacity | 100 Small aggregates |
| Largr aggregate capacity | 100 Medium aggregates |
| Number of panels in FOPV | 1,000,000 Solar panels |
| Spacing between solar panels | 50 cm |
| FOPV area | 28.1 $km^2$ |
| Solar cell effective area of solar panel | 20.0 $m^2$ |
| Annual average global solar radiation | 240 $W/m^2$ |
| Annual average solar energy | 5.99 $kWh/(m^2 \cdot day)$ |
| Solar module conversion efficiency | 16.0% |
| Solar panel nominal maximum output | 3.20 kW |
| Solar panel DC output voltage | 52.1 V |
| Solar panel maximum output current | 61.4 A |
| Small aggregate maximum output power | 320 kW |
| Small aggregate maximum output voltage | ±2.60 kV |
| Small aggregate maximum output current | 61.4 A |
| Medium aggregate maximum output power | 30.7 MW |
| Medium aggregate maximum output voltage | ±250 kV |
| Medium aggregate maximum output current | 61.4 A |
| Large aggregate maximum output power | 3.07 GW |
| Large aggregate maximum output voltage | ±250 kV |
| Large aggregate maximum output current | 6.14 kA |
| Loss coefficient | 0.85 |
| FOPV annual average power generation | 652 MW/plant |
| FOPV annual power generation capacity | 5.71 TWh/plant |
| Number of FOPVs for TPESj (5.3PWh) | 963 plants |
| Total area for TPESj | 27,100 $km^2$ |

[FIG. 10A]
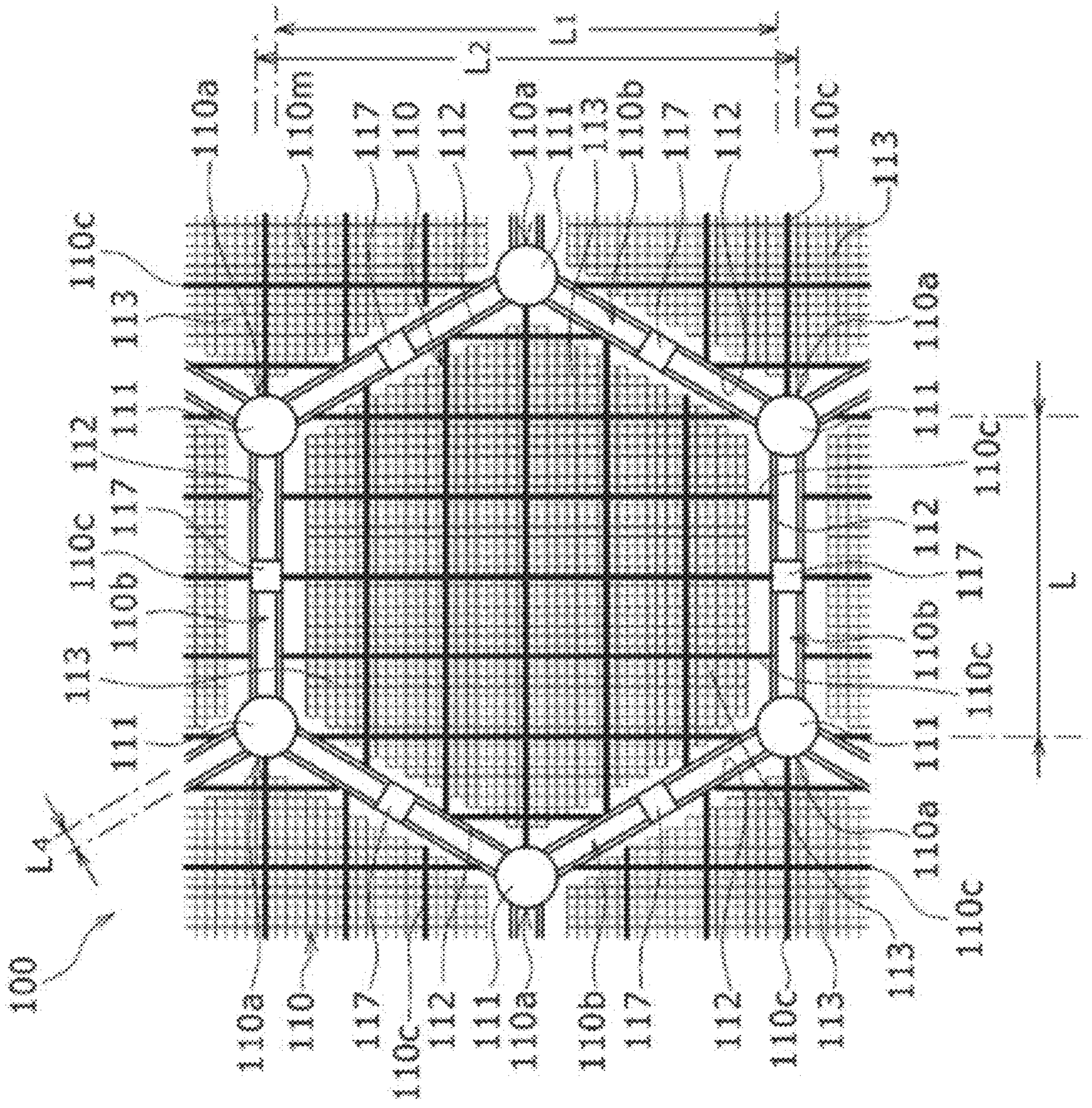

[FIG. 10B]
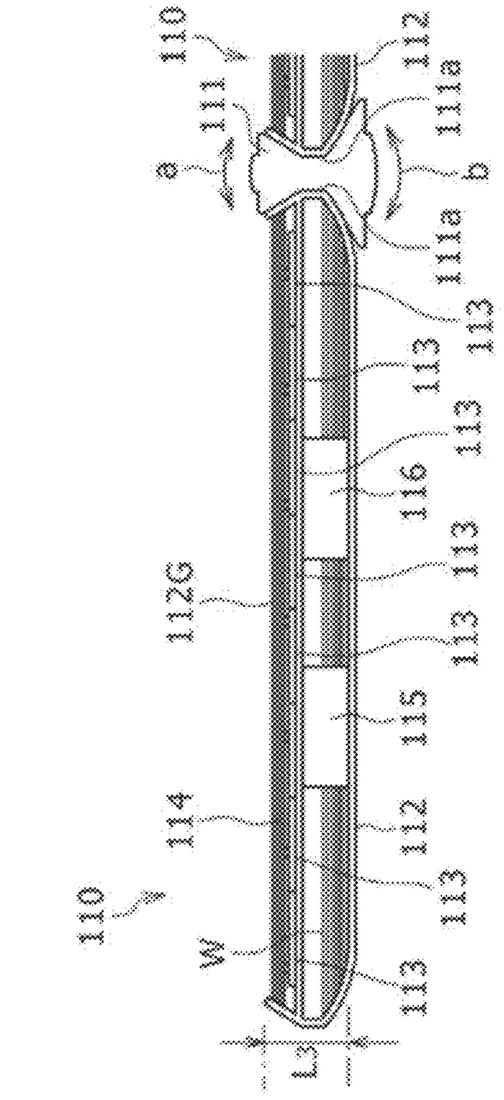

[FIG. 11A]
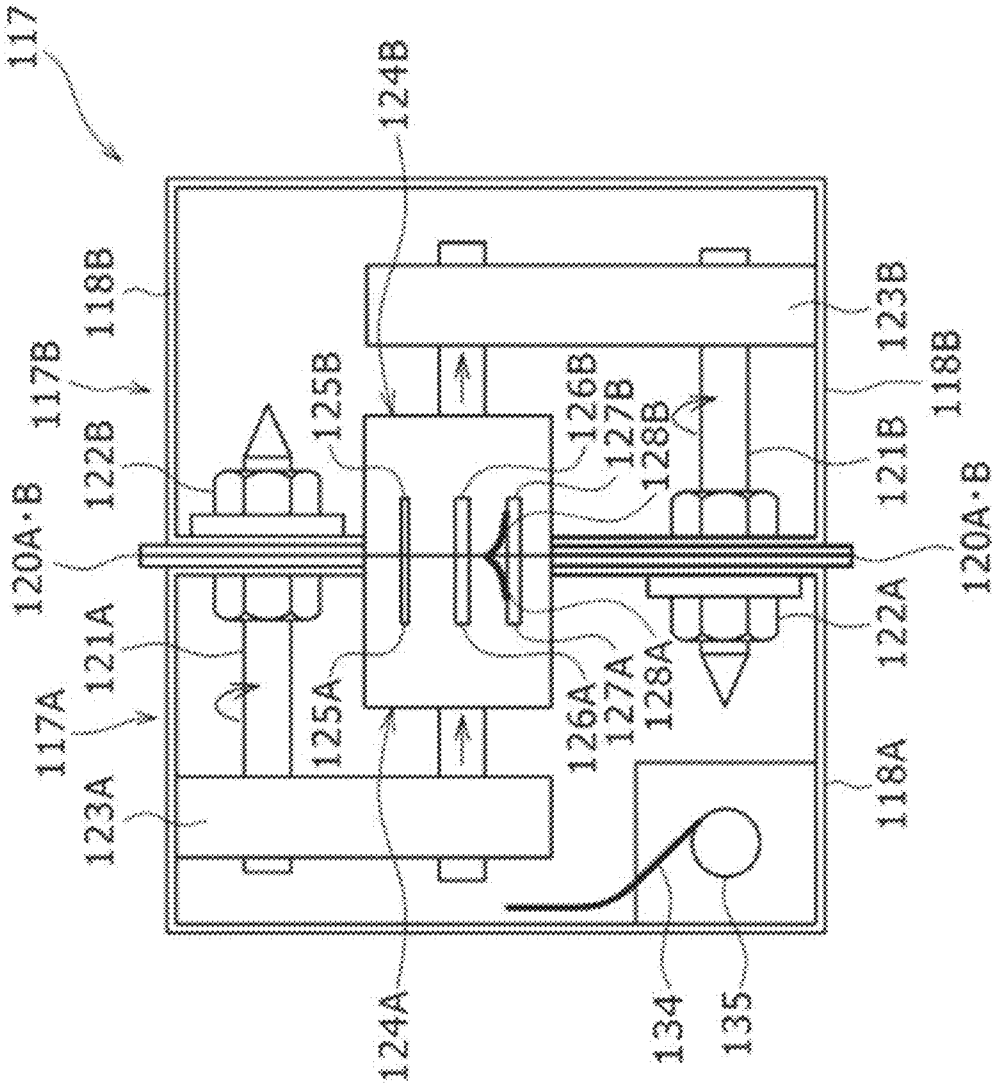

[FIG. 11B]
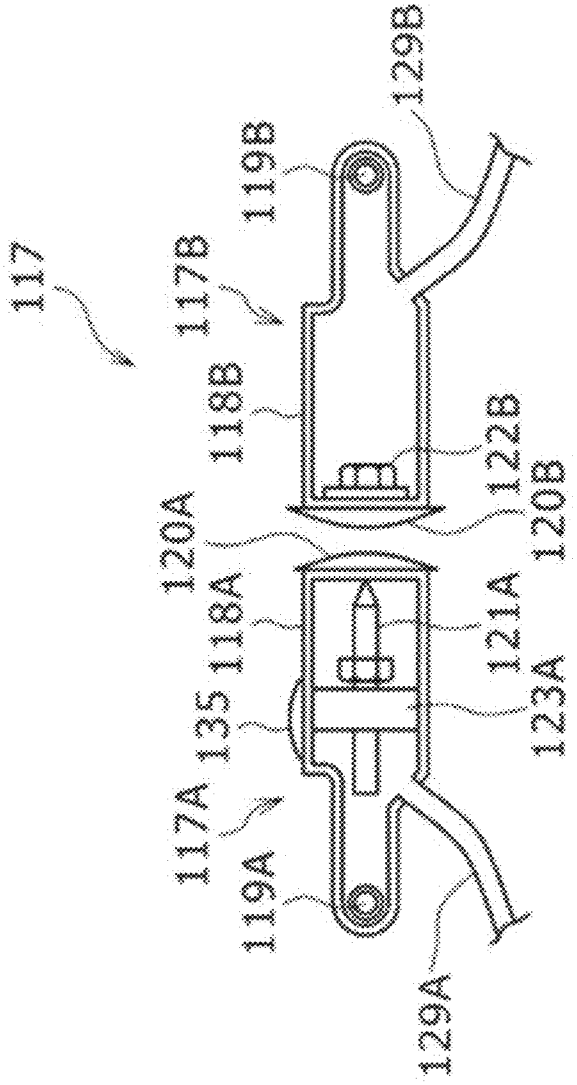

[FIG. 12A]
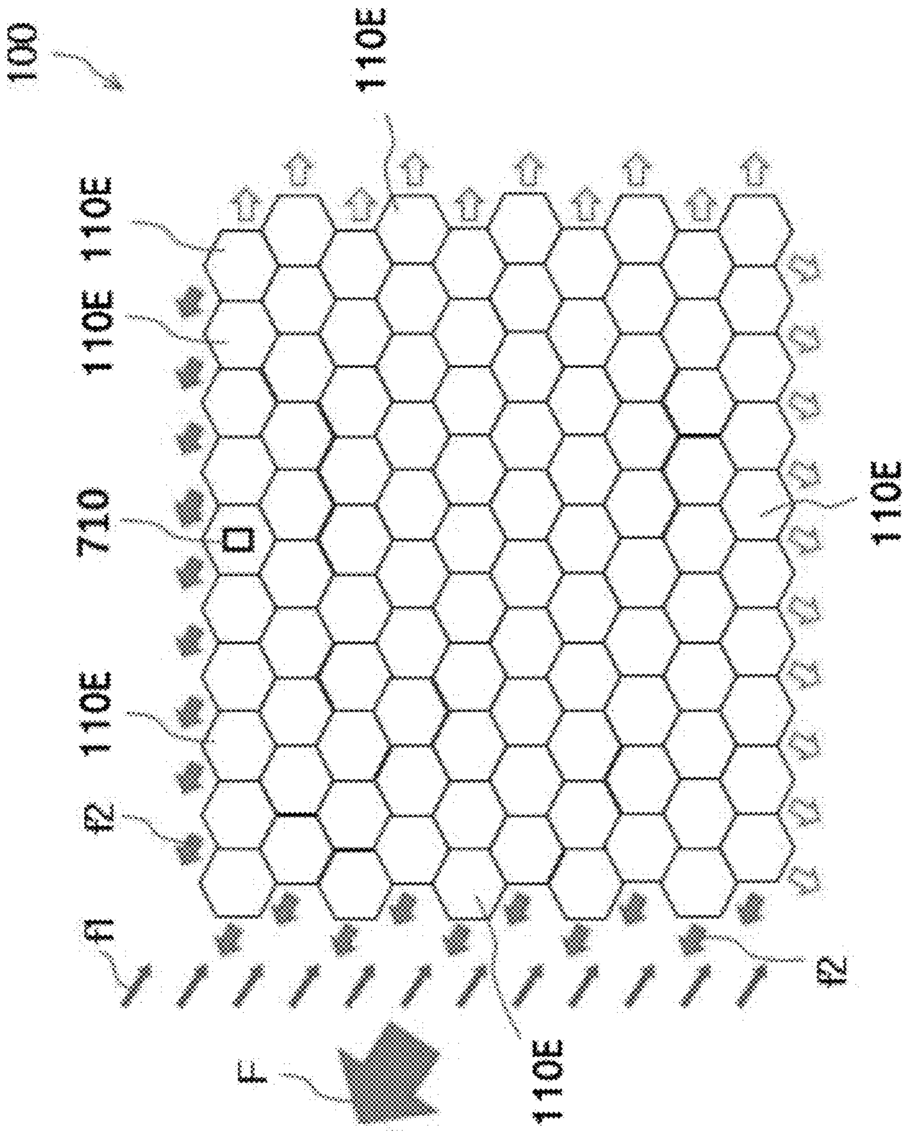

[FIG. 12B]
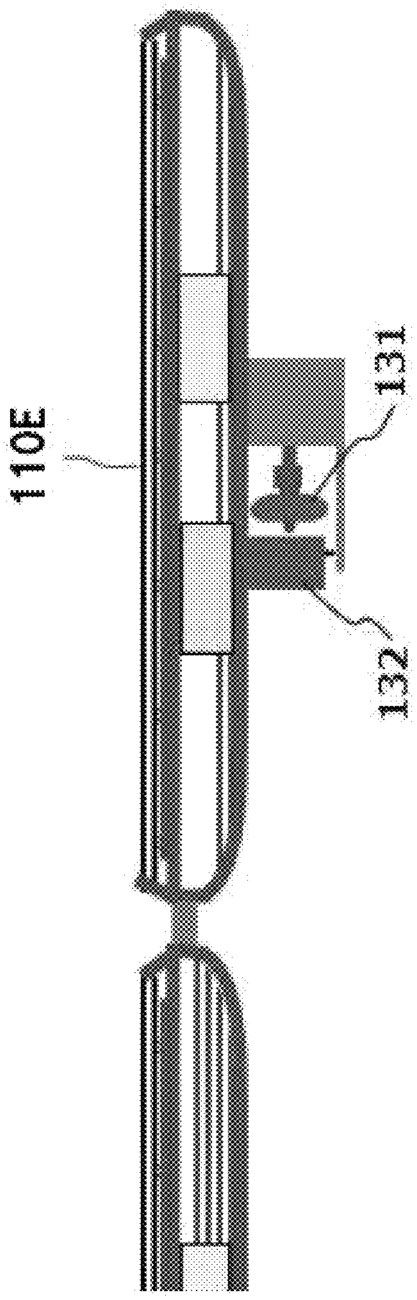

[FIG. 13]
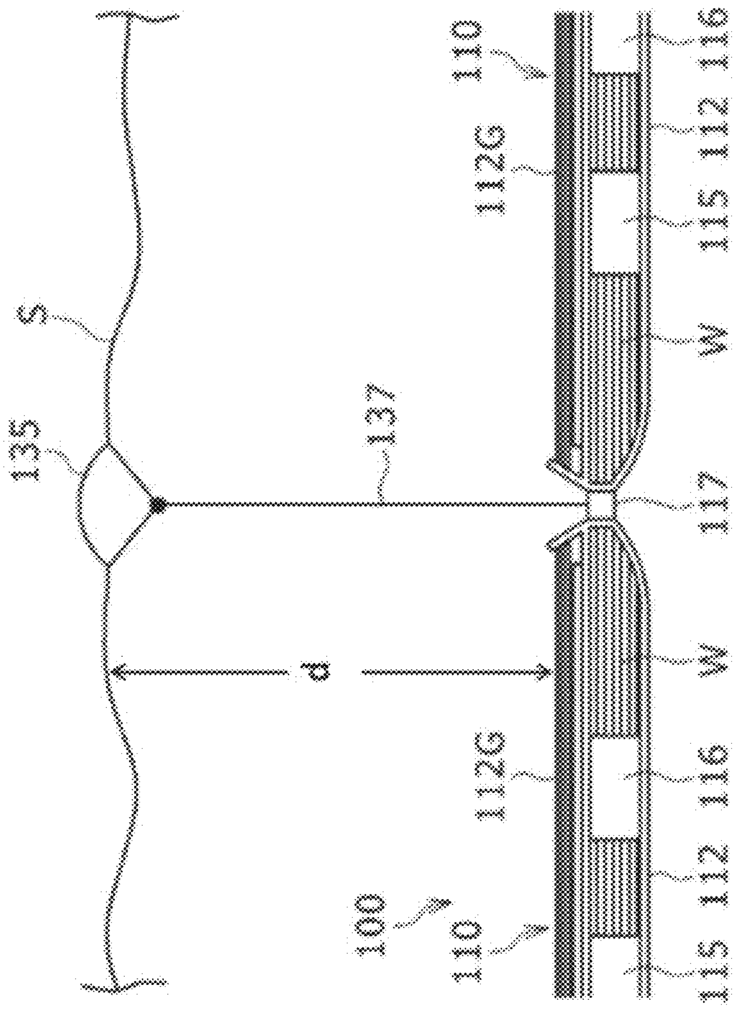

[FIG. 14]
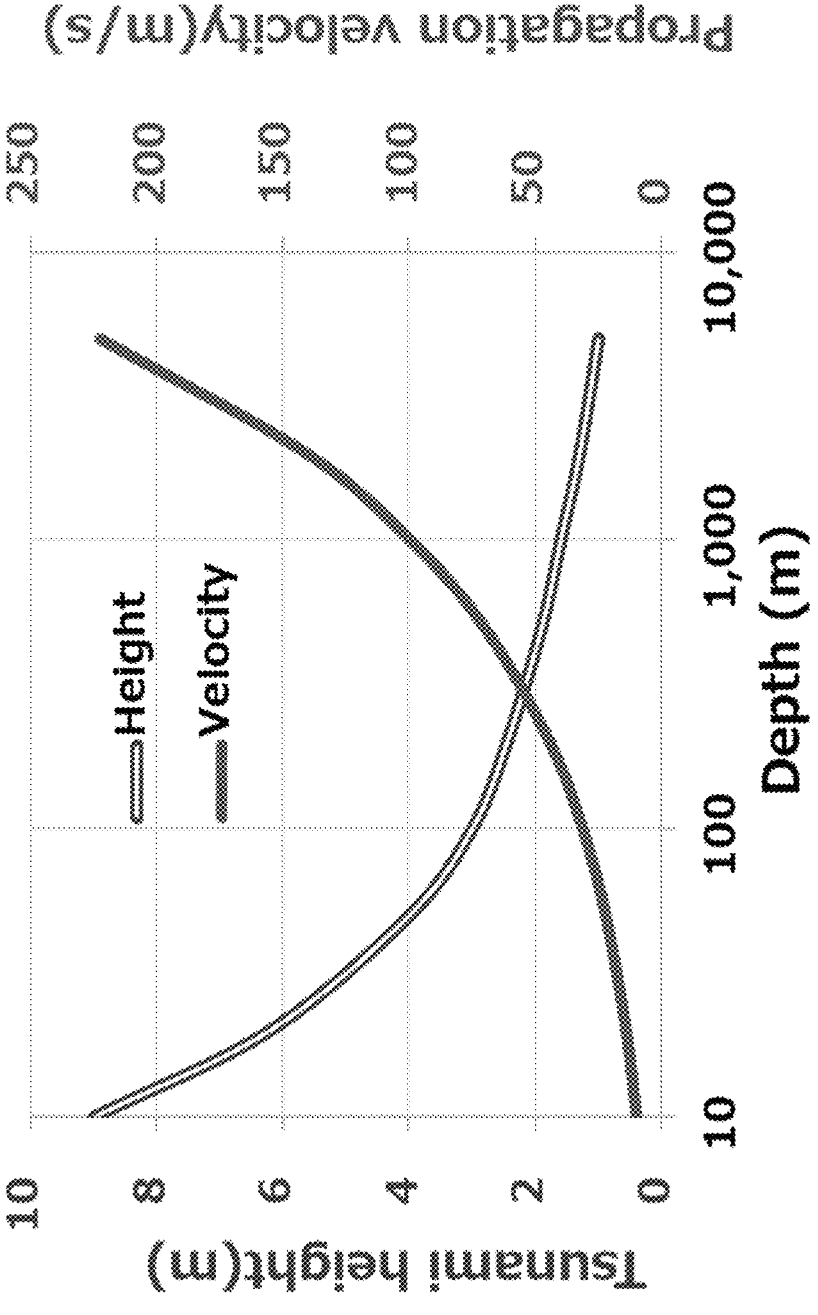

[FIG. 15]
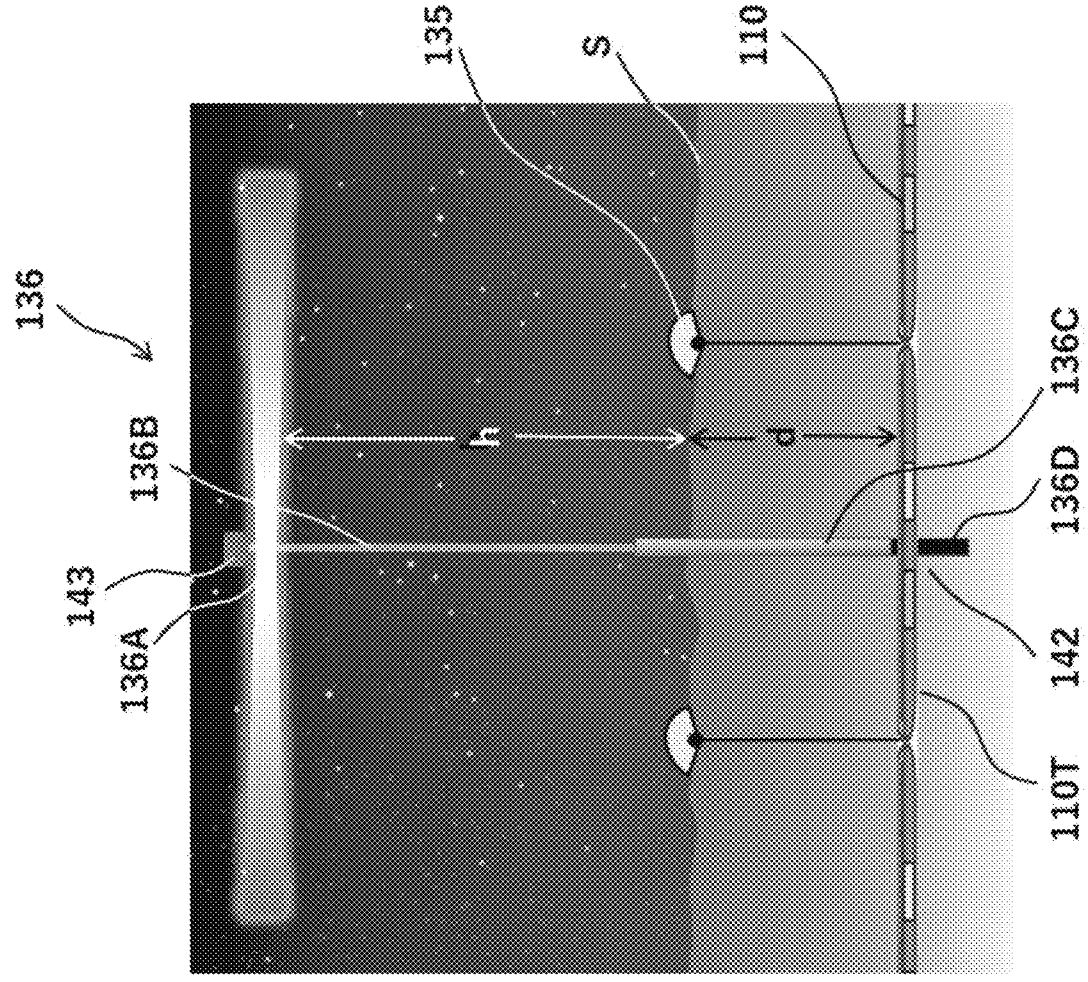

[FIG. 16]
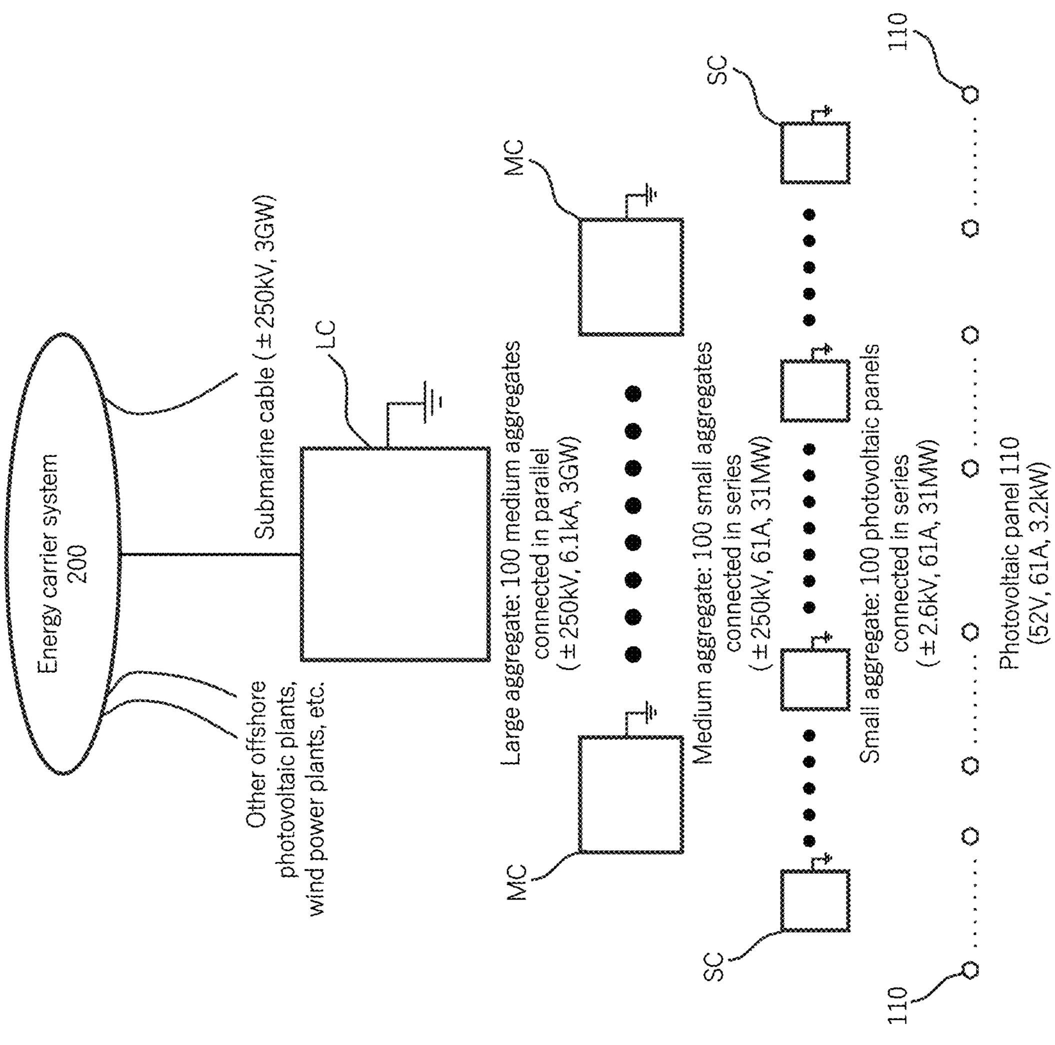

[FIG. 17]
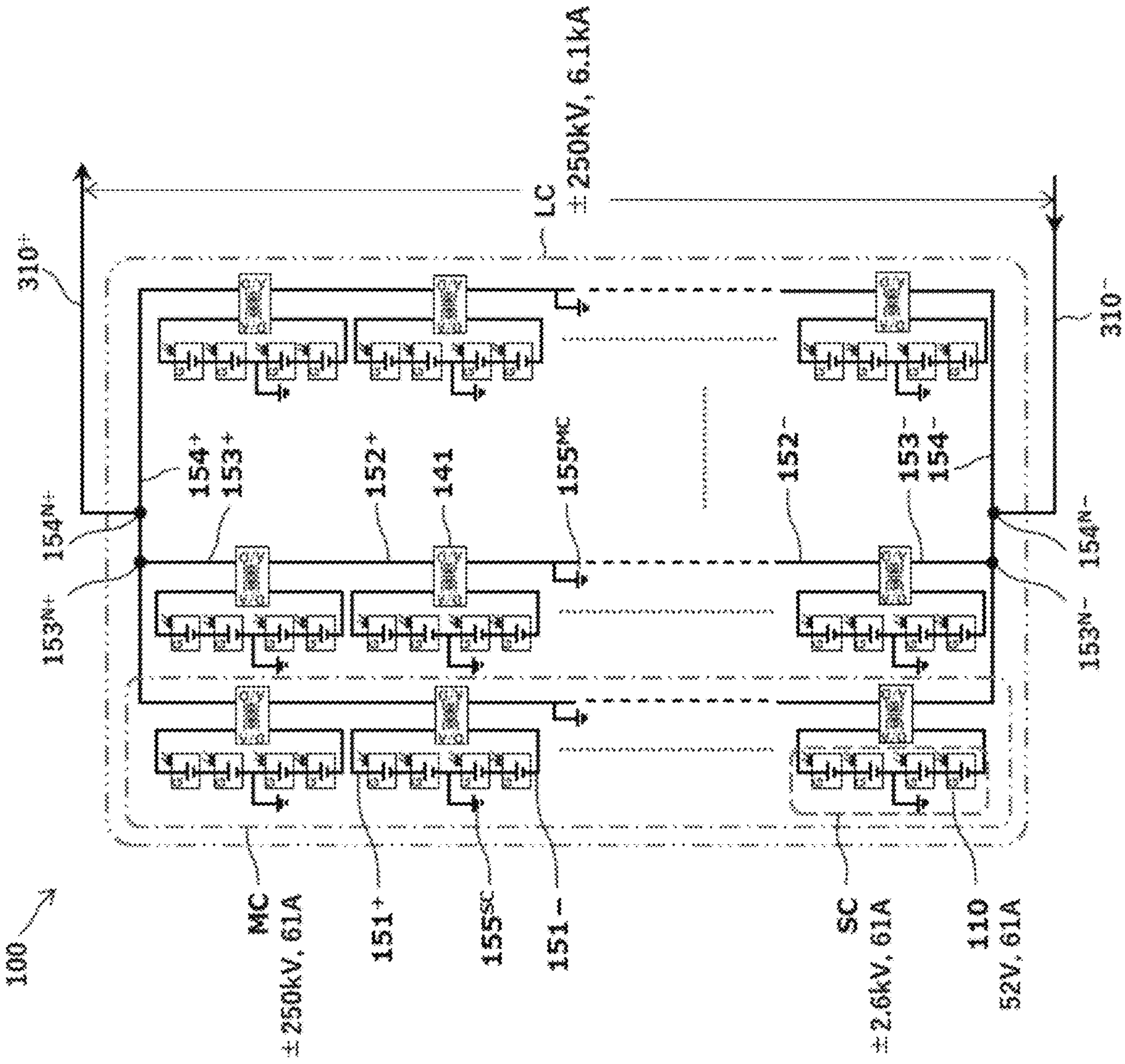

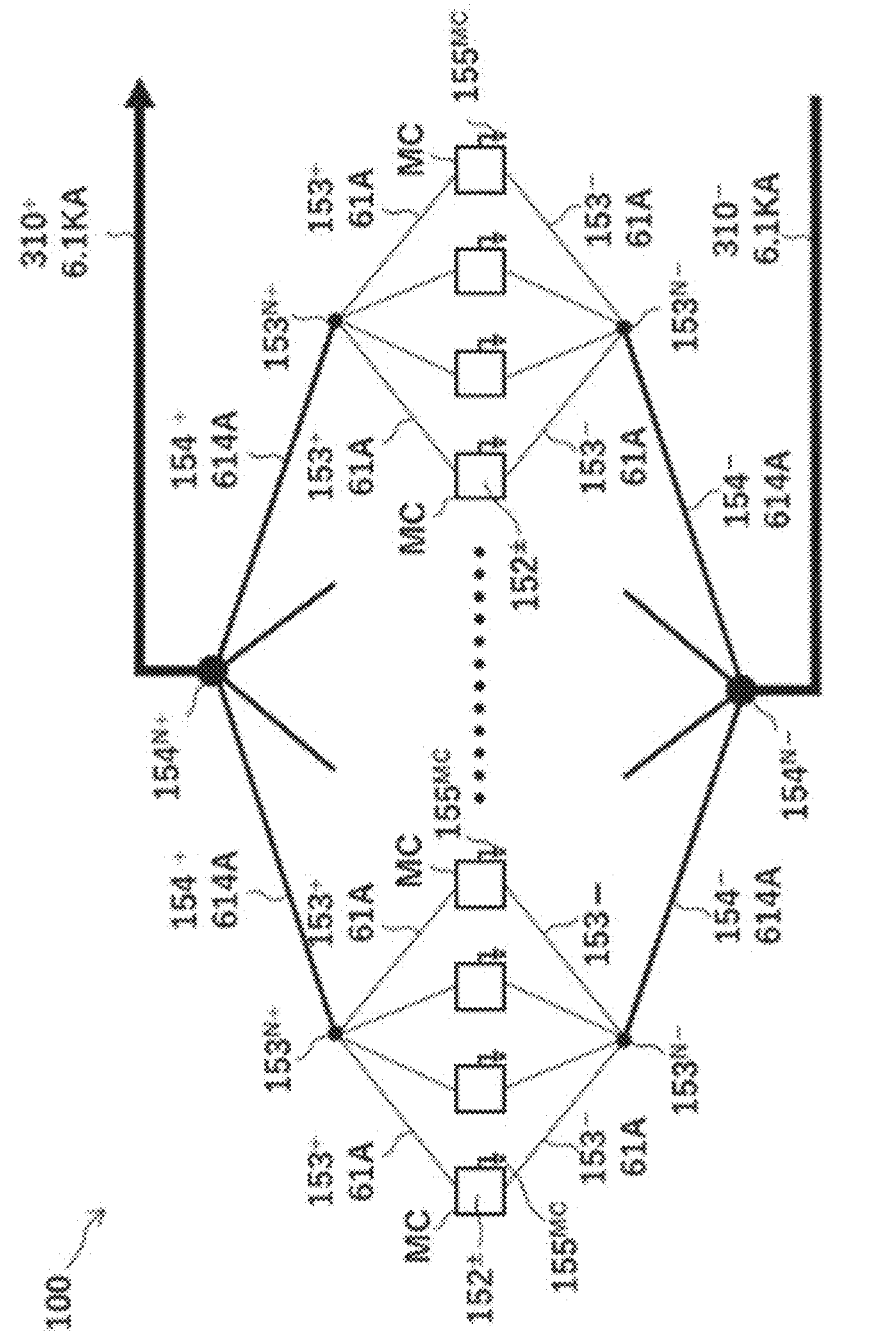
[FIG. 18]

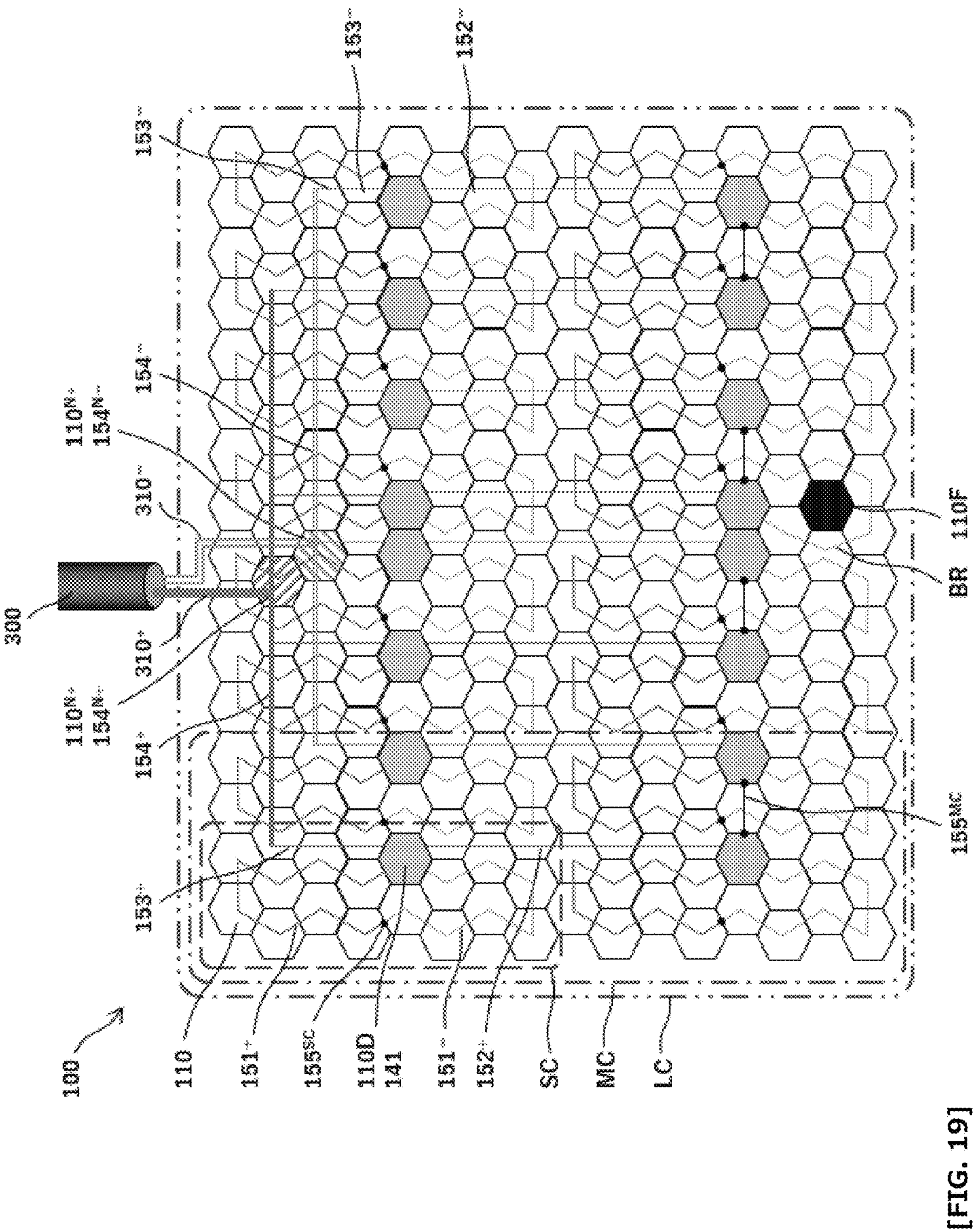
[FIG. 19]

[FIG. 20]
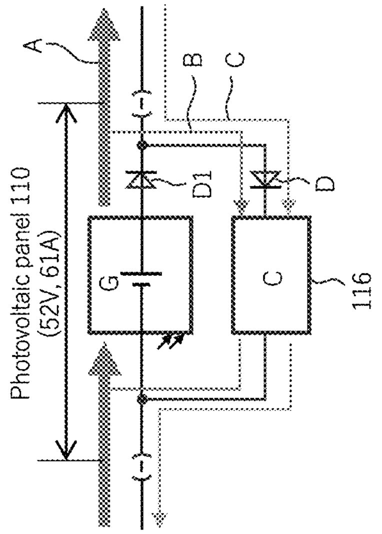

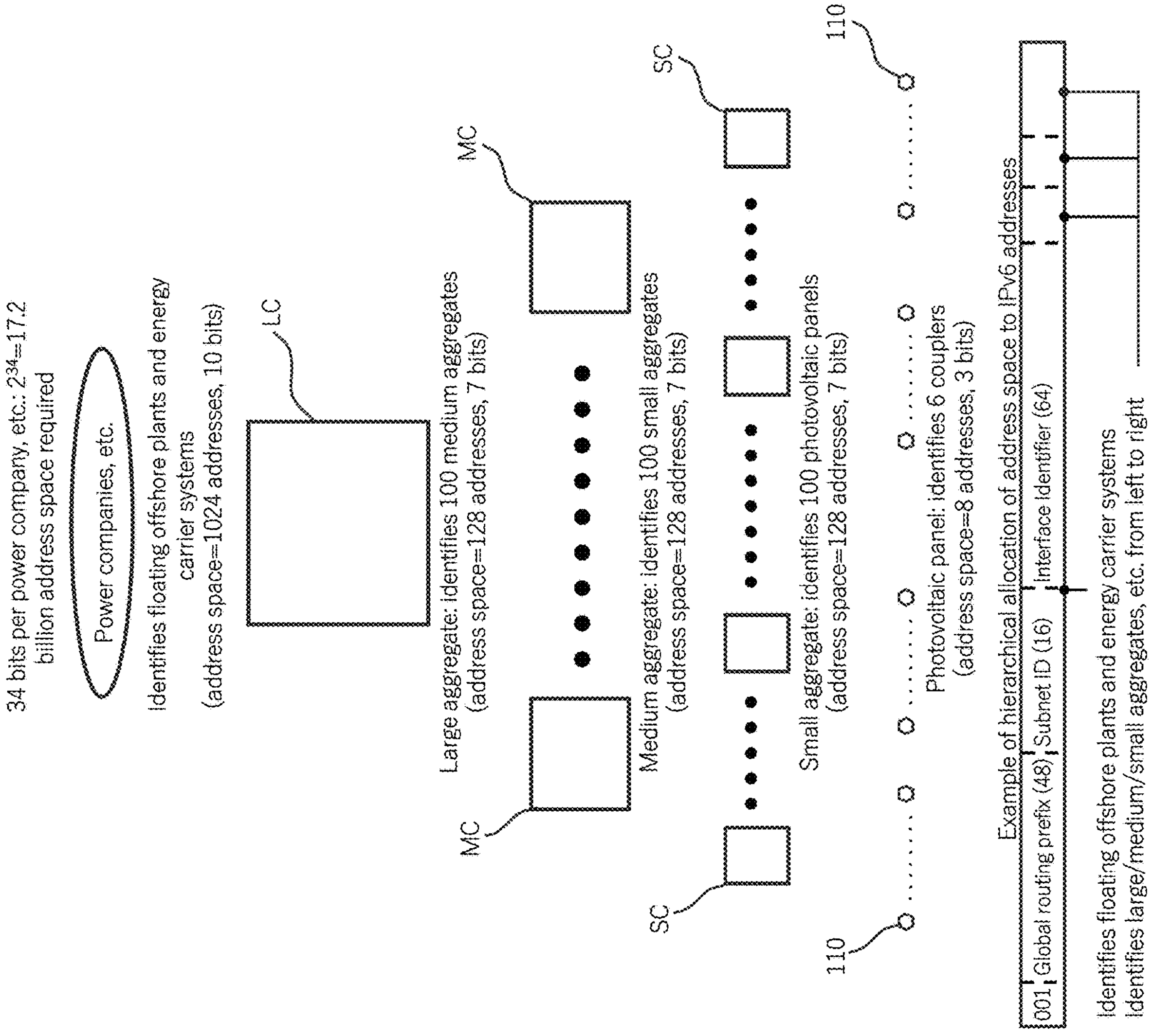
[FIG. 21]

[FIG. 22]
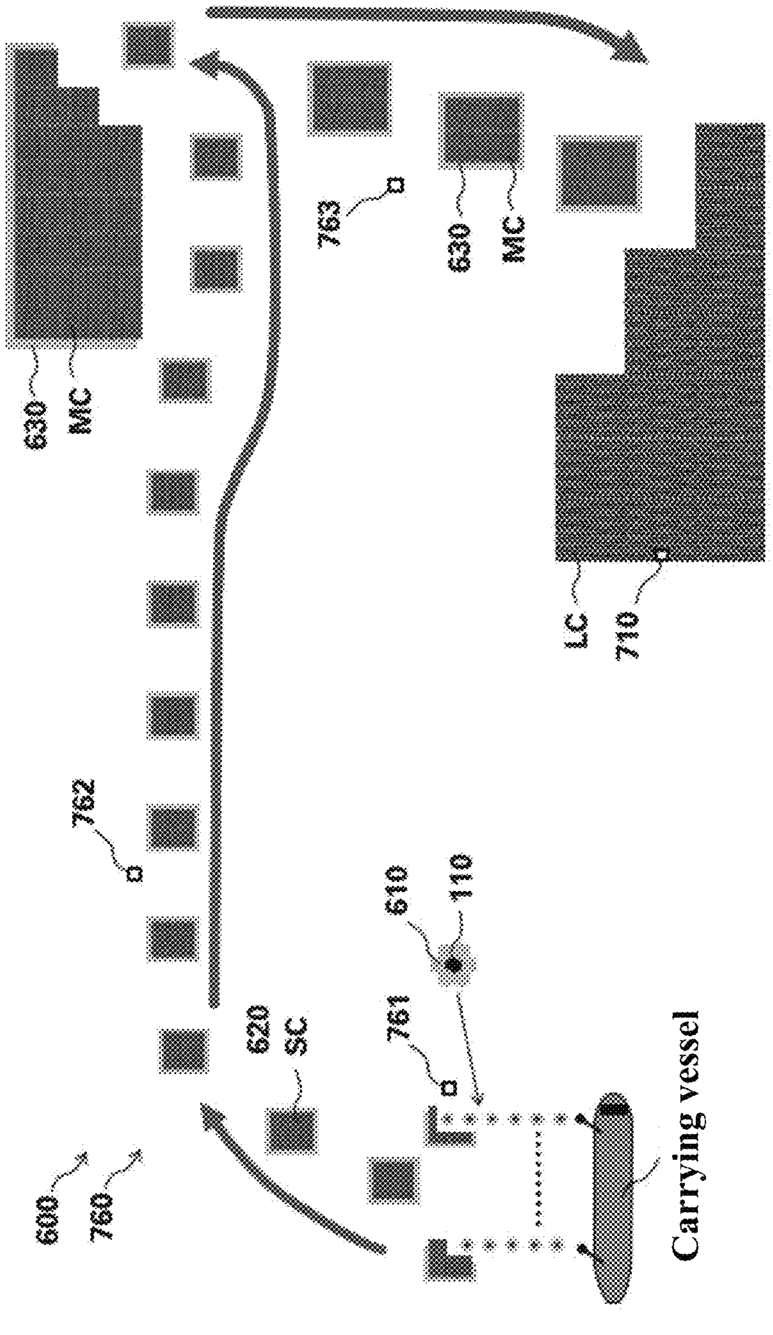

[FIG. 23]

| | Processes | Number of targets | Number of robots | Unit assembly time (min.) | Total assembly time |
|---|---|---|---|---|---|
| Offshore plants | Assembly of small aggregates | 100 panels | 10×100 | 15 | 250 hours |
| | Assembly of medium aggregates | 100 SCs | 100 | 180 | 300 hours |
| | Assembly of large aggregates | 100 MCs | 1 | 240 | 400 hours |
| | Total construction time | After finishing 1/4 of previous, start next process | | | 538 hours |
| | Total construction days | Possible hours: 10 hours per day, 60% per year | | | 90 days |
| Total number of offshore plants to be constructed | | 963 | Number of simultaneous construction: 26 | | 9 years |

[FIG. 24]

| Components | Ratio | Cost, etc. |
|---|---|---|
| Offshore plants 100 | | |
| Photovoltaic modules 113 | 54% | |
| Panel housings 112 | 30% | |
| Electrical and control circuits 115, 117, 124 | 10% | |
| Submarine cables 300 | 6% | |
| Initial equipment cost A | 100% | 2.48 trillion yen/plant |
| Energy carrier dsystem 200 | | |
| Initial cost B: ratio to A | 50% | 1.24 trillion yen |
| Construction, maintenance, operation, etc. | | |
| Initial construction cost C : ratio to (A+B) | 10% | 0.37 trillion yen/plant |
| Lifetime D (depreciation period) | | 30 years |
| Initial depreciation cost E : (A+B+C)/D | | 136.4 billion yen/year |
| Initial maintenance and operation cost F : ratio to (A+B+C) | 1% | 40.9 billion yen/year |
| Operating profit ratio G : ratio to (E+F) | 6% | 10.6 billion yen/year |
| Amount of electricity generated and unit price of electricity | | |
| Amount of electricity generated H | | 5.71 TWh/plant · year |
| Unit price of electricity : (E+F+G)/H | | 33.0 yen/kWh |
| Economic effects of scale expansion | | |
| Initial variable cost ratio to (A+B+C) | 50% | 2.05 trillion yen/plant |
| Initial fixed cost ratio K to (A+B+C) | 50% | 2.05 trillion yen/plant |
| Coefficient of economic effect of scale of variable costs α | -5 to -10% | for 2 times increase |
| Coefficient of economic effect of scale of fixed costs β | -30% | for 2 times increase |

[FIG. 25]
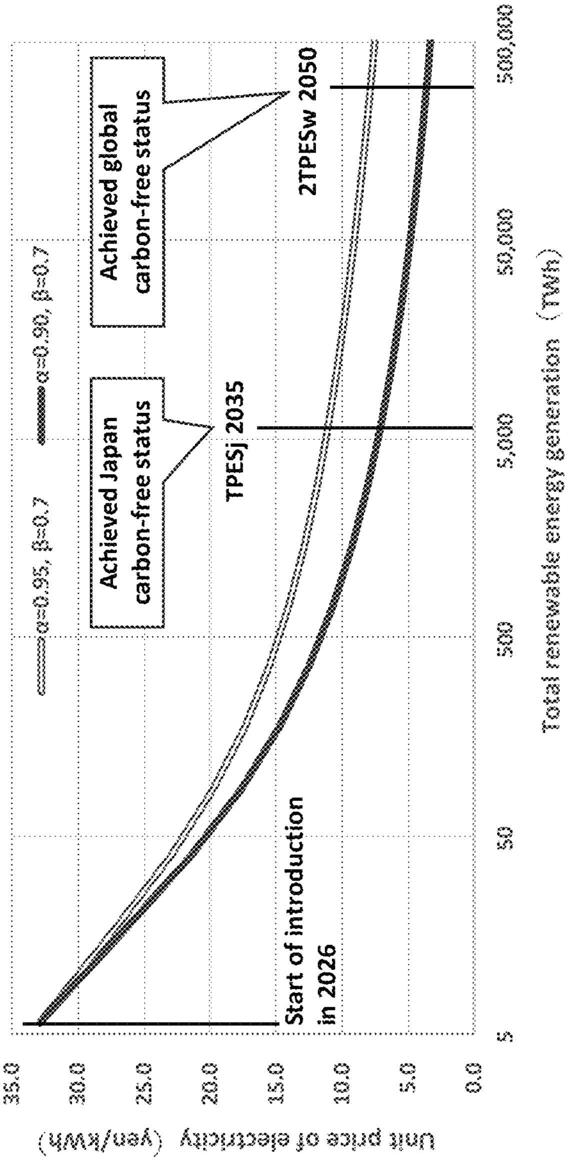

RENEWABLE ENERGY SUPPLY SYSTEM, FLOATING OFFSHORE SOLAR POWER GENERATING PLANT, AND RENEWABLE ENERGY SUPPLY METHOD

BACKGROUND

The present invention relates to a renewable energy supply system that supplies carbon-free energy derived from renewable energy resources, a floating offshore photovoltaic power generation plant (hereinafter referred to simply as "floating offshore plant") that is applied to the carbon-free energy supply system, and a carbon-free energy supply method.

Global warming is currently progressing on a global scale, and there is an urgent need to build a sustainable energy system that does not emit $CO_2$. In order to achieve the sustainable energy system, we must overcome the following three challenges.

Challenge (1): Produce sufficient amounts of renewable energy to replace nearly all primary energy that is needed on a national as well as global scale.

Challenge (2): Supply the produced renewable energy to consumers in a low-cost, high-quality, and stable manner.

Challenge (3): Systematically capture and remove the large amount of $CO_2$ already stored in the atmosphere.

Regarding Challenge (3), if Challenges (1) and (2) are overcome, in accordance with the progress of carbon-free conditions, it is expected that the nature (forests and oceans) will absorb $CO_2$ (18 Gt-$CO_2$/year), and that technologies to capture $CO_2$ from the atmosphere will be put in practical use. Thus, there is an urgent need to overcome Challenges (1) and (2).

Conventionally, as a technology related to carbon-free energy supply, a system is known that uses electricity generated by a photovoltaic power generation device to electrolyze water to generate hydrogen and supply the hydrogen to hydrogen utilization equipment. (Patent Document 1: Japanese Unexamined Patent Application Publication No. 2020-58168)

Also, a system is known that generates electricity at an offshore photovoltaic power generation plant, generates hydrogen by electrolyzing seawater using the electricity, stores the hydrogen, and uses the hydrogen to generate electricity (Patent Document 2: Japanese Unexamined Patent Application Publication No. 2012-94363; Patent Document 3: Japanese Patent No. 5754029).

In addition, a system is known that generates hydrogen using electricity generated by solar power, synthesizes ammonia using the hydrogen as a raw material, which is stored as liquefied ammonia (energy carrier), transports liquefied ammonia, ammonia gas, or ammonia water to energy consumption areas, and converts liquefied ammonia to hydrogen at energy consumption areas and supplies the hydrogen to fuel cell vehicles or to fuel cell power generation systems (Patent Document 4: Japanese Unexamined Patent Application Publication No. 2016-150890).

PRIOR-ART DOCUMENT

Patent Documents

Patent Document 1: Japanese Unexamined Patent Application Publication No. 2020-58168
Patent Document 2: Japanese Unexamined Patent Application Publication No. 2012-94363
Patent Document 3: Japanese Patent No. 5754029
Patent Document 4: Japanese Unexamined Patent Application Publication No. 2016-150890

SUMMARY

Technical Problem

However, it is impossible to overcome the aforesaid Challenges (1) and (2) with the technologies disclosed in Patent Document 1 through Patent Document 4. This is because the technologies disclosed in Patent Document 1 through Patent Document 4 do not assume achieving a large-area floating offshore plant, which is essential for building a system capable of producing a large amount of renewable energy to meet nation and even global scale energy demand.

This invention provides a carbon-free energy supply system to stably supply low-cost, high-quality energy to various supply facilities, and a floating offshore photovoltaic power generation plant to achieve the realization of the system such that the plant produces a sufficient amount of renewable energy in the sea area with abundant annual average sunshine to replace almost all primary energy needs of the nation and the global scale, converts the produced renewable energy into energy carrier, and stores it up to a specified amount. The present invention aims to play a role in achieving the goal of the Paris Agreement, which calls for limiting the increase in global average temperature to less than 2° C. above pre-industrial revolution levels, and if possible, to less than 1.5° C.

Solution to Problem

To solve the aforementioned problem, a carbon-free energy supply system according to an aspect of the present invention includes the following: one or more power generation plants that generate power to meet energy demand of an entire globe or country or a certain region or a specific industry using renewable energy resources including one or more floating offshore photovoltaic power generation plants installed in the equatorial waters within approximately 30 degrees north-south latitude, which is vast and abundant in renewable energy resources; one or more energy carrier systems that synthesize energy carriers from power generated at the power generation plant, that store the energy carrier up to a specified amount, that convert the power or the energy carrier into an energy form suitable for each of supply destination facilities, and that supply carbon-free energy to the supply destination facilities via energy transport means including one or more of predetermined pipeline transportation, tank truck transportation, tanker transportation, DC power transmission, and AC power transmission; and one or more management and control devices that manage and control some or all of the power generation plant, the energy carrier system, the energy transport means, and the supply destination facilities.

In the carbon-free energy supply system according to an aspect of the present invention, some or all of the power generation plant, the energy carrier system, the energy transport means, the supply destination facilities, and the management and control device are assigned a logical address for TCP/IP-based packet communication to exchange information through secure communication with a verification code attached, the code allowing a receiving end to verify at least the authenticity of a packet transmission source and the integrity of transmitted content.

In the carbon-free energy supply system according to an aspect of the present invention, the energy carrier is one or more of liquefied ammonia, methylcyclohexane, liquid hydrogen, and hydrogen gas.

In the carbon-free energy supply system according to an aspect of the present invention, the energy carrier system includes the following: one or more first energy conversion devices that stabilize power generated at the power generation plant; one or more second energy conversion devices that generate hydrogen using power output from the first energy conversion device; one or more third energy conversion devices that convert the hydrogen to an energy carrier that can be stably stored; one or more energy carrier storage devices that store the energy carrier up to a specified amount; and one or more energy conversion supply devices that convert the power or the energy carrier into an energy form suitable for each of the supply destination facilities to transport carbon-free energy to the supply destination facilities via the energy transport means.

In the carbon-free energy supply system according to an aspect of the present invention, the energy conversion supply system includes at least one of the following: a function that converts power output from the first energy conversion device into a predetermined high-voltage DC power to transmit the high-voltage DC power to a high-voltage DC power system, one of the supply destination facilities, through DC power transmission; a function that converts power output from the first energy conversion device into a predetermined AC power to transmit the AC power to an AC power system, one of the supply destination facilities, through AC power transmission; a function that converts hydrogen output from the second energy conversion device into predetermined liquid hydrogen to transport the liquid hydrogen to a facility of the supply destination facilities by pipeline transportation, tank truck transportation, or tanker transportation; a function that pressurizes hydrogen output from the second energy conversion device to a predetermined pressure to convert the hydrogen to high-pressure hydrogen gas to transport the high-pressure hydrogen gas to a facility of the supply destination facilities by pipeline transportation, tank truck transportation, or tanker transportation; a function that converts an energy carrier output from the third energy conversion device into liquefied ammonia to transport the liquefied ammonia to a facility of the supply destination facilities by pipeline transportation, tank truck transportation, or tanker transportation; a function that generates predetermined high-voltage DC power using an energy carrier taken out from the energy carrier storage device to transmit the high-voltage DC power to a high-voltage DC power system, a facility of the supply destination facilities, through DC power transmission; a function that generates predetermined AC power using an energy carrier taken out from the energy carrier storage device to transmit the AC power to an AC power system, a facility of the supply destination facilities, through AC power transmission; a function that converts an energy carrier taken out from the energy carrier storage device into liquefied ammonia to transport the liquefied ammonia to a facility of the supply destination facilities by pipeline transportation, tank truck transportation, or tanker transportation; a function that converts an energy carrier taken out from the energy carrier storage device into predetermined liquid hydrogen to transport the liquid hydrogen to a facility of the supply destination facilities by pipeline transportation, tank truck transportation, or tanker transportation; a function that converts an energy carrier taken out from the energy carrier storage device into predetermined high-pressure hydrogen gas to transport the high-pressure hydrogen gas to a facility of the supply destination facilities by pipeline transportation, tank truck transportation, or tanker transportation; or a power output instruction function that instructs the first energy conversion device to output part or all of the power output from the first energy conversion device to the second energy conversion device when there is a surplus of energy to be supplied to the supply destination facilities, or in accordance with a predetermined plan.

In the carbon-free energy supply system according to an aspect of the present invention, the power generation plant further generates power using other renewable energy resources to level out diurnal, weather, or temporal variability and seasonal unevenness of generated power, lowering the upper limit of the specified amount of the energy carrier.

In the carbon-free energy supply system according to an aspect of the present invention, the power generation plant that generates power using other renewable energy resources is at least one of an onshore photovoltaic power generation plant, a moored offshore or floating offshore photovoltaic power generation plant, an onshore or offshore wind power generation plant, a geothermal power plant, or a hydroelectric power generation plant.

In the carbon-free energy supply system according to an aspect of the present invention, the floating offshore photovoltaic power generation plant is a plant that floats in waters that receive more than a predetermined average annual amount of solar radiation and have a water depth greater than a predetermined water depth, and the plant includes at least one of the following: a function that connects multiple polygonal photovoltaic panels to form a logical hierarchy to be substantially hexagonal in plan view, and to connect the multiple polygonal photovoltaic panels to form a honeycomb structure in plan view; a photovoltaic power generation function that generates a predetermined DC power by connecting the photovoltaic panels in series, or isolated series, or parallel, or tree-structured parallel via different power path connectors between the logical hierarchy layers; a diving and surfacing function that submerges the floating offshore photovoltaic power generation plant to a predetermined diving depth by pouring water into a panel housing of the photovoltaic panel, and to surface the floating offshore photovoltaic power generation plant in a submerged state by draining water from the panel housing of the photovoltaic panel; a coupling function that forms the floating offshore photovoltaic power generation plant by connecting the adjacent photovoltaic panels, on each side or part of which is provided with a coupler that accommodates some or all of the power path connectors, signal path connectors, and compressed air pipe connectors, the coupler allowing the adjacent panel housings to swing mechanically between each other at least vertically; a control function that switches to the other photovoltaic panels via some or all of the power path connectors, signal line connectors, and compressed air pipe connectors that are unused to form a bypass route in the event of a fault in its own photovoltaic panel or in an adjacent photovoltaic panel; a shock absorbing function that absorbs unexpected shocks to prevent the photovoltaic panels from riding up due to fluctuations in the sea surface by placing elastic shock-absorbing members at some or all of the apexes of the photovoltaic panels in plan view; a current position and orientation measurement function that measures the current position and orientation of the floating offshore photovoltaic power generation plant; a propulsion and steering function that keeps the floating offshore photovoltaic power generation plant stationary at a predetermined location and that allows the plant to maintain a predetermined orientation or direction; a stationary maintenance function during non-power generation that keeps the floating offshore photovoltaic power generation plant stationary at a predetermined position, and orientation or direction using the propulsion and steering function at night or when diving; a mooring function that keeps the floating offshore photovoltaic power generation plant stationary at a predetermined position; a secure communication function that exchanges information through the secure communication; a compressed air generation function that generates compressed air for pouring water into the panel housing and draining water from the panel housing, and for diving the floating offshore photovoltaic power generation plant to the predetermined diving depth, and that supplies the compressed air to the compressed air tank of other photovoltaic panels via a compressed air pipe and the compressed air pipe connector; or a floating lighthouse function that makes presence known around the floating offshore photovoltaic power generation plant using some or all of lights, radio waves, or sound waves.

In the carbon-free energy supply system according to an aspect of the present invention, the floating offshore photovoltaic power generation plant is constructed in such a manner that the photovoltaic panels are lowered onto the ocean by multiple cranes from a carrier that has transported the photovoltaic panels to a predetermined area of the ocean; the photovoltaic panels that constitute each logical hierarchy layer, or groups of the photovoltaic panels that constitute lower logical hierarchy layers are assembled simultaneously by each logical hierarchy layer, using one or more transport and assembly robots dedicated to each logical hierarchy layer, based on the identifiers attached to the photovoltaic panels and the configuration information of the floating offshore photovoltaic power generation plant; and compressed dry air pre-filled in a compressed air tank provided within the photovoltaic panel is injected into the coupler to blow off seawater components therefrom in assembling the photovoltaic panels to ensure a tight connection between the predetermined adjacent photovoltaic panels. The transport and assembly robot collects data for learning composed of sensor and camera information including at least the construction process, weather and sea conditions, mutual positioning of the photovoltaic panels, and occurrence of troubles regarding the photovoltaic panels and the floating offshore photovoltaic power generation plant, in which the robot is programmed to use the learned data obtained by machine learning in a high-performance computing (HPC) environment to maximize a predetermined reward.

In the carbon-free energy supply system according to an aspect of the present invention, the floating offshore photovoltaic power generation plant includes one million photovoltaic panels per plant, where the panels are flexibly connected to form a honeycomb structure to disperse and absorb complex impact forces caused by waves and winds, in which the plant includes a small aggregate, a medium aggregate, and a large aggregate of the panels. The small aggregate comprises 100 of the photovoltaic panels connected in series, the medium aggregate comprises 100 of the small aggregates connected in insulated series, and the large aggregate comprises 100 of the medium aggregates connected in tree-structured parallel or in parallel.

In the carbon-free energy supply system according to an aspect of the present invention, the floating offshore photovoltaic plant transmits generated power to the energy carrier system or the first energy conversion device through DC power transmission, and during non-power generation at night or when diving, the plant is fed power from the energy carrier system or the first energy conversion device or the energy conversion supply device.

In the carbon-free energy supply system according to an aspect of the present invention, the floating offshore photovoltaic power generation plant is provided with a tank section into which water is to be injected and a compressed air tank within the panel housing, and with a floater to maintain the floating offshore photovoltaic power generation plant at a predetermined diving depth when diving. When diving, water is injected into the tank section and the floater is supplied with compressed air within the compressed air tank so that the floater rises to the sea surface to maintain the floating offshore photovoltaic power generation plant at a predetermined diving depth, and when surfacing, the compressed air in the compressed air tank is discharged to expel the seawater in the tank section to float the plant above the sea surface.

A carbon-free energy supply method according to an aspect of the present invention includes the following steps: generating power to meet energy demand of an entire globe or country or a certain region or a specific industry using renewable energy resources by one or more power generation plants including one or more floating offshore photovoltaic power generation plants installed in the equatorial waters within approximately 30 degrees north-south latitude, which is vast and abundant in renewable energy resources; synthesizing energy carriers from power generated at the power generation plant by one or more energy carrier systems to store the energy carrier up to a specified amount, to convert the energy carrier into an energy form suitable for each of supply destination facilities, and to supply carbon-free energy to the supply destination facilities via energy transport means including one or more of predetermined pipeline transportation, tank truck transportation, tanker transportation, DC power transmission, and AC power transmission; and managing and controlling some or all of the power generation plant, the energy carrier system, the energy transport means, and the supply destination facilities by one or more management and control devices.

In the carbon-free energy supply method according to an aspect of the present invention, the method performed by the energy carrier system includes the following steps: stabilizing power transmitted from the power generation plant via the submarine cable by one or more first energy conversion devices; generating hydrogen by power output from the first energy conversion device by one or more second energy conversion devices; converting the hydrogen generated by the second energy conversion device into an energy carrier that can be stably stored by one or more third energy conversion devices; storing the energy carrier up to a specified amount by one or more energy carrier storage devices; converting the energy carrier into an energy form suitable for each of supply destination facilities by one or more energy conversion supply devices to transport the carbon-free energy to the supply destination facilities by the energy transport means; and managing and controlling some or all of the power generation plant, the submarine cable, the energy carrier system, the first energy conversion device, the second energy conversion device, the third energy conversion device, the energy carrier storage device, the energy conversion supply device, the energy transport means, and the supply destination facilities by one or more management and control devices.

The carbon-free energy supply method according to an aspect of the present invention further includes the following steps: transmitting power generated by the floating offshore photovoltaic power generation plant to the first energy conversion device; and feeding power to the plant from the energy carrier system, the first energy conversion device, or the energy conversion supply device during non-power generation at night or when diving.

In the carbon-free energy supply method according to an aspect of the present invention, the floating offshore photovoltaic power generation plant is a plant that floats in waters that receive more than a predetermined average annual amount of solar radiation and have a water depth greater than a predetermined water depth, and the method further includes at least one of the following steps: connecting multiple polygonal photovoltaic panels to form a logical hierarchy; connecting the photovoltaic panels being substantially hexagonal in plan view to form a honeycomb structure in plan view; generating a predetermined DC power by connecting the photovoltaic panels in series, or isolated series, or parallel, or tree-structured parallel between the logical hierarchy layers via different power path connectors; submerging the floating offshore photovoltaic power generation plant to a predetermined diving depth by pouring water into a panel housing of the photovoltaic panel, and surfacing the floating offshore photovoltaic power generation plant in a submerged state by draining water from the panel housing of the photovoltaic panel; forming the floating offshore photovoltaic power generation plant by connecting the adjacent photovoltaic panels, on each side or part of which is provided with a coupler that accommodates some or all of the power path connectors, signal path connectors, and compressed air pipe connectors, the coupler allowing the adjacent panel housings of the photovoltaic panels to swing mechanically between each other at least vertically; controlling to switch to the other photovoltaic panels via some or all of the power path connectors, signal line connectors, and compressed air pipe connectors that are unused to form a bypass route in the event of a fault in its own photovoltaic panel or in an adjacent photovoltaic panel; absorbing unexpected shocks to prevent the photovoltaic panels from riding up due to fluctuations in the sea surface by placing elastic shock-absorbing members at some or all of the apexes of the photovoltaic panels in plan view; measuring a current position and orientation of the floating offshore photovoltaic power generation plant; propelling and steering the floating offshore photovoltaic power generation plant to keep the plant stationary at a predetermined location, and to allow the plant to maintain a predetermined orientation or direction; keeping the floating offshore photovoltaic power generation plant stationary at a predetermined position, and orientation or direction, using the propulsion and steering function at night or when diving; mooring the floating offshore photovoltaic power generation plant to keep the plant stationary at a predetermined position; assigning elements of the plant a logical address for TCP/IP-based packet communication to exchange information through secure communication with a verification code attached, the code allowing a receiving end to verify at least the authenticity of a packet transmission source and the integrity of transmitted content; generating compressed air for pouring water into the panel housing and draining water from the panel housing, the pouring water allowing the floating offshore photovoltaic power generation plant to dive to the predetermined diving depth, and supplying the compressed air to a compressed air tank of the other photovoltaic panels via a compressed air pipe and the compressed air pipe connector; or installing a floating lighthouse around the floating offshore photovoltaic power generation plant to make known the presence of the plant using some or all of lights, radio waves, or sound waves,

Advantageous Effects of the Invention

The carbon-free energy supply system according to one aspect of the present invention generates a quantity of renewable energy to meet the total demand for energy on a national as well as global scale, which does not emit $CO_2$ but whose output power is unstable and cannot be stockpiled in large quantities and for long periods of time, converts the renewable energy into energy carriers in sufficient quantities to store the energy carriers up to a maximum of six months, and supplies energy to supply destination facilities by converting the energy carrier to an energy form suitable for the supply destination facilities, which makes nearly all primary energy sources carbon-free. In addition, the carbon-free energy supply system operates 24 hours a day, 365 days a year to continue supplying energy through meticulous management and control by a management and control device.

The carbon-free energy supply system according to one aspect of the invention can use TCP/IP technology and resources widely used on the Internet by assigning a logical (IP) address to each component (communication node), and can provide secure communication with a verification code, which allows a receiving end to verify the authenticity of the packet source (to ensure that there is no "spoofing") and the integrity (to ensure that there is no "tampering") of the transmitted content. This prevents cyber-terrorist attacks, such as forcing a floating offshore plant to dive, even if there is unauthorized access to the renewable energy supply system. In addition, encryption of the communication content may be used to prevent eavesdropping on the configuration information of the carbon-free energy supply system. However, this makes it difficult to detect unauthorized access or the transmission of inappropriate control information.

The carbon-free energy supply system of the present invention can use liquefied ammonia, methylcyclohexane, liquid hydrogen, and high-pressure hydrogen gas as energy carriers that can be stably stored, but these can be selected according to the characteristics of the supply destination facilities. Among these, liquefied ammonia or methylcyclohexane, which have high volume and mass energy densities and can be stockpiled in large quantities at room temperature for a long period of time, can be stockpiled, for example, for up to six months, which enables the use of renewable energy as energy infrastructure, whose amount of electricity generated fluctuates greatly from day to day, from season to season, and in extreme weather conditions.

The carbon-free energy supply system in accordance with one aspect of the present invention enables carbon-free energy in various industries by converting renewable energy to an energy form suitable for each of supply destination facilities, and by supplying the energy efficiently, inexpensively, and stably to a wide range of supply destination facilities. The supply destination facilities include the following:

- existing AC power system;
- high-voltage direct current power systems (HVDC) advancing rapidly in Europe due to their high transmission efficiency;
- $NH_3$ dedicated generators and $NH_3$ mixed combustion generators in thermal power plants;
- hydrogen-fired generators;
- liquid hydrogen storage tanks at airports, designed for aircraft fueled by high-purity liquid hydrogen to be scheduled to enter service in 2035;

hydrogen stations that supply high-purity hydrogen fuel to hydrogen fuel cell vehicles for large cars, buses, and trucks;

$NH_3$ storage tanks installed in ports where vessels navigating with $NH_3$ dedicated-fired engines arrive and depart; and blast furnaces performing hydrogen-reduced steelmaking using hydrogen instead of coke in the steel industry, which accounts for 40% of the total industry's $CO_2$.

Also, the carbon-free energy supply system in accordance with one aspect of the present invention will increase the diversity of renewable energy resources by using mainly floating offshore photovoltaic power generation, which is considered to have the highest power generation capacity in Japan, in combination with power generation plants using other renewable energy resources, will level out the temporal variability and seasonal unevenness of power generated from renewable energy sources, will increase the utilization efficiency of energy carrier-related devices (hereinafter sometimes referred to as energy carrier systems) and will lower the upper limit of the storage capacity of energy carrier storage devices. This enables a stable supply of low-cost energy.

In addition, for example, in Japan, where the annual average solar radiation in the waters around Okinotorishima and Minamitorishima islands, which are located at the southernmost tip of the exclusive economic zone (EEZ) of Japan, is about 1.5 times larger than in the land area of Japan, the floating offshore photovoltaic power generation plant in accordance with an aspect of the present invention can produce power equivalent to Japan's total primary energy demand in an area of about 2% of the EEZ around the island, and furthermore, the transmission loss can be reduced to a few percent if, for example, submarine cables transmit power at a high voltage of ±250 kV DC, which enables all carbon-free energy to be produced domestically.

If the floating offshore photovoltaic power generation plant is deployed in the equatorial waters within approximately 30 degrees latitude from north to south, beyond the boundaries of nations, EEZs, and on the high sea, this will make the world's total energy demand carbon-free for a long time to come, and will make a significant contribution to the prevention of global warming.

In addition, by adopting an approximately hexagonal, rectangular, parallelogrammatic, or triangular shape when viewed in plan so that the photovoltaic panels form a plane (lined up on one surface without gaps), the photovoltaic panels can be arranged in the densest possible density (tightest-packed arrangement). This allows the top surface of the floating offshore photovoltaic power generation plant, i.e., the side facing the sun, to be formed by the light-receiving surface of the photovoltaic panels to the maximum extent possible. Therefore, the power generation efficiency can be maximized by the structure of the floating offshore photovoltaic power generation plant.

Then, for example, making series connections, isolated series connections, and tree-structured parallel or parallel connections, starting from the lowest logical layer, enables the generation of high-voltage DC power at sea without excessive insulation protection measures, and the reduction of the transformer required for isolated series connection to a capacity of approximately 300 kVA, which can be accommodated within the panel housing, with a weight of approximately 1 ton. Furthermore, the tree structure parallel connection can limit the output current from a large aggregate, which can be up to approximately 6 kA, to only the submarine cable and the photovoltaic panels that house the submarine cable. This reduces the current flowing in the power path connectors between the photovoltaic panels to simplify the structure of the coupler.

When a photovoltaic panel fails, a control function that switches to another photovoltaic panel via an unused coupler or power path connector automatically forms a bypass route, allowing the floating offshore plant to maintain and continue its photovoltaic power generation function.

By placing the floating offshore plant in waters deeper than about 50 meters, even if a huge tsunami of the Great East Japan Earthquake class strikes, the tsunami will not destroy the floating offshore plant because the tsunami's impact on the plant would be minimal.

Also, during stormy weather, the floating offshore plant is kept at a predetermined diving depth (e.g., 5 to 20 m) by injecting water into the panel housing and simultaneously inflating a floater with compressed air. After the storm has passed, a diving and surfacing function, which raises the floating offshore plant by injecting compressed air into the panel housing to drain water from the housing, can minimize the effects of giant typhoons to a small amount.

A mechanical connection function that allows the panels to swing vertically and a shock-absorbing function at the apexes of the photovoltaic panels can also form a strong floating offshore photovoltaic power generation plant.

Furthermore, the floating offshore plant is provided with a current position and orientation measurement function, a propulsion and steering function such as a screw propeller around the periphery of the floating offshore plant, and a stationary maintenance function when not generating power. Because of these functions, the floating offshore plant can be kept stationary in place and maintained in a predetermined orientation or direction by day or night and in all weather conditions without being swept away by ocean currents, and strong winds.

Then, by assigning IP addresses to each node according to a logical hierarchical structure, the packet forwarding processing (routing) load is reduced and an efficient packet communication environment is provided within the floating offshore plant formed by one million photovoltaic panels.

The photovoltaic panel in the floating offshore plant in accordance with one aspect of the present invention is made substantially regular hexagonal when viewed in plan, and multiple photovoltaic panels are connected in a honeycomb structure when viewed in plan, whereby even when subjected to unexpected impacts from waves or large marine organisms. the impact forces can be dispersed in six directions. In addition, the mechanical connection function that allows the photovoltaic panels to swing vertically and the shock-absorbing function provided by the apexes of the photovoltaic panels make it possible to form an extremely strong floating offshore photovoltaic power generation plant. Furthermore, since a coupler can be provided on each side of the regular hexagon, it is easier to form a bypass route to switch to another photovoltaic panel via an unused coupler or power path connector in the event of a photovoltaic panel failure, which further increases the reliability of the floating offshore plant.

In addition, if the floating offshore photovoltaic power generation plant will incorporate (or connect) a total of one million photovoltaic panels into the floating offshore plant at a rate of one panel per minute during construction at sea, it takes just under two years to build one floating offshore plant, and more than 1,800 years to build 963 plants to meet Japan's total primary energy demand. By assembling these plants simultaneously and in parallel using multiple artificial intelligence-equipped transport and assembly robots, the required period for the construction can be reduced to 90 days per plant, or about nine years for 963 plants.

Furthermore, seawater components can infiltrate a coupler when the ±250 kV high-voltage power paths are connected in the coupler during offshore assembly, which could cause serious insulation breakdown after the floating offshore plant is put into operation. Therefore, meticulous attention is required in assembly at sea. Compressed dry air is filled in advance in the compressed air tank inside the panel housing of the photovoltaic panel that is to be transported to a predetermined sea area for assembly. The compressed dry air is used to blow off seawater components inside the coupler during the coupling process ensuring a tight and secure connection, which prevents insulation breakdown in the coupler.

The carbon-free energy supply method in accordance with one aspect of the present invention is capable of generating renewable energy, which does not emit $CO_2$ but for which output power is unstable and cannot be stockpiled in large quantities for long periods of time, in a sufficient amount to meet the total demand for energy on a national as well as global scale, and converting it into an energy carrier, storing it, for example, up to a maximum of six months, and then converting it to an energy form suitable for supply destination facilities and supplying it, thus making nearly all primary energy to be carbon-free. In addition, the carbon-free energy supply system operates 24 hours a day, 365 days a year to continue supplying energy through meticulous management and control by a management and control device.

BRIEF DESCRIPTION OF THE DRAWINGS

FIGS. 1A and 1B show an electromagnetic spectrum mechanism of global warming, which is a scientific basis according to one embodiment of the carbon-free energy supply system of the present invention, in which FIG. 1A is a diagram showing the wavelength distribution of solar and earth radiation energy, and FIG. 1B is a diagram showing the energy absorption wavelength bands of the water vapor window and $CO_2$.

FIGS. 2A and 2B show a basis for the total energy production targets according to one embodiment of the carbon-free energy supply system of the present invention, in which FIG. 2A is a diagram showing changes in the primary energy consumption in the world, and FIG. 2B is a diagram showing changes in the primary energy consumption in Japan.

FIG. 3 is a diagram showing the comparison between the target values according to one embodiment of the carbon-free energy supply system of the present invention, the renewable energy introduction potential of Japan, and the target values of the Green Growth Strategy.

FIG. 4 is a diagram showing the annual average solar radiation distribution in the sea area where the floating offshore photovoltaic power generation plant is to be installed, assuming Japan and the world as the supply destination according to one embodiment of the carbon-free energy supply system of the present invention.

FIG. 5 is a system configuration diagram showing one embodiment of the carbon-free energy supply system according to the present invention.

FIG. 6 is a diagram showing the types and characteristics of energy carriers used in one embodiment of the carbon-free energy supply system of the present invention.

FIG. 7 is a diagram showing the exclusive economic zones suitable for the installation according to one embodiment of the floating offshore photovoltaic power generation plant of the present invention, assuming Japan is the supply destination.

FIG. 8 is a diagram showing the annual average sunshine hours of the islands around the sea area suitable for installing one embodiment of the floating offshore photovoltaic power generation plant of the present invention.

FIG. 9 is a diagram showing an example of the configuration and performance characteristics according to one embodiment of the floating offshore photovoltaic power generation plant of the present invention.

FIGS. 10A and 10B are diagrams showing a key photovoltaic panel of one embodiment of the floating offshore photovoltaic power generation plant, in which FIG. 10A is a plan view of the key photovoltaic panel, and FIG. 10B is a cross-sectional view of the key photovoltaic panel.

FIGS. 11A and 11B are diagrams showing a coupler in FIG. 10A of the floating offshore photovoltaic power generation plant according to one embodiment of the present invention, in which 11A is a horizontal cross-sectional view in the coupled state, and 11B is a vertical cross-sectional view in the uncoupled state.

FIGS. 12A and 12B are diagrams showing the floating offshore photovoltaic power generation plant according to one embodiment of the present invention, in which FIG. 12A is an explanatory diagram illustrating the stasis control of the floating photovoltaic power generation offshore plant, and FIG. 12B is a vertical cross-sectional view of the photovoltaic panel located on the periphery of the floating offshore photovoltaic power generation plant.

FIG. 13 is a longitudinal cross-sectional view of the floating offshore photovoltaic power generation plant in a submerged state according to one embodiment of the floating offshore photovoltaic power generation plant of the present invention.

FIG. 14 is a diagram showing the relationship between tsunami height, tsunami propagation velocity, and water depth, which is the basis for setting the water depth of the installation area of the floating offshore photovoltaic power generation plant according to one embodiment of the present invention.

FIG. 15 is a longitudinal cross-sectional view showing a structure of a floating lighthouse of the floating offshore photovoltaic power generation plant according to the floating offshore photovoltaic power generation plant of one embodiment of the present invention.

FIG. 16 is a hierarchical structure diagram showing a hierarchical structure of a power system of the floating offshore photovoltaic power generation plant according to one embodiment of the floating offshore photovoltaic power generation plant of the present invention.

FIG. 17 is a wiring circuit diagram showing a wiring circuit of the power system of the floating offshore photovoltaic power generation plant according to one embodiment of the present invention.

FIG. 18 is a wiring circuit diagram showing a tree-structured parallel connection of the power system of a large aggregate of the floating offshore photovoltaic power generation plant according to the floating offshore photovoltaic power generation plant of one embodiment of the present invention.

FIG. 19 is a conceptual diagram showing series-series-parallel connections between photovoltaic panels and a route for bypassing faulty panels of the floating offshore photovoltaic power generation plant according to one embodiment of the present invention.

FIG. 20 is a conceptual diagram showing the flow of current in the photovoltaic panels during photovoltaic power generation and when photovoltaic power is not generated according to the floating offshore photovoltaic power generation plant of one embodiment of the present invention.

FIG. 21 is a hierarchical structure diagram showing a logical hierarchy of a communication system of the floating offshore photovoltaic power generation plant according to the floating offshore photovoltaic power generation plant of one embodiment of the present invention.

FIG. 22 is a diagram showing a simultaneous parallel construction of the floating offshore photovoltaic power generation plant using multiple transport and assembly robots according to the floating offshore photovoltaic power generation plant of one embodiment of the present invention.

FIG. 23 is a diagram showing estimated plant construction time by process-specific assembly and in total the time required for the construction of the floating offshore photovoltaic power generation plant according to one embodiment of the present invention.

FIG. 24 is a diagram showing an estimation model for the cost of equipment, the costs for construction, maintenance, and operation, the unit cost of electricity, and the economic effects of scaling up according to the carbon-free energy supply system of one embodiment of the present invention.

FIG. 25 is a diagram showing an example of estimating the amount of renewable energy generation and the unit price of power of the carbon-free energy supply system according to one embodiment of the present invention.

DETAILED DESCRIPTION

Background of the Invention

The present invention seeks to provide a technical solution to the serious and urgent problem of global warming caused by humans after the industrial revolution. To this end, it is necessary to explain, prior to illustrating one embodiment of the invention, that the present invention was made based on considerations to a wide range of fields, including meteorology, international law; and various industries, as well as on scientific evidence.

The following sections describe the scientific basis for global warming, the earth's energy balance and global warming, global and Japanese primary energy consumption trends, the potential and challenges of primary energy conversion to renewable energy, and the potential of offshore photovoltaic power generation.

The Scientific Basis for Global Warming

According to the IPCC (the Intergovernmental Panel on Climate Change) Fifth Assessment Report (2014), the global average temperature (average surface temperature) increased by 0.85° C. between 1880 and 2012. If greenhouse gas concentrations continue to rise further in the future, in the worst case scenario (RCP 8.5 scenario) where greenhouse gases will be at their highest by 2100, the temperature will increase by 2.6 to 4.8° C. Even in the case where the concentrations are kept to the lowest level (RCP 2.6 scenario), the temperature will increase by 0.3 to 1.7° C.

The Paris Agreement, which was adopted at COP21 (21st Conference of the Parties to the United Nations Convention on Climate Change) held in Paris in 2015, imposes on each country the goal of keeping the global average temperature increase below 2° C. above pre-industrial revolution levels, and if possible, below 1.5° C. At the IPCC COP24 in 2018, it was reported that measures are urgently needed to reduce $CO_2$ emissions by 45% by 2030 and to achieve net-zero total global greenhouse gas emissions by around 2050.

According to a study by Ebru Kirezci et al. (Nature, Scientific Reports, 10, 11629, 2020), under the worst-case scenario (RCP 8.5), the land area affected by coastal flooding due to severe storms, tidal waves, and storm surges will increase by 48 percent by 2100 compared to 2015, 4.1 percent of the population (287 million people) would be affected, and 20 percent of global GDP assets (14.2 trillion US dollars) would be lost. Furthermore, the study states that torrential rains, tidal waves, and storm surges now occurring once every 100 years would occur as frequently as once every 10 years, which would at least cause tremendous damage to coastal areas.

Also, according to a study by Jorgen Randers et al. (Nature, Scientific Reports, 10, 18456, 2020), even if greenhouse gas emissions could be immediately reduced to zero, global temperatures would rise by 3° C. compared to pre-industrial levels by 2500, and sea levels would rise by 3 meters. This is because the $CO_2$ already released will remain in the atmosphere for thousands of years and will continue to thaw the Arctic ice and carbon-containing permafrost. To avoid temperature and sea level rise, all anthropogenic greenhouse gas emissions had to be reduced to zero between 1960 and 1970. The study states that in order to limit the devastating effects on the earth's ecosystems and human society, more than 33 G tons of $CO_2$ (hereafter referred to as 33 Gt-$CO_2$/year) must be captured and removed from the atmosphere each year in parallel with efforts to reduce greenhouse gas emissions to zero.

Carbon offsetting is a concept in which after making efforts to reduce $CO_2$ and other greenhouse gases emitted in daily life and business activities, the greenhouse gases that are still emitted should be absorbed through afforestation and other means. And a state in which emissions and sinks are equal is called carbon neutral. (Virtually zero or net zero is also roughly synonymous with carbon neutral). The $CO_2$ capture and storage (CCS) technology involves the separation and recovery of highly concentrated $CO_2$ from exhaust gases generated at power plants, steel mills, oil refineries, and cement manufacturing plants by absorbing $CO_2$ into an alkaline solution, transporting $CO_2$ to a storage point by tanker or pipeline, and injecting $CO_2$ into a formation that can store it stably over a long period of time with minimal leakage. $CO_2$ capture, utilization, and storage (CCUS) technology involves attempts to recover resources (natural gas) by injecting recovered $CO_2$ into oil and natural gas fields. Demonstrations of these technologies are being conducted in various parts of the world.

However, in order to absorb $CO_2$ through afforestation, i.e., to absorb the global annual emissions on the scale of 32.8 Gt-$CO_2$/year (2017) through afforestation, it is necessary to increase new large plantation areas with the capacity to absorb 18 Gt-$CO_2$/year of the current global absorption capacity. In contrast, the CCS and CCUS technologies are positioned as a bridge to a sustainable energy system in the future because those technologies require significant cost and energy for $CO_2$ capture and storage, and there are limited carbonaceous deposit formations for storage. In addition, considering the necessity of the removal of more than 33 Gt-$CO_2$ from the atmosphere every year as previously mentioned, it is not easy to achieve carbon neutrality even if major companies cooperate fully in energy conservation. It is no exaggeration to say that there is still no technological roadmap to achieve the goals of the Paris Agreement.

This is supported by an editorial in a prominent scientific journal (Nature, Editorials, 592, 8, 2021). In other words, prior to the COP26 UN Climate Change Conference to be held in November 2021, approximately 124 of the 202 participating countries pledged to achieve net zero emissions by 2050, but what is important is the method of achieving the goal and a reliable monitoring system. For example, carbon emissions rights can be bought and sold as a commodity on the many carbon emissions rights trading markets established around the world. High-emitting countries can claim to have achieved net zero without actually reducing the total amount of carbon they release into the atmosphere through carbon emissions rights trading. Without concrete methods to achieve net-zero emissions and increased transparency, the goals of the Paris Agreement will never be achieved.

Therefore, creating a sustainable energy system in which almost all energy is carbon-free with no $CO_2$ emissions will make a significant contribution to the control of global warming. Concrete measures to achieve this can be summarized into the following three points, and these must be put into action immediately.

(1) Produce sufficient amounts of renewable energy to replace nearly all primary energy.

(2) Create a mechanism (system) to stably supply energy of renewable energy origin, whose supply fluctuates widely, to the supply destination facilities at low cost and with high quality.

(3) Systematically capture and remove the large amount of $CO_2$ already stored in the atmosphere.

The present invention provides concrete measures of achieving (1) and (2) by applying them to Japan as an example. Regarding (3), in accordance with the progress of carbon-free conditions due to (1) and (2), it is expected that the nature (forests and oceans) will absorb CO2 (18 Gt-CO2/year). In addition, it is expected that afforestation of destroyed forests will be made, and technologies to capture atmospheric $CO_2$ and remove it cheaply and reliably using, for example, organic polymer membranes, will be put to practical use at an early date.

The Earth's Energy Balance and Global Warming

The sun radiates 383 Yottawatt (YW) (Yotta: $10^{24}$) of energy, one billionth of which, 174 Petawatt (PW) (Peta: $10^{15}$) reaches the earth, 30% of the energy is reflected back to space by the atmosphere and clouds, and 19% is absorbed by the atmosphere and clouds. 89 PW, which is 51% of the energy, reaches the surface of the earth to warm the land and oceans. Photovoltaic energy that reaches the atmosphere generates atmospheric and water cycles (wind and rain) and becomes the source of much life activity and renewable energy through plant photosynthesis and other processes. The energy that warms the atmosphere and land surface stays in the atmosphere for a while in the form of heat, and eventually it is all re-radiated back into space as far-infrared radiation, whereby the energy balance is in equilibrium. Greenhouse gases such as $CO_2$ and methane derived from fossil fuels absorb some of the far-infrared radiation emitted from the earth's surface (8.5 W/m$^2$ in RCP 8.5), which changes the equilibrium state of the energy balance and causes global warming.

Looking at these from the perspective of the electromagnetic spectrum, at absolute zero (−273.15° C.) all atomic or molecular thermal vibrations cease, but all matter above this temperature radiates energy in the form of the electromagnetic spectrum. The higher the temperature, the shorter the wavelength of the electromagnetic spectrum; conversely, the lower the temperature, the longer the wavelength. As shown in FIG. 1A, the sun, which has a surface temperature of 5,500° C. radiates near-ultraviolet, visible light, and near-infrared energy with wavelengths ranging from 0.1 μm to 3 μm. In contrast, the earth, which appears to have an effective temperature of −20° C. from space, radiates far-infrared energy with wavelengths from 4 μm to 60 μm.

In addition, all atmospheric gases absorb energy at their own specific wavelength bands. As shown in FIG. 1B, water vapor (denoted by $H_2O$ in the figure), which is a natural greenhouse gas, strongly absorbs the electromagnetic spectrum over a wide wavelength range. However, the water vapor window, the wavelength band between 7.5 μm and 19.5 μm (water vapor window in the figure), is transparent and radiatively cools the earth by releasing far-infrared energy in the same band into space. In other words, the water vapor window plays an important role in maintaining the equilibrium state of the earth's energy balance.

Global and Japanese Primary Energy Consumption Trends

As shown in FIG. 2A, the global primary energy consumption continues to increase at an average annual rate of 2.5% with economic growth. (Scale: Million metric tons of oil equivalent (Mtoe)). Particularly since 2000, the growth of energy consumption in emerging economies in the Asia-Pacific region has been significant, and the share of developed countries (OECD countries) in the global energy consumption has dropped from 70.5% in 1965 to 40.9% in 2018. By energy type, oil consumption increased at an average annual rate of 2.5%, coal consumption increased at an average annual rate of 1.9%, and natural gas consumption increased at an average annual rate of 3.3%, which together accounts for 84.7% of the total primary energy consumption in 2018. Of the remaining non-fossil energy sources, hydropower accounts for 6.8%, nuclear power accounts for 4.4%, and renewable energy accounts for only a small 4.0%. If this condition continues, the greenhouse gas concentrations will continue to rise, causing catastrophic damage to the earth.

In contrast, as shown in FIG. 2B, Japan's energy consumption has been on a downward trend since peaking in 2005, as energy conservation has progressed in the wake of the first and second oil shocks and the Great East Japan Earthquake (Scale: Exajoules (EJ)). However, although oil consumption has decreased, coal and natural gas consumption has increased, and as of 2017, the dependence on fossil energy was 91.0%, which is higher by far than in Western countries (81.9% in the United States, 78.5% in the United Kingdom, 80.2% in Germany, and 49.0% in France). With the "Green Growth Strategy for Carbon Neutrality in 2050" formulated by the Ministry of Economy, Trade and Industry in December 2020, Japan is finally beginning to see moves to make renewable energy the main source of electricity, but, as will be discussed later, in terms of technology, Japan is lagging behind its foreign counterparts.

Based on the factors mentioned in the previous paragraph, assuming that energy consumption in Japan will not increase in the future due to the country's aging population and low birthrate, we set the target value for renewable energy production at Total Primary Energy Supply in Japan (TPESj)= 20 Exajoule/year (Exajoule (EJ): 1 EJ=$10^{18}$ Joule)= 5.5 PWh/year (Petawatt-hour (PWh) 1 PWh=$10^{15}$ watt-hour) in 2018 as shown by the down arrow in FIG. 2B. The following discussion will be made based on this target value.

The Potential for and Challenges of Primary Energy Conversion to Renewable Energy The "Japan's Renewable Energy Introduction Potential" published by the Ministry of the Environment in March 2020, a report for the purpose of achieving a zero-carbon city and promoting the mainstreaming of renewable energy based on the study made since FY2009, sets forth an estimate of the amount of renewable energy based on the following classification: the amount of available for use (that can be used with the current level of technology), the introduction potential (among the amount of available for use, the amount of energy resources excluding those that cannot be used due to various constraints), and the introduction potential by scenario (the amount of power generation that is expected to materialize if a purchase price related to business profitability is set). FIG. 3 is a table showing the comparison of the mentioned estimates (excerpt) with the target values of the Green Growth Strategy and the target values of TPESj. The figure specifically shows the comparison of the total energy production targets of one embodiment of the carbon-free energy supply system according to the present invention with the target values of "Japan's Renewable Energy Introduction Potential" by the Ministry of the Environment, and "Green Growth Strategy" by the Ministry of Economy, Trade and Industry respectively released in 2020.

In the Introduction potential, the total amount (Σ) of photovoltaic (solar) and wind power generation is 7,369 Terawatt-hour/year (TWh/year), which exceeds that of TPESj (134% of TPESj). However, at the purchase price of I (Σ①), the total amount (Σ) is only 1,015 TWh/year (18% of TPESj), at II (Σ②), 1,519 TWh/year (28% of TPESj), and at III (Σ③), 2,516 TWh/year (48% of TPESj).

The target value for offshore wind power generation in 2040 disclosed in the Green Growth Strategy is only 139 TWh/year (2.5% of TPESj). Moreover, the feed-in tariff for offshore wind power is set to about twice Japan's current industrial electricity rate of about 17 yen/kWh. Electricity rates in Japan are said to be about twice as high as in Europe and the United States, so that if wind power becomes the main source of electricity under the scenario shown in FIG. 3, electricity prices in Japan will be about four times higher than in Europe and the United States. The current announced plans would place a significant burden on industry and seriously undermine its competitiveness.

In contrast, offshore wind power generation in Europe generated 2,851 TWh as of 2019 as a result of the favorable wind environment and its proactive efforts to combat global warming. Europe is planning to expand offshore wind power generation compared to the year 2019 by about 8 times by 2030, and by 25 times by 2050, and some bids in Europe have already been sold at prices below 6 yen/kWh.

Potential for Offshore Photovoltaic Power Generation

In the power generation estimates in FIG. 3, the wind power generation estimates were made for both onshore and offshore, while the photovoltaic power generation estimates were made for onshore only. Since the method for estimating power generation is not publicly available, the introduction potential of offshore photovoltaic power generation cannot be estimated using the same method, but we made the following estimates based on publicly available data.

FIG. 4 is a map of the annual average solar radiation distribution on the earth's surface, including weather and day/night changes over a three-year period from 1991 to 1993, using data collected by geostationary meteorological satellites. The color shows the correspondence between the amount of solar radiation and color provided in the lower part of the figure, as well as the distribution of annual average solar radiation distribution on the earth's surface. Please refer to https://www.ez2c.de/ml/photovoltaic_land_area/, in which a map of the annual mean solar radiation distribution is shown in color.

To confirm the validity of the figure, we searched for annual average solar radiation for the island Minamitorishima in the solar radiation database viewing system published by the Japan Meteorological Agency (JMA), and found that the data in the figure was almost identical to the data of the JMA. The figure shows that the oceans within the approximately 30° north-south latitude region (hereafter referred to as the equatorial waters) and most of land have high annual average solar radiation levels of 220 $W/m^2$ or higher. The black circles (●) C1 to C6 marked on the deserts in the figure each represent the land surface area (Σ●=910,000 $km^2$) required to generate 3 TW by photovoltaic power generation, in which a photovoltaic cell conversion rate is assumed to be 8%. The annual average of 18 TWe ("e" in TWe refers to electricity) noted in the lower right of the figure means that 160 PWh of annual energy production is assumed.

If this amount of electricity generated is converted to 1 million metric tons of oil equivalent (Mtoe) in FIG. 2A, the amount would be 14,000 Mtoe, which is comparable to the world Total Primary Energy Supply (TPESw) in 2018 shown by the red down pointing arrow in FIG. 2A. Deserts are often desolate and hot areas where strong winds make it difficult for soil to stay in place and rocks are exposed, where performance degradation of photovoltaic power generation is significant due to high temperatures, and therefore deserts are not suitable for photovoltaic power generation. Even in the preceding explanation of the distribution map in FIG. 4, photovoltaic power generation in deserts is not recommended.

In contrast, referring to FIG. 4, the annual average solar radiation in Japan (designated by J in the figure) ranges from 130 to 180 $W/m^2$. Fortunately, Japan has an Exclusive Economic Zone (EEZ) that is uniquely large in the world, and in the waters within the ellipse, which is on the right side of the Tropic of Cancer marked with an X, the annual average solar radiation is as high as from 220 to 260 $W/m^2$.

This means that the offshore photovoltaic power generation in the water area has high output and inexhaustible energy potential. Based on an assumption that an average solar radiation is 240 $W/m^2$ and a conversion efficiency is 16%, offshore photovoltaic power generation would generate a quantity of carbon-free energy equivalent to TPESj in an area about the size of the black circle (●) within the ellipse X (about 27,000 $km^2$ or about 2% of the surrounding EEZ). The United Nations Convention on the Law of the Sea stipulates that EEZs have "sovereign rights" over natural resources and natural energy, and "jurisdiction" over the establishment of artificial islands and facilities, environmental protection and conservation, and marine research, and therefore there would be no problem with offshore photovoltaic power generation within the EEZ.

Furthermore, as shown in the figure, the equatorial waters have more than enough potential of an ocean area to accommodate the aforementioned 910,000 $km^2$. If the United Nations Convention on the Law of the Sea and other treaties are revised so that offshore photovoltaic power generation is carried out in these waters beyond the framework of nations, EEZs, and on the high seas, in combination with wind power and other sources, it is easy to imagine that all of the world's primary energy demand, which will continue to increase, could be met by carbon-free renewable energy.

Incidentally, because the back surface temperature of the photovoltaic modules can be kept at sea water temperature, the amount of photovoltaic power generated in the 910,000 $km^2$ equatorial waters is about twice the amount of power generated in the same area of the desert, which is equivalent to about twice the amount of global primary energy consumption in 2018. Even if energy consumption continues to increase at an average annual rate of 2.5%, the amount of photovoltaic power generated in this area will meet the Estimated Primary Energy Demand (2TPESw) by around 2050. Even if global primary energy consumption continues to increase after 2050, there is still sufficient renewable energy resource potential. However, as the area of ocean covered by floating offshore plants becomes large, the area of ocean that will lack sunlight becomes vast, which would result in a decrease in phytoplankton. This will be explained later in an embodiment based on the environmental assessment.

Now referring to the drawings, a carbon-free energy supply system and a floating offshore photovoltaic power generation plant according to an embodiment of the present invention will be described.

Overall Structure of the Carbon-Free Energy Supply System

A carbon-free energy supply system 10 shown as an example in FIG. 5 includes an energy carrier system 200, the energy carrier system 200 including one or more floating offshore photovoltaic power generation plants 100, one or more first energy conversion devices 210, one or more second energy conversion devices 220, one or more third energy conversion devices 230, part or all of one or more energy carrier storage devices 240, and one or more energy conversion supply devices 250, and one or more submarine cables 300, one or more offshore wind power generation plants 400, and one or more management and control devices 700 that manage and control the carbon-free energy supply system 10, which include supply destination facilities 500.

The carbon-free energy supply system 10 may be provided with one or more power plants using different renewable energy resources, such as one or more offshore wind power generation plants 400.

One or more of the carbon-free energy supply systems 10 can be scaled to supply nearly all or part of the energy needed to meet the total primary energy demand of a given region, such as one or more nations, or on a global scale.

The carbon-free energy supply system 10 is not limited to the configuration mentioned in paragraph 0053. For example, in the case where the carbon-free energy supply system 10 supplies energy specifically to a particular industry; such as the steel industry or an airport, if supply destination facilities 500 includes any one or more of a second energy conversion device 220 equivalent, a third energy conversion device 230 equivalent, or an energy carrier storage device 240 equivalent, the carbon-free energy supply system 10 may not include such devices.

Furthermore, for example, if the supply destination facility 500 is a power system, the energy conversion device 210 and the energy conversion supply device 250 are implemented as an integrated device, and when power swings, including power failures, voltage drops, and frequency drops due to power plant accidents, occur in the power system, the integrated device may function as a self-activated high-voltage substation that controls AC voltage and active power, and supplies reactive power to suppress power swings to avoid large-scale power failures (blackouts).

One or more floating offshore plants 100 may be scaled such that almost all or part of the total energy demand required by a country or a certain region or a particular industry is met by power generation using renewable energy resources.

The power generated by each floating offshore plant 100 is transmitted to the first energy conversion device 210 via one or more submarine cables 300. The submarine cable 300 may include an optical fiber for packet communication of sensor information and control signals, and a small power transmission cable to supply power to an amplifier for amplifying signals that are attenuated in the optical fiber.

This submarine cable 300 is configured as a high-voltage DC submarine power transmission cable, and as described in the following, the transmission loss of high-voltage DC power transmission at a cable length of 1000 km can be reduced to about 3%. With such performance, it is possible, for example, to install the floating offshore plants 100 in the seas around Japan (Japan's EEZ near the Tropic of Cancer), and lay submarine cables 300 to transmit power to Japan, as described later.

The first energy conversion device 210 stabilizes the power transmitted from the multiple floating offshore plants 100 via submarine cables 300, and the energy conversion supply device 250 may convert energy (e.g., voltage transformation, and DC/AC conversion) to meet the respective standard of the DC power system or AC power system, which is one of the supply destination facility 500, supply the power to the respective systems. The energy conversion supply device 250 may also transmit surplus power to the second energy conversion device 220. A specific example of the first energy conversion device 210 is a so-called power conditioner that stabilizes power fluctuations by charging and discharging lithium-ion batteries or lead-acid batteries. The energy conversion efficiency of the first energy conversion device 210 is assumed to be about 95%.

The second energy conversion device 220 uses the power transmitted from the first energy conversion device 210 to produce hydrogen. The hydrogen produced by the second energy conversion device 220 is supplied to the third energy conversion device 230. An example of the second energy conversion device 220 is a hydrogen generator that generates hydrogen by electrolyzing water or seawater with direct current power. The energy conversion efficiency of the second energy conversion device 220 is assumed to be about 80%.

The third energy conversion device 230 synthesizes energy carriers using hydrogen produced by the second energy conversion device 220 as a raw material or part of a raw material. Energy carriers include high-pressure hydrogen gas ($H_2$), liquid hydrogen ($LH_2$), liquefied ammonia ($NH_3$), and methylcyclohexane (MCH), as shown in FIG. 6. From the viewpoint of long-term mass stockpiling, liquefied ammonia is suitable as an energy carrier because of its high volumetric and mass energy densities and its long track record as a raw material for fertilizers, but MCH, high-pressure hydrogen gas, or liquid hydrogen, which can be stored at ambient temperature and pressure, may be used depending on the characteristics of the supply destination facilities 500.

An example of the third energy conversion device 230 is an $NH_3$ synthesizer. The energy conversion efficiency of the $NH_3$ synthesizer is assumed to be around 90%. FIG. 6 shows the types of energy carriers used in one embodiment of the carbon-free energy supply system according to their characteristics and the present invention.

The energy carrier storage device 240 stores the energy carriers synthesized by the third energy conversion device 230 in a predetermined amount, for example, up to about six months capacity. For example, if half of the TPESj is to be stored in $NH_3$, storage tanks for approximately 694 GL would be required. $NH_3$ has similar characteristics to Liquefied Petroleum Gas (LPG), so that LPG storage tanks could be converted to $NH_3$ storage tanks by refurbishing them. Although the total capacity of LPG storage tanks in Japan as of 2017 is a tiny amount of 1.5 million tons (2.7 ML), as the implementation of the carbon-free energy supply system 10 progresses, eventually all LNG storage tanks (17 GL), nuclear power plants, oil storage tanks (81 GL), and coal accumulation sites will no longer be needed, and if these sites are converted to $NH_3$ storage tanks, a substantial amount of installation space for the tanks can be acquired.

The next section discusses the rate at which the hydrogen should be converted to and stored in $NH_3$ by TPESj/2 while the generated power is transmitted to the power system during the installation phase of the floating offshore plants 100. Assuming that the amount of renewable energy generation increases by an equal amount d each year from the start of installation, that α % of the generation is converted to $NH_3$ and is stored, and that after n years the amount of generation reaches TPESj and the amount of stockpiles reaches TPESj/2 at the same time, from the equation of the isometric series, $$dn = TPESj$$

$$n(n+1)d\alpha/2 = TPESj/2 = dn/2$$

is formed, and from this, we obtain $\alpha=1/(n+1)$, where $\alpha=50\%$ for n=1 and $\alpha=10\%$ for n=9.

That is, in the case of a construction plan in which annual power generation reaches TPESj/2 and is completed 9 years after the start of construction, during the construction period, 10% of the annual production (electricity) will be converted into energy carriers and stored while responding to daily and seasonal variations in the amount of sunlight. Once completed, production and demand will be in equilibrium and will respond to daily and seasonal fluctuations. From December to February, when energy demand exceeds production, the amount of energy supplied to consumers from energy carrier storage increases, and from May to October, when energy production exceeds demand, the amount of surplus power converted to energy carriers and stored increases. Even if there is an imbalance between supply and demand due to abnormal weather or other reasons, a storage of about half a year's worth should be able to handle such an imbalance through interchange between storage tanks. However, it is necessary to set and update appropriate energy carrier stockpiles based on statistical data on past and future energy demand, operational performance data after the start of operation, and the characteristics of renewable energy generation using other renewable energy resources such as wind power and its ratio to total electricity generation.

The energy carriers stored in the energy carrier storage device 240 are taken out based on the difference between the demand at the supply destination facility 500, such as the power system, and the production by the floating offshore plant 100 (when the production is less than the demand, based on estimated or predicted figures according to changes in time and weather, and historical power demand and production data), and are transported by pipeline to the energy conversion supply device 250.

The energy conversion supply device 250 converts the energy carrier into an energy form suitable for supply destination facilities 500 to supply it to the facilities 500.

For example, the energy conversion supply device 250 generates predetermined DC power using energy carriers taken out from the energy carrier storage device 240 and transmits the power to a high voltage DC power system (HVDC), which is one of the supply destination facilities 500. Similarly, the energy conversion supply device 250 generates predetermined AC power using energy carriers taken out from the energy carrier storage device 240 and transmits the power to the AC power system, which is one of the supply destination facilities 500.

Examples of the energy conversion supply devices 250 include $NH_3$-fired generators and gas turbine combined cycle (GTCC) generators that can generate electricity with a thermal efficiency of over 60%, in which a gas turbine and a steam turbine are combined to decompose $NH_3$ with the waste heat from the gas turbine to extract hydrogen and burn it in a hydrogen-fired combustor. For comparison, even the latest thermal power generation using coal or oil as fuel has a thermal efficiency of over 40%, and even LNG has a thermal efficiency of over 50%.

The power output from the first energy conversion device 210 may be directly output to the energy conversion supply device 250, which converts the power to a predetermined DC power and transmits it to a DC power system (HVDC), one of the supply destination facilities 500. Similarly, the energy conversion supply device 250 may convert the power output directly from the first energy conversion device 210 into a predetermined AC power and transmit it to the AC power system, one of the supply destination facilities 500.

When the supplied power exceeds the power demand in the power system of the supply destination facility 500, the first energy conversion device 210 may be instructed to output the difference to the second energy conversion device 220. Conversely, when the supplied power is less than the demanded power, the energy conversion supply device 250 may take out energy carriers from the energy carrier storage device 240, convert them into the specified power (generate power), and supply the power to the power system of the supply destination facility 500, as previously described.

The high purity hydrogen output from the second energy conversion device 220 may be converted to liquid hydrogen (−253° C.), an energy carrier, in the third energy conversion device 230 and stored in the energy carrier storage device 240. The energy conversion supply device 250 may adjust the energy carrier (liquid hydrogen) taken out from the energy carrier storage device 240 to a predetermined flow rate and flow pressure to supply it to, for example, a liquid hydrogen storage tank, one of the supply destination facilities 500, provided at an airport where aircraft fueled with liquid hydrogen arrive and depart.

Examples of liquid hydrogen-fueled aircraft include a jet airliner powered by improved gas turbine engines, a propeller-driven aircraft powered by turboprop engines, and a propeller-driven aircraft powered by fuel cell-driven six-engine motors. These are being developed by Airbus under the "ZEROe" concept with the aim of entering service in 2035.

Liquid hydrogen can extract four times the energy of the same weight of jet fuel, but requires more weight and space for the container because the fuel must be kept at −253° C. However, since the temperature at the altitude of 10,000 m is −55° C. and the flight time is limited to about 12 hours, cooling performance is not required as much as on the ground.

The high-purity hydrogen output from the second energy conversion device 220 may be output directly to the energy conversion supply device 250, which converts the high-purity hydrogen to liquid hydrogen of the predetermined temperature (cooled to −253° C.) and supplies the liquid hydrogen to a liquid hydrogen storage tank at the airport, one of the supply destination facilities 500.

The energy conversion supply device 250 may pressurize the high-purity hydrogen output from the second energy conversion device 220 to a predetermined pressure and transport it by pipeline or tank truck to, for example, a high-pressure hydrogen storage tank of a hydrogen station, one of the supply destination facilities 500. In the future, electric vehicles (EVs) will be widely used for small cars such as town cars, while diesel vehicles such as large passenger cars and trucks are expected to be replaced by hydrogen gas fuel cell vehicles (FCVs) or hydrogen gas engine vehicles. As a side note, the hydrogen gas fuel cell in Toyota's MIRAI fuel cell system car weighs 32 kg, produces 174 hp, and has a range of 850 km. If two of the MIRAI's hydrogen gas fuel cells are connected, the horsepower is equivalent to that of a large truck diesel engine, and if three are connected, they can drive large trailers and highway buses, and are about ⅓ the weight of a large diesel engine.

The energy carrier ($NH_3$) output from the third energy conversion device 230 may be converted by the energy conversion supply device 250 into a different energy carrier, such as high-pressure hydrogen gas, liquid hydrogen, or MCH, and supplied to the supply destination facility 500.

The energy conversion supply device 250 may also convert the energy carrier ($NH_3$) taken out from the energy carrier storage device 240 into a predetermined hydrogen gas, pressurize it, and transport it by pipeline or tank truck to, for example, a high-pressure hydrogen storage tank of a hydrogen station, one of the supply destination facilities 500.

The difference between the preceding example and the case where the high-purity hydrogen output from the second energy conversion device 220 is pressurized and supplied to a hydrogen station is as follows, although the use of the energy carrier storage device 240 reduces the capacity of the high-pressure hydrogen storage tank installed at the hydrogen station, this requires a hydrogen purification function to manufacture hydrogen gas of high purity suitable for hydrogen fuel cells to be added to the energy conversion supply device 250 or to the front of the high-pressure hydrogen storage tank of the hydrogen station, which increases costs.

The energy conversion supply device 250) may also convert an energy carrier ($NH_3$) taken out from the energy carrier storage device 240 into a predetermined liquid hydrogen and supply it to a liquid hydrogen storage tank provided at an airport, one of the supply destination facilities 500. The difference between this example and the aforementioned case where the high-purity hydrogen output from the second energy conversion device 220 is converted to liquid hydrogen by the energy conversion supply device 250 and supplied to a liquid hydrogen storage tank is as follows: although the use of the energy carrier storage device 240 would reduce the capacity of liquid hydrogen storage tanks provided at an airport, this requires a hydrogen purification function to manufacture hydrogen gas of high purity suitable for hydrogen fuel cells to be added to the energy conversion supply device 250, which increases costs.

The energy conversion supply device 250 may also convert an energy carrier taken out from the energy carrier storage device 240 into a predetermined energy carrier to supply it to supply destination facilities 500.

The energy conversion supply system 250 may also adjust the energy carrier ($NH_3$) taken out from the energy carrier storage device 240 to a predetermined flow rate and flow pressure to supply it to an $NH_3$ storage tank, one of the supply destination facilities 500, in a port where $NH_3$-fired engine ships arrive and depart.

Next, the application of the carbon-free energy supply system to achieve zero-carbon steel in the steel industry will be described, the industry accounting for 40% (as of 2016) of the total $CO_2$ emissions of all industries. The steel industry is the backbone of other industries such as automobiles and industrial machinery. In ironmaking, iron ore ($Fe_2O_3$) and coke (C), a reducing agent that also serves as fuel, are fed into a blast furnace, and pig iron is extracted through multiple processes. These are expressed in the following lumped reaction equation.

$$1/2\cdot Fe_2O_3+C+1/4\cdot O_2\rightarrow Fe+CO_2$$

This shows that the processes emit a process-derived $CO_2$. whose amount is molecularly equivalent to that of iron.

On the other hand, hydrogen-reduced steelmaking, which aims for zero-carbon steel, uses hydrogen instead of coke, whose processes are expressed in $$1/2\cdot Fe_2O_3+3/2\cdot H_2\rightarrow Fe+3/2\cdot H_2O$$

Pig iron can be extracted without emitting $CO_2$. However, there is a gap of about 10 times (or several times the price of electricity in Europe and the U.S.) between the kWh equivalent price of coke and that of the current industrial electricity required for hydrogen production, so that zero-carbon steel with industrial power can cause steel prices to skyrocket and have a major impact on the industry as a whole. If hydrogen could be supplied for about the sum of the current price of coke and CCS/CCUS costs, we could see the steel industry go carbon-free.

The concrete processes to realize such an outcome are as follows:

(a) If the HVDC direct current system is operated in parallel with the AC power system, direct current power is drawn into the steel mill, hydrogen is generated in the second energy conversion device 220, the generated hydrogen is converted (pressurized) into high pressure hydrogen gas, one of the energy carriers, in the third energy conversion device 230, and stored in the energy carrier storage device 240. The high-pressure hydrogen gas is then taken out of the energy carrier storage device 240, the flow rate and flow pressure of the hydrogen gas are adjusted by the energy conversion supply device 250, and the gas is supplied to the blast furnace at the supply destination facilities 500.

(b) The submarine cables 300 from the floating offshore plant 100 are landed at the steel mill, hydrogen is generated by the first energy conversion device 210 and the second energy conversion device 220, the generated hydrogen is converted into high-pressure hydrogen gas, one of energy carriers, by the third energy conversion device 230, and stored in the energy carrier storage device 240. The high-pressure hydrogen gas is taken out from the energy carrier storage device 240, the flow rate and flow pressure of the hydrogen gas are adjusted by the energy conversion supply device 250, and the gas is supplied to the blast furnace. If surplus power is generated, it is transmitted (sold) to the power system. If the amount of electricity supplied from the floating offshore plant 100 is insufficient due to continuous stormy weather and the stockpile of energy carrier storage unit 240 in the steel mill falls below a certain amount, the $NH_3$ energy carrier storage unit 240 outside the steel mill could be used to transport $NH_3$ through a pipeline and use the waste heat from the blast furnace to decompose $NH_3$ into energy. Then, the energy conversion supply device 250 decomposes $NH_3$ using waste heat from the blast furnace to convert $NH_3$ to hydrogen, and feeding the hydrogen to the blast furnace.

The theoretical value of the amount of electricity required for water electrolysis to obtain hydrogen is 39.6 Wh/g-$H_2$), and if the energy conversion efficiency of the second energy conversion device 220 in (a) or (b) is 80%, the domestic pig iron production of 77.4 Mt—Fe (in 2018) would require 4.2 Mt—$H_2$ for reduction and 208 TWh of electricity for the production of hydrogen for reduction. This amount is equivalent to the electricity generated by 36.4 floating offshore plants, as described in the following. Assuming that the introduction of carbon-free energy supply systems in Japan and abroad will result in a DC electricity unit price of 5 yen/kWh, the production cost of hydrogen for reduction will be 1.04 trillion yen, equivalent to about 6.4% of 16.3 trillion yen, which is the market size of the steel industry (in 2018). For comparison, assuming that the import cost of coke required to produce 77.4 Mt—Fe is about 586 billion yen (Chinese coke price: about 35,200 yen/t-coke) and the CCS cost of $CO_2$ is about 378 billion yen (for more than 1 Mt/year, 6,186 yen/t-CO 2), the total cost would be about 0.96 trillion yen, which is almost the same as the production cost of hydrogen for reduction.

Part or all of the floating offshore plant 100, the first through third energy conversion devices 210-230, the energy carrier storage device 240, the energy conversion supply device 250, the submarine cables 300, the offshore wind power generation plant 400, and the supply destination facilities 500 are managed and controlled by one or more of management and control devices 700. Details of the management and control device 700 will be described later.

Although multiple embodiments have been described in the preceding regarding the carbon-free energy supply system 10, the present invention is not limited to these. For example, the renewable energy sources in the carbon-free energy supply system 10 include not only the floating offshore photovoltaic power generation plants 100, and offshore wind power plants 400 shown in FIG. 5, but also onshore wind power plants, onshore photovoltaic power generation plants, geothermal power plants, small and medium-sized hydroelectric power generation plants, which are not shown.

A "renewable energy source" is an energy resource that originates from photovoltaic, geophysical, or biological sources, by which energy is replenished on a steady or recurring basis according to nature at a rate faster than it is utilized. Therefore, as the carbon-free energy supply system 10 of the present invention enables, if the renewable energy sources are expanded without being bound by preconceived notions, mankind will be able to use carbon-free energy inexhaustibly, inexpensively, and stably for many years in the future. Furthermore, increasing the diversity of renewable energy resources will level out the temporal variability and seasonal unevenness of electricity generated from renewable energy sources, increase the utilization efficiency of the energy carrier system 200, and reduce the maximum storage capacity of the energy carrier storage device 240 from six months (TPESj/2) to, for example, four months (TPESj/3), resulting in a more affordable, sustainable, and stable supply of energy.

The carbon-free energy supply system 10 is not limited to the preceding embodiments. but includes energy conversion devices 210-230, energy carrier storage devices 240, energy conversion supply devices 250 that can have various functions, devices integrating energy conversion devices 210, energy conversion supply devices 250 and combinations of those devices with multiple energy carriers, such as liquefied ammonia, and high-pressure hydrogen gas in addition to the various power generation plants described in the preceding. Enabling flexibility in combination, i.e., providing a wide range of choices, according to the characteristics of the supply destination facilities 500, is one of the characteristics that the carbon-free energy supply system 10 must have to replace all primary energy supplies.

Floating Offshore Photovoltaic Power Generation Plant Configuration

The following describes an example of one application of the floating offshore plant 100, assuming that the carbon-free energy supply system 10 of the present invention is installed in Japan to supply carbon-free energy thereto.

The "total energy demand" targeted by the carbon-free energy supply system 10 of the present invention is TPESj (20 EJ=5.5 PW), which is set based on the Report shown in FIG. 2B.

In order to achieve this target value, the relationship between the location where the floating offshore plant 100 is installed and its annual average solar radiation distribution must be considered. As mentioned earlier referring to FIG. 4, whereas the annual average solar radiation in J in Japan is 130-180 W/$m^2$, the annual average solar radiation in Japan's EEZ near the Tropic of Cancer (within the ellipse indicated by X) is as high as 220-260 W/$m^2$. Therefore, installing the floating offshore plant 100 in this area of the ocean enables to generate high output photovoltaic power.

FIG. 7 shows Japan's EEZ. There is a vast waters south of 30° N, where the average annual solar radiation is high, and there are many islands that are candidates for the establishment of maintenance bases. FIG. 8 shows the average annual sunshine hours for the islands in the surrounding sea area suitable for the installation of one embodiment of the floating offshore photovoltaic power generation plant of the present invention, assuming that the generated energy is to be supplied to Japan. FIG. 8 shows the meteorological data published by the JMA. This shows that, in particular, the island Minamitorishima has a sunshine hour rate of 32% throughout the year, which is 1.5 times higher than the average for Japan. Although no meteorological data is available, FIG. 4 indicates that the island Okinotorishima is expected to have a higher sunshine hour rate. Although the straight-line distance from Okinotorishima to the Osumi Peninsula is 1,293 km and from Minamitorishima to the Boso Peninsula is 1,813 km, the transmission loss due to submarine cables is as low as 4-5%. Within 200 nautical miles of these two islands alone, there are more than 860,000 km$^2$ of water, most of which is deeper than 200 meters, which means more than 31 times the area needed for the production of TPESj is within the EEZ. As described in the following paragraph 0108, providing floating lighthouses 136 on a floating offshore plant 100 would ensure safety of vessels without interfering their navigation. In the future, it will be necessary to conduct a detailed study of the weather, ocean conditions, fisheries, and shipping routes in the surrounding sea area, and then revise the Renewable Energy Sea Area Utilization Law and other laws to select a promotion zone.

FIG. 9 shows an example of the configuration and performance characteristics of one embodiment of a floating offshore plant 100, in which one million photovoltaic panels per floating offshore plant are flexibly connected to form a honeycomb structure to disperse and absorb complex impact forces caused by waves and wind. The floating offshore plant has a logical three-tiered structure, with the small aggregate consisting of 100 photovoltaic panels connected in series, the medium aggregate consisting of 100 small aggregates connected in insulated series, and the large aggregate consisting of 100 medium aggregates connected in tree structure in parallel or in parallel (these connection relationships are hereinafter referred to as series-series-parallel connections) to form a floating offshore plant with an average annual generation power of 652 MW/unit.

This power generation capacity is equivalent to one large gas turbine combined cycle (GTCC) generator. The floating offshore plant 100 takes up an area of 28.1 $km^2$ and produces 5.71 TWh of electricity per year. According to the table in FIG. 9, if all TPESj were to be met by the floating offshore plant 100 alone, 963 units would be required. They would cover a total area of about 27,000 $km^2$ (or about 1.4 times the area of Shikoku), which would be enough to produce the equivalent amount of primary energy needed in Japan. The generated energy is transmitted to the energy carrier system 200 on the land via submarine cables with a total length of about 1,500 km. As previously mentioned, DC power transmission has almost no capacitance loss or dielectric loss, so that the transmission loss per 1,000 km is extremely low at 3%.

In FIG. 9, 240 $W/m^2$ was used as the prescribed annual average solar radiation level, but a lower annual average solar radiation level may be used if the project is viable. For example, under the feed-in tariff system, a project can be viable even in offshore areas with lower average annual solar radiation, and if the introduction of the carbon-free energy supply system 10 spreads to other parts of the world, the system cost will decrease due to the economies of scale effect described later, and the project will be profitable even in offshore areas with lower average annual solar radiation.

Conversion Efficiency and Power Generation of Photovoltaic Cell Modules

Various materials and forms of photovoltaic cells are still being researched and developed, including silicon-based monocrystalline/polycrystalline/amorphous, compound, multi-junction, and quantum dot types, some with cell conversion efficiency exceeding 47%. The conversion efficiency of photovoltaic cells in modules is a little less than 30% lower than the cell conversion efficiency due to wiring space and other requirements. The current cell conversion efficiency of polycrystalline silicon, which is widely used in industrial applications, is around 20%, but when incorporated into modules, the conversion efficiency thereof is about 14.3%. The conversion efficiency is the efficiency at the reference measurement condition (25° C.), and the output power decreases as the temperature at the back of the module increases at the rate of the output temperature coefficient, which is −0.4%/° C. for crystalline systems.

The aforementioned desert conversion efficiency of 8% corresponds to the case where polycrystalline silicon is used and an average backside temperature during sunlight is 41° C. In contrast, the annual average sea surface temperature near the Tropic of Cancer is about 26.2° C. If the back surface temperature of the photovoltaic cell modules in the floating offshore plant 100 is kept at sea water temperature, the average annual decrease in conversion efficiency will be about 0.5%.

Since various R&D efforts are being made to improve the conversion efficiency of photovoltaic cells, and assuming that the conversion efficiency of industrial photovoltaic cells will improve by about 12% in the near future (cell conversion efficiency of 22.4%), the photovoltaic cell module conversion efficiency $\mu_{sc}$ in FIG. 9 was set at 16% (where module temperature is 25° C.).

JIS C8918, which defines the product standard labeling for crystalline photovoltaic cell modules, defines reference conditions (module temperature: 25° C., spectral distribution: AM 1.5, and standard solar radiation: $E_{std}$=1000 $W/m^2$) so that the measurement conditions are the same. The nominal maximum output $P_{max}$ (kW), the system capacity $C_{sys}$ (kW), and the annual power generation $EE_{yr}$ ($kWh/m^2$/day) under said reference conditions is to be calculated using the following equation.

$$P_{max} = \mu_{sc} \times A_p \times E_{std}$$

$$C_{sys} = P_{max} \times N_p$$

$$EE_{yr} = V_{sys} \times E_{avg} \times L_f \times 365 \text{ days} \div E_{std}$$

where $A_p$ is the panel light-receiving area ($m^2$), $N_p$ is the number of panels, $E_{std}$ is the annual average solar radiation ($kWh/m^2$/day), and $L_f$ is the loss factor.

The module temperature of 25° C. means that the conversion efficiency is measured with the back surface temperature at 25° C. On land, the module temperature can be 20-40° C. higher than the outside temperature, and the loss due to this is calculated as a loss factor. AM 1.5 is a value that indicates how much sunlight has passed through the atmosphere, which corresponds to a photovoltaic altitude angle of 42° and is the standard value in Japan. For the reference solar radiation $E_{std}$, the amount of solar radiation at AM 1.5 is assumed to be 1000 W/m2. On a side note, at a photovoltaic altitude angle of 90°, the value is AM 1.0, and the solar radiation is 1100 $W/m^2$.

The all sky solar radiation is the sum of the horizontal component of the light reaching the ground directly from the sun (direct solar radiation) and the light reaching the ground after being scattered or reflected by particles in the atmosphere (scattered solar radiation), and the all sky solar radiation is measured with a pyranometer installed horizontally. Searching for the annual all sky solar radiation of the island Minamitorishima using the NEDO's Solar Radiation Database Browsing System, which includes the average solar radiation for 29 years (1981-2009) at 837 sites in Japan, provides the maximum value of 234 $W/m^2$, average value of 216 $W/m^2$, and minimum value of 210 $W/m^2$ when the photovoltaic cells were installed facing directly south, which were almost identical to the annual average all sky solar radiation in FIG. 4. The average optimum tilt angle of the photovoltaic module (average of monthly optimum tilt angles) is 20.6°, the direct solar radiation component is about 84%, and the scattered solar radiation component is about 14%. Thus, the average solar radiation on Minamitorishima can be increased by about 4% if the photovoltaic cell modules are installed at a tilt angle of 20.6°, facing due south.

The annual average all sky solar radiation $E_{avg}$ near the island Okinotorishima (not covered by the JMA), which is closer to the equator than Minamitorishima, is estimated to be 240 $W/m^2$ and the optimum tilt angle is 15° according to FIG. 4.

The loss factor $L_f$ is caused by triggers including output decrease due to temperature rise of photovoltaic cell modules, conversion loss by so-called power conditioning, loss in wiring and circuits, dirt on the light-receiving surface of photovoltaic cell panels, and aging of photovoltaic cells. The labeling guidelines of The Japan Photovoltaic Energy Association (JPEA) state that the factor is approximately 0.7 to 0.8. In contrast, the loss factor coefficient $L_f$ in FIG. 9 is set to 0.85 because the output of the floating offshore plant 100 is less affected by temperature rise (annual average loss of about 3%), the light-receiving surface of the photovoltaic panels is frequently cleaned by a cleaning robot (annual average loss of about 1%), the loss by the aging of the photovoltaic cells is expected to average about 3% over 20 years, and the submarine cable loss is expected to be about 5%. Because the so-called power conditioning is performed by the first energy conversion device 210 in the energy carrier system 200, it is excluded in estimating the loss factor of the floating offshore plant 100.

Structure of Photovoltaic Panel

As shown in FIG. 5, FIG. 10*a*, FIG. 12*a*, and FIG. 19, the floating offshore plant 100 is configured such that multiple photovoltaic panels 110, each of which has a substantially regular hexagon shape in plan view; are connected in a honeycomb structure in plan view.

Each photovoltaic panel 110 functions as a floating object and can be submerged to a predetermined submersible depth by pouring in water and floated by draining water from the panel housing 112.

As shown in FIGS. 10A and 10B, the photovoltaic panels 110 adjacent to each other are configured to have a dimension L of 3 m on each side, a width dimension L1 of 5.2 m, a width dimension L2 of 5.7 m including an elastic shock absorbing member 111 described later, and a thickness dimension L3 of 60 cm. The distance dimension L4 between mutually adjacent photovoltaic cell panels 110 is 50 cm.

The numerous photovoltaic cell modules forming each photovoltaic panel 110 shown in FIG. 10A are configured, for example, to a height of 10 cm and are arranged adjacent to each other with an angle of inclination of about 15° toward the horizontal.

The panel housing 112, which forms the photovoltaic panel 110, is provided with a number of orthogonal beams 110*c* arranged in the plane direction as structural members.

The photovoltaic panels 110 adjacent to each other are elastically in contact with each other via the elastic shock absorbing members 111 provided at the apexes 110*a* in the planar view of each photovoltaic panel 110, so that the photovoltaic panels 110 are flexibly connected to be swingable between each other in a vertical direction.

In this case, arrows a and b in FIG. 10B show the state in which deflection of the elastic shock absorbing members 111 absorbs the forces generated by the photovoltaic panels 110 adjacent to each other when the photovoltaic panels 110 sway mutually due to the effect of waves on the sea surface or other factors.

As shown in FIG. 10A, in the photovoltaic panels 110 adjacent to each other, the panel housings 112 are mechanically connected to each other and the electrical elements in the panel housings 112 are electrically connected to each other via a close-coupled automatic coupler (sometimes referred to as a “coupler”) 117 provided on the sides of each photovoltaic panel 110 in the plan view.

The close-coupled automatic couplers 117 are provided on each side of each photovoltaic panel 110 except for photovoltaic panels 110E, which are arranged on the periphery of the floating offshore plant 100, with six couplers being provided to each photovoltaic panel 110, and are flexibly connected to other photovoltaic panels 110 adjacent to each other in all directions of the plane.

As shown in FIG. 10B, the top of the panel housing 112 of the photovoltaic panel 110 is covered with a tempered glass 112G with an anti-reflective coating, and a number of photovoltaic cell modules 113 are laid below the glass 112G at an angle of about 15° inclination. The photovoltaic module 113 is subjected to a maximum of ±2.6 kV ground (sea level) voltage, as described in the following. The glass has a high dielectric strength of about 10 kV/mm, but to prevent salt from infiltrating the joints between the tempered glasses 112G and the joints between the tempered glass 112G and the panel housing 112 to cause dielectric breakdown, a transparent insulating filler 114 can be filled between the tempered glass 112G and the photovoltaic module 113. In addition, a high thermal conductivity insulating resin (not shown) may be placed on the back of the photovoltaic cell module 113 to maintain the back temperature of the module 113 at sea water temperature.

The panel housing 112 has a structure such that seawater W can be poured into and drained from the housing 112. At the bottom of the panel housing 112 are provided a compressed air tank 115 that stores compressed air, and a circuit box 116 that houses a control circuit (not shown).

The control circuitry in the circuit box 116 performs the following control procedures:

- transmitting power generated by the photovoltaic module 113 to the adjacent photovoltaic panel 110;
- taking power transmitted from the land and transmitting it to the adjacent photovoltaic panels 110 to maintain the floating offshore plant 100 when power is not being generated, such as during the night;
- controlling the close-coupled automatic coupler 117;
- switching the connection of a photovoltaic panel to a power circuit coupler of other adjacent photovoltaic panels in the event of a failure of the photovoltaic panel;
- and exchanging management and control commands with a management and control device 710 that manages and controls the floating offshore plant 100, which is described later.

The space at the lower part of the panel housing 112, other than that of the compressed air tank 115 and the circuit box 116, serves as a tank for collecting seawater W. To prevent seawater W from moving in the inclined direction and upsetting the balance of the entire floating offshore plant 100 as a result of the inclination of the photovoltaic panels 110 due to waves and other factors, a partition with multiple small holes or a retractable partition, for example, can be provided at the lower part of the panel housing 112 to control the movement of seawater W.

As shown in FIGS. 11A and 11B, the close-coupled automatic coupler 117 includes a first coupler 117A and a second coupler 117B. The first and second couplers 117A and 117B have housings 118A and 118B of the same shape and dimension, and the base of the housings 118A and 118B are provided with universal joints 119A and 119B that are swingably and flexibly connected to the photovoltaic panels 110, and the tips of the couplers 117A and 117B are provided with seals members 120A and 120B, which serve as covers and packing. The leading ends are provided with sealing members 120A and 120B, which function as covers and gaskets.

As shown in FIG. 11B, inside the housings 118A and 118B, connecting bolts 121A and 121B and connecting nuts 122A and 122B are arrange such that the connecting bolts 121A and 121B and connecting nuts 122A and 122B face each other to be staggered in the width direction in the joining direction. In other words, when the tips of both housings 118A and 118B are facing each other, the connecting bolt 121A of the first coupler 117A faces the connecting nut 122B of the second coupler 117B, and the connecting bolt 121B of the second coupler 117B faces the connecting nut 122A of the first coupler 117A.

Drive mechanisms 123A and 123B are provided inside the housings 118A and 118B, which drive the connecting bolts 121A and 121B in forward and reverse rotations. The tips of the enclosures 118A and 118B are butted against each other, and the drive mechanisms 123A and 123B rotate the connecting bolts 121A and 121B forward, so that the connecting bolts 121A and 121B screw together with the connecting nuts 122A and 122B. This results in a tight and automatic connection between the first and second couplers 117A and 117B.

Coupling operations of the photovoltaic panels are performed as follows. The photovoltaic panels 110A and 110B are lifted to, for example, about 1.5 m above sea level by an after-mentioned transport and assembly robot 600 to be coupled together. The sealing members 120A and 120B of the close-coupled automatic couplers 117A and 117B cover the close-coupled automatic couplers 117A and 117B to prevent seawater components from infiltrating them until just before coupling. The sealing members 120A and 120B are opened such that a camera shutter is opened (not shown) when the photovoltaic panels 110A and 110B are coupled, and at the same time, dry compressed air, which has been pre-filled in the compressed air tank 115B of the photovoltaic panel 110B newly transported by the transport and assembly robot 600, is injected from the compressed air injection nozzle 128B. Then, seal members 120A and 120B are tightly connected while blowing off seawater components to prevent salt from remaining on the inside of the close-coupled automatic coupler 117, which includes power path connectors 126A and 126B and signal line connectors 125A and 125B. This coupling operation prevents insulation breakdown in the power path connectors 126A and 126B and the close-coupled automatic couplers 117, where DC high voltage currents of up to ±250 kV are flowing.

When the photovoltaic panel 110F is removed due to a failure of the photovoltaic panel 110, the drive mechanisms 123A and 123B reverse the connecting bolts 121A and 121B to automatically disconnect the first coupler 117A from the second coupler 117B, and at the same time the sealing members 120A and 120B are sealed to prevent seawater components from infiltrating into the close-coupled automatic couplers 117A and 11B. The drive mechanisms 123A and 123B are controlled by the control circuit in the circuit box 116.

As shown in FIG. 11A, multifunctional connectors 124A and 124B are provided inside the enclosures 118A and 118B. Both multifunctional connectors 124A and 124B are configured to be connected to each other as the connecting bolts 121A and 121B and the connecting nuts 122A and 122B are screwed together and fastened.

Multifunctional connectors 124A and 124B include communication path connectors 125A and 125B, power path connectors 126A and 126B, and compressed air pipe connectors 127A and 127B, As the connecting bolts 121A, 121B and connecting nuts 122A, 122B are screwed together and fastened, the communication path connectors 125A on the first coupler 117A side and 125B on the second coupler 117B side are connected to each other, the power path connector 126A on the first coupler 117A side and the power path connector 126B on the second coupler 117B side are connected to each other, and at the same time, the compressed air pipe connector 127A on the first coupler 117A side and the compressed air pipe connector 127B on the second coupler 117B side are connected to each other.

As shown in FIG. 11B, ducts 129A and 129B extend from housings 118A and 118B, respectively. The duct 129A of the first coupler 117A is connected to the photovoltaic panel 110A to which the universal joint 119A of the first coupler 117A is connected. The duct 129B of the second coupler 117B is connected to the photovoltaic panel 110B to which the universal joint 119B of the second coupler 117B is connected.

The universal joints 119A and 119B enable flexible connection of individual photovoltaic panels 110 with each other, and as a result, stresses in the vertical direction caused by waves, wind, and rain, in particular, can be effectively released.

The communication path connector 125A, power path connector 126A, and compressed air pipe connector 127A of the multifunctional connector 124A of the first coupler 117A are connected or coupled, through the duct 129A of the first coupler 117A, to the communication path, power path and air conduit within the photovoltaic panel 110A, to which the universal joint 119A of the first coupler 117A is connected.

The communication path connector 125B, power path connector 126B, and compressed air pipe connector 127B of the multifunctional connector 124B of the second coupler 117B are connected or coupled, through the duct 129B of the second coupler 117B, to the communication path, power path and air conduit within the photovoltaic panel 110B, to which the universal joint 119B of the second coupler 117B is connected.

The power path connectors 126A and 126B of the multifunctional connectors 124A and 124B form part of the power paths for electrically connecting the power paths of the photovoltaic panels 110 adjacent to each other. The multifunctional connectors 124A and 124B are provided with control circuits (not shown) that perform control of switching the connection of an adjacent photovoltaic panel 110 to the power path of another adjacent photovoltaic panel 110 when a fault occurs on said adjacent photovoltaic panel 110, as described later referring to FIG. 19.

The communication path connectors 125A and 125B of the multifunctional connectors 124A and 124B form part of a communication path to connect the communication paths of the photovoltaic panels 110 adjacent to each other to enable packet communication, and are used for electrical connections to various sensors and for communication of control information.

The compressed air pipe connectors 127A and 127B of the multifunctional connectors 124A and 124B are connected to adjacent battery panels, and a compressed air supply channel 134. Once the floating offshore plant is in operation, the compressed air supply channel 134 discharges seawater W from within the panel enclosure 112 of the photovoltaic panel 110 and supplies compressed air for inflating the floater 135.

In rough weather, the water is injected into the panel housing 112, by which the floating offshore plant dives below the sea surface. However, when the floating offshore plant is surfacing, it is necessary to discharge seawater from the panel housing 112 using the compressed air in the compressed air tank 115, so that the compressed air pipe connectors 127A and 127B also are used to fill the air in the compressed air tank 115.

Compressed air is generated by one or more photovoltaic panels 110P equipped with a compressed air generator (not shown) and is replenished from time to time to the compressed air tank 115 of each photovoltaic panel 110 via compressed air pipes and compressed air pipe connectors 127A and 127B.

In addition, power paths and power path connectors 126A and 126B, to which a maximum of ±250 kV is applied, must be covered with an insulator with high dielectric strength, for example, with dielectric strength of 60 kV/mm or higher such as a Teflon (registered trademark) insulation film because leakage current due to salt and other factors is fatal.

When the floating offshore plant 100 is installed on the sea surface, it will be subjected to ocean currents, waves, and strong winds including typhoons, so that the tensile, compressive, and impact forces acting on the floating offshore plant 100 are expected to be extremely large. The floating offshore plant 100 forms a hexagonal honeycomb structure in plan view, both as individual photovoltaic panels 110 and as a whole (the "large aggregate LC" described in the following) as described previously, so that the stress applied from the outside can be distributed in six directions. For example, unlike the "car coupler" attached to a railroad car, the configuration of the floating offshore plant 100 is simpler compared with a "car coupler" because it does not require the transmission of a large force to pull the car. The item with the reference sign 135 in FIG. 11A is a floater, which is described later.

Keeping Floating Offshore Plant Stationary

As shown in FIGS. 12A and 12B, the photovoltaic panels 110E on the outer periphery of the floating offshore plant 100 are provided with a propulsion unit 131 and a rudder unit 132. The Kuroshio Current, an ocean current that flows steadily along the coast of Japan, has a maximum flow velocity of 7 m/sec. When the floating offshore plant 100 is installed in the waters off the coast of Japan, it will be affected by the flow velocity of the Kuroshio Current and strong winds such as typhoons. Therefore, in order to keep the floating offshore plant 100 stationary, it is necessary to generate thrust that can counteract the flow velocity of the ocean currents and strong winds.

From this perspective, the floating offshore plant 100 is capable of obtaining thrust that can resist ocean currents with the propulsion unit 131, and as a result, the propulsion unit 131 and rudder unit 132 are configured to perform group control of the floating offshore plant 100 to keep the plant 100 stationary in a predetermined position and direction against the effects of forces acting in the sea surface direction due to tidal streams, ocean currents, and wind waves.

As the propulsion unit 131, a screw propeller is employed in this implementation, but a water-jet method may be used. However, at low speeds, screw propellers can provide more thrust than water jets.

For example, the photovoltaic panel 110 that controls the floating offshore plant 100 generates group control information for the entire floating offshore plant 100 from sensor information sent from other photovoltaic panels 110, which includes flow velocity and direction of the ocean currents, wind forces and wind direction, location information from a Global Satellite Positioning System (GPS) receiver 143 (see FIG. 15), which is described later, tilt/shake/shock information, water depth information, surveillance camera information, air temperature/seawater temperature/temperature in seawater tank/temperature at the back of photovoltaic cell module, and sends the information to the photovoltaic panel 110E, which is responsible for generating thrust.

Based on the group control information received via the close-coupled automatic coupler 117, each of those photovoltaic panels 110E drives the propulsion unit 131 and rudder unit 132 to generate thrust in a given direction, which generates thrust to counter the forces caused by tidal streams, ocean currents, and wind waves, whereby the floating offshore plant 100 is kept stationary at a predetermined position and its predetermined orientation or direction is maintained. Holding the floating offshore plant 100 in a predetermined orientation or direction means providing orientation control so that the inclined plane of the photovoltaic module faces south (or north if the floating offshore plant 100 is installed on the southern hemisphere side), or provides track control so that the inclined surface of the photovoltaic module faces in the direction of sunlight irradiation.

In this case, FIG. 12A shows the state of the floating offshore plant 100, in which against a force f1 caused by currents and winds from the upper left to the lower right in the figure, multiple photovoltaic panels 110E located mainly on the left and upper periphery of the floating offshore plant 100 drive the propulsion unit 131 and rudder unit 132, respectively, to generate a thrust force f2 (indicated by black arrows in the figure), and the floating offshore plant 100 as a whole generates a thrust force F that can counteract the force f1 due to currents and winds, so that floating offshore plant 100 remains stationary at a predetermined location and is holding a predetermined orientation or direction.

The photovoltaic panels 110E with white arrows in FIG. 12A are the photovoltaic panels 110E that are not driving the propulsion unit 131 and rudder unit 132.

As shown in FIG. 12A, the entire floating offshore plant 100 is formed in a hexagonal shape in plan view to form a honeycomb structure as a whole, so that if thrust is generated by the propulsion unit 131, the thrust is distributed to the floating offshore plant 100. Therefore, the floating offshore plant 100, which is formed by interconnected photovoltaic panels 110, will not collapse due to concentration of thrust on a part of the floating offshore plant 100.

FIG. 12A shows one embodiment in which the photovoltaic panels 110E are placed on the outer periphery of the floating offshore plant 100. The propulsion unit 131 and rudder unit 132 may be installed on the photovoltaic panel 110 inside the floating offshore plant 100, which includes 1 million panels. Furthermore, in FIG. 12A, the thrust f2 is applied in the direction of towing the floating offshore plant 100, but the thrust f2 can also be applied in the direction of pushing the floating offshore plant 100 from backward to forward, as with a ship.

Stormy Weather and Tsunami Countermeasures for Floating Offshore Plants

Waves that develop in wind areas, such as typhoons, overlap each other, presenting an irregularity that makes it impossible to discern the peak line of waves offshore, and "swells" with long wavelengths suddenly attack sea areas far from the wind area. The waves generated by these wind forces are called "billows," with periods ranging from a few seconds to a few dozen seconds, wavelengths ranging from several tens to several hundred meters, and wave heights of 20 meters sometimes. Wave energy is proportional to the square of the wave height, but at a depth of ½ the wavelength, the wave energy is attenuated to about 4% of the surface wave energy to be extremely small.

As previously mentioned, the photovoltaic panels 110 are flexibly connected with the adjacent photovoltaic panels 110 without fixed points, so that when the wavelength of the wave is twice the length of the photovoltaic panel 110, the vertical oscillation resonates with waves and may damage the photovoltaic panel 110 if the resonance continues. However, the length of the photovoltaic panel 110 in one embodiment described previously is 5.2 to 6 m, which means the wave wavelength is several to ten times longer than the length of the photovoltaic panel 110, so that it does not resonate, and the floating offshore plant 100 swings up and down with a period of several to ten seconds due to waves.

However, during giant typhoons, waves of irregular heights, periods, and directions also occur, so that there is a risk that large breaking waves with a wave height of about 20 meters may hit the floating offshore plant 100. There is also a risk that strong winds could invert part of the outer perimeter of the floating offshore plant 100. To prevent damage due to these factors, according to Professor Emeritus Shinji Sato of the University of Tokyo, a leading researcher on waterfront and coastal environments, it is estimated that the floating offshore plant 10 would be safe if it dives to a depth d equivalent to a maximum wave height of 20 meters. However, depending on the structure of the floating offshore plant 100 and its strength, the damage can be avoided even at water areas with shallower depths. The safe diving depth d that will not be damaged by a giant typhoon is derived from the following parameters including the structural design (for example, a honeycomb structure) of the floating offshore plant 100 and photovoltaic panels 110, wave-guiding tank experiments with a large wind tunnel experiment facility, and actual measurement data under a giant typhoon in actual sea areas. In the present invention, a safety diving depth of d=5 to 20 m is used as the prescribed diving depth.

Specifically, as shown in FIG. 13, the floating offshore plant 100 is configured to be submersible to a predetermined diving depth d by pouring seawater W into the panel housings 112 of almost all of the photovoltaic panels 110. In other words, as shown in FIGS. 11A and 15, a floater 135 to maintain a constant depth d of the photovoltaic panel 110 during diving is connected to a rope winder (not shown) within the close-coupled automatic coupler 117 via a rope 137 to be provided to the close-coupled automatic coupler 117.

Therefore, a floater 135 is used to stop the floating offshore plant 100 at the depth d below sea level, along with controlling the amount of water injected. In one embodiment of the present invention, the maximum length dimension of the rope 137 is configured to stop the floating offshore plant 100 at the depth d below sea level.

Accordingly; when each photovoltaic panel 110 is started to be injected with water for diving, compressed air is injected into the floater 135 from the compressed air supply channel 134, and at the same time, the rope winder is unlocked. As shown in FIG. 13, the floater 135 rises to the sea surface S and maintains the floating offshore plant 100 at a predetermined diving depth d.

When the floating offshore plant 100 is raised to the surface, the opposite operation to the preceding is performed. That is, compressed air is injected into the panel housing 112 of the photovoltaic panel 110 to drain seawater W, and the rope 137 is reeled in to accommodate the floater 135 in the close-coupled automatic coupler 117.

The floater 135 does not necessarily need to be provided to all of the photovoltaic panels 110, but may be provided to several of the photovoltaic panels 110 at intervals depending on the safety diving depth d to prevent the ropes 137 from tangling with each other. Elastic ropes may be used for the ropes 137 to absorb the violent motions of the waves.

Moreover, according to Professor Fumihiko Imamura of Tohoku University, a leading tsunami researcher, tsunamis have two different speeds. One is the tsunami propagation velocity, shown in FIG. 14, which is proportional to the square root of the water depth. In the case of a giant tsunami, the velocity is 800 km/h at a depth of 5,000 m, and 36 km/h at a depth of 10 m. This is not the motion velocity of water particles, which does not exert a force on an object. The other is water particle velocity, whose energy is proportional to the square of the wave height. In waters 5,000 m deep, wave heights of the tsunami are only about 1 m, so the load on floating objects is negligible. However, the tsunami is as high as 9 meters in waters 10 meters deep and even higher than 10 meters rushing on land, which causes extensive damage. When the tsunami height reaches the depth of the sea area, the waves begin to break up. In the sufficiently deep offshore (deeper than 50 meters), the sea surface moves up and down with a period of several 10 minutes and a wavelength of several to several hundred kilometers, but no significant force is applied to the floating structure.

Therefore, in ocean areas where there is a threat of huge tsunamis caused by earthquakes, such as those in Japan, installing the floating offshore plant 100 in waters deeper than 50 meters can prevent damage from huge tsunamis. In waters where there is no record of huge tsunamis hitting in the past, the floating offshore plant 100 may be installed in waters shallower than 50 m.

Floating Lighthouse at a Floating Offshore Plant

It is important to make the presence of the floating offshore plant 100 known to vessels navigating in the vicinity of the plant to ensure the safety of navigation and to prevent damage to the floating offshore plant 100 due to collisions with vessels. At several locations near the periphery of the floating offshore plant 100 (not shown), a doughnut-shaped opening 142 for a floating lighthouse is provided near the center of the photovoltaic panel 110T shown in FIG. 15, to which a floating lighthouse 136 is provided. To configure a structure of the floating lighthouse 136 in which the height h of a light section 136A from the sea surface is constant regardless of whether the floating offshore plant 100 is surfaced or submerged (like the state where a bottle ⅓ is filled with water to float it in water), the floating lighthouse 136 includes a cylindrical body with buoyancy 136C, a weight 136D, a pole 136B, the light section 136A and a GPS receiver 143. The light section 136A may transmit radio waves modulated with a predetermined code that includes the identifier and current position of the floating offshore plant 100 at all times, and at night, as shown in FIG. 15, the light section 136A may modulate an LED with a predetermined code to emit light from it. When a vessel approaches, the light section 136A may issue an alarm to alert the vessel to perform collision avoidance maneuvers. If the height of the light section 136A is about h=10 m, the sight distance is 12 km, or 450 $km^2$ in area, which is sufficient coverage for the floating offshore plant 100 in view of 5 km long per side and 26 $km^2$ in area of the plant 100.

By installing a GPS receiver 143 on top of each of the multiple floating lighthouses 136 installed near the periphery of the floating offshore plant 100 and statistically processing the output data from the receivers 143, even if the floating offshore plant 100 is exposed to strong winds, its current position and orientation can be accurately measured day and night, in stormy weather and when diving. By feeding this measurement data back to the aforementioned propulsion unit 131 and rudder unit 132, the floating offshore plant 100 can be kept in a predetermined position and orientation.

Hierarchical Structure of the Power System of a Floating Offshore Plant

The hierarchical structure of the power system of the floating offshore plant 100 is explained using FIGS. 16 through 19. FIG. 16 shows one embodiment of the logical hierarchical structure from the photovoltaic panel 110 to the small aggregate SC, medium aggregate MC, large aggregate LC, and energy carrier system 200, showing the maximum voltage, maximum current, and maximum output power at each hierarchy (see FIG. 9). FIG. 17 shows a specific wiring circuit for a floating offshore plant 100. FIG. 18 shows one embodiment of a large aggregate LC with medium aggregates MC connected in a tree structure parallel with 10 branches at two hierarchies. Furthermore, FIG. 19 illustrates the wiring circuit of FIG. 17 with the power paths between photovoltaic panels that form a honeycomb structure, showing that the wiring shown in FIG. 17 can be made if each coupler 117 is provided with a power path connector 126 for one circuit in principle.

As shown in FIG. 16, the floating offshore plant 100 includes a small aggregate SC with 100 photovoltaic panels 110 electrically connected in series, a medium aggregate MC with 100 small aggregates SC electrically connected in a bidirectional isolated series, and a large aggregate LC with 100 medium aggregates MC electrically connected in parallel. The "bidirectional" of the bidirectional isolation type means that the plant can handle current in both directions: when photovoltaic power is generated, the generated power is transmitted to the energy carrier system 200 on the land side, and when power is not generated, such as at night, the power transmitted from the energy carrier system 200 is taken in. The "isolated" means that the small aggregate SC and the medium aggregate MC are electrically insulated, specifically that the maximum voltage of the medium aggregate MC will be ±250 kV, while the small aggregate SC will have a maximum voltage of ±2.6 kV, meaning that a maximum voltage of ±2.6 kV will be applied to the photovoltaic module 113, but no ±250 kV will be applied to the module.

FIGS. 16 and 17 show the maximum voltage and maximum current when photovoltaic panels 110 are connected in series-series-parallel connections without excessive insulation protection by a hierarchical structure consisting of photovoltaic panels 110, a small aggregate SC, a medium aggregate MC, and a large aggregate LC.

The numerous photovoltaic modules 113 that make up the photovoltaic panel 110 are insulated against the ground (sea level) and the maximum voltage is limited to ±2.6 kV by series connection within the small aggregate SC and grounding (earthing) 155SC at the mid-potential point. Within the small aggregate SC, the maximum current 61 A flows to all photovoltaic panels 110, but within the photovoltaic panels 110, the current is distributed among many photovoltaic modules 113, so the maximum current 61 A does not flow to any one photovoltaic module 113.

In the medium aggregate MC, the output of the small aggregate SC is connected in isolated series through the photovoltaic panel 110D (see FIG. 19) with a bidirectional isolated DC-DC converter 141 (see FIG. 17) using a power path connector 126 different from the series connection in the small aggregate SC, and the maximum voltage is =250 kV, but the current remains the same at 61 A. The bidirectional isolated DC-DC converter 141 converts direct current to alternating current (DC/AC conversion), then isolates the small aggregate SC and medium aggregate MC with an isolated transformer and returns the alternating current to direct current (AC/DC conversion), with a conversion efficiency of about 96%. The capacity of an isolated transformer is 5.2 kV×61 A=320 kVA and weighs about 1 ton. The maximum buoyancy of the panel housing 112 is approximately 10 tons and the isolated transformer can be accommodated within the panel housing 112 in terms of its dimensions. The power path connectors 126 within the medium aggregate MC are to be provided with high voltage insulation measures separate from those within the small aggregate SC.

Because one hundred medium aggregate MCs are connected in parallel, the maximum output voltage for the output of the large aggregate LC is ±250 kV, which is the same as that of the medium aggregate MCs, but the maximum output current of LC increases 100 times that of MCs to 6.1 kA.

The voltage drop in a DC two-wire system can be calculated using the following formula, assuming that the conductor resistance of JIS C 3001 standard soft copper (conductivity 97%) is 17.8Ω·mm²/km:

$$E=(35.6\times L\times I)/(1000\times S)$$

where E is the voltage drop between the two wires (V), L is the length of the wire (m), I is the current (A), and S is the cross-sectional area of the wire (conductor) ($mm^2$).

As shown in FIG. 17 and FIG. 19, in the case where the output power path 153$^{\pm}$ (± means both the positive and negative pole sides are applicable) of the medium aggregate MC is connected in a bifurcated tree structure in parallel at the confluence node 154$^{N\pm}$, which is housed within the photovoltaic panel 110$^{N\pm}$ at the confluence node 154$^{N\pm}$, (to be precise, the positive pole side should be called the junction node and the negative pole side the diverging node, but they are collectively called the confluence node) and then connected to the submarine cable 310$^{\pm}$, if power paths 152$^{\pm}$ and 153$^{\pm}$ (L=5,300 m, I=61 A) are connected with S=30 $mm^2$ and 154± ($L_{avg}$=1,700 m, $I_{avg}$=1.6 kA) is connected with S=100 $mm^2$ within the medium aggregate MC, the maximum power loss due to voltage drop for ±250 kV is about 0.45% and they are connected with S=100 $mm^2$ and S=300 $mm^2$ respectively, the maximum power loss is about 0.15%.

In FIGS. 17 and 19, the lower layer of the confluence node 154$^{N\pm}$ is connected in one layer in parallel. If the conductor cross-sectional area is increased each time the current converges through parallel connections, power loss can be reduced with a smaller amount of conductor material, such as copper.

In contrast, in the example of the tree structure parallel connection that forms a 10-branch, two-level hierarchy shown in FIG. 18, the outputs of the 10 medium aggregate MCs are bundled at the confluence node 153$^{N\pm}$ via power paths 152$^{\pm}$ and 153$^{\pm}$ ($L_{avg}$=5,400 m, I=61 A) respectively, further are bundled at the confluence node 154$^{N\pm}$ via the power path 154$^{\pm}$ ($L_{avg}$=1,100 m, $I_{avg}$=610 A) from 10 confluence nodes 153$^{N\pm}$ and connected to the submarine cable 310$^{\pm}$.

In this case, using S=30 $mm^2$ and S=100 $mm^2$, respectively, the maximum power loss is reduced to about 0.13%, while S=100 $mm^2$ and S=300 $mm^2$ reduce the maximum power loss to about 0.04%, or approximately ¼ of the loss with the two-branch tree structure.

As a side note, to keep the power loss per 1,000 km of submarine cable 300 to about 3%, S=1,460 $mm^2$ (φ=96 mm) is required. But trying to secure enough copper to transmit the world's primary energy could lead to even higher copper prices. Early commercialization of room-temperature (15° C.) superconductors using commonplace elements such as hydrogen, carbon, and sulfur, which have been studied by Ranga Dias et al., is expected (Nature, News, 586, 349, 2020).

FIG. 19 depicts power paths based on the wiring circuit of FIG. 17 on a floating offshore plant 100, which has a honeycomb structure that is configured by a small aggregate SC consisting of 2×8=16 photovoltaic panels 110 each, a medium aggregate MC consisting of 4 small aggregate SCs each, and a large aggregate LC consisting of 4 medium aggregate MCs, assuming that all close-coupled automatic couplers 117 have a power path connector 126 for one line.

In the small aggregate SC, the photovoltaic modules of the 8 photovoltaic panels 110 on the positive pole side (not shown) and the photovoltaic modules of the 8 photovoltaic panels 110 on the negative pole side are connected in a single stroke with $151^{+}$ and $151^{-}$ power paths, respectively, and are grounded at the mid-potential point marked with a black dot (●) $155^{SC}$. Both ends of the photovoltaic modules are connected to photovoltaic panel 110D, which is provided with a bidirectional isolated DC-DC converter 141. The photovoltaic panel 110D is connected to the vertically adjacent photovoltaic panel 110D using a different coupler than the coupler used in the series connection in the small aggregate SC, and the positive pole side is connected in isolated series via a power path $152^{+}$, which is turned back at the ground $155^{MC}$ of the medium aggregate. The negative pole side is connected to the photovoltaic panel 110D via the power path $152^{-}$ in an isolated series connection, the positive pole side end is connected to the positive pole side power path $310^{+}$ of the submarine cable 300 via power paths $153^{+}$ and $154^{+}$, and the negative pole side end is connected to the negative pole side power path $310^{-}$ of the submarine cable 300 via power paths $153^{-}$ and $154^{-}$.

In FIGS. 17 and 18, the wiring diagrams show $154^{N+}$ or $310^{+}$ and $154^{N-}$ or $310^{-}$ separated up and down, but in the power path wiring drawn on the honeycomb structure in FIG. 19, the power path is turned back at the ground $155^{MC}$ in the medium aggregate, and the $154^{N-}$ or $310^{-}$ are centrally located to shorten the power path within the floating offshore plant 100 or to avoid the power path being apart from the submarine cable $300^{\pm}$.

FIG. 19 is one embodiment of a small-scale implementation with 2×8=16 photovoltaic panels 110 for the small aggregate SC, 4× small aggregate SC for the medium aggregate MC, and 4× medium aggregate MC for the large aggregate LC. Even in the embodiment of the floating offshore plant 100 consisting of 1 million panels, the small aggregate SC has 5×20=100 photovoltaic panels 110, the medium aggregate MC has 100× small aggregate SC, the large aggregate LC has 100× medium aggregate MC. If the power paths to the positive and negative pole sides of the MC are turned back at the ground $155^{MC}$ within the medium aggregate MC, $154^{\pm}$, $110^{N\pm}$, and $310^{\pm}$ can be centrally located in the upper center, as with in FIG. 19. This eliminates the need for the submarine cable 300 of the floating offshore plant 100 to accommodate $310^{+}$ and $310^{-}$ more than 5 km apart.

In FIG. 19, the number of power path connectors 126 can be connected without overlapping because the number of branches (confluences) is small in the two-branch tree structure connection, but the power path connector 126 for the photovoltaic panel $110^{N\pm}$ that bundles the 10 power paths $15^{\pm}$ requires a power path connector for multiple paths. The tree structure may be multi-hierarchy from four to eight hierarchies, with each power path connector 126 accommodating one power path.

The preceding is an example of a series-series-parallel connection of a floating offshore photovoltaic power generation plant 100 composed of photovoltaic panels 110 in a logical hierarchical structure consisting of a small aggregate SC, a medium aggregate MC, and a large aggregate LC on a power of 100 basis. It is also possible to form separate logical hierarchical blocks and set the maximum output voltage and current of each block as needed. These are design considerations, and the actual design is optimized by taking into account the capacity and cost of the insulated DC connection device and submarine cable.

Automatic Rerouting of Faulty Photovoltaic Panels

Each photovoltaic panel 110 is interconnected via six close-coupled automatic couplers 117, with each close-coupled automatic coupler 117 housing a power path connector and a signal line connector for one power path each.

As shown in FIG. 19, if a failure occurs in a photovoltaic panel 110 during operation, the other photovoltaic panels 110F will automatically detect the failure of the photovoltaic panel 110F in which the failure has occurred, and notify the associated photovoltaic panels 110 of the failure. Alternatively, the neighboring photovoltaic panel 110 that is electrically connected to the failed photovoltaic panel 110F detects the failure and notifies the neighboring photovoltaic panels 110 of the occurrence of the failure.

Upon the preceding notification, the control circuit of the photovoltaic panel 110 that was transmitting power to the failed photovoltaic panel 110F takes the initiative to determine the bypass route BR as shown in FIG. 19, notifies the adjacent photovoltaic panel 110 of the result, and switches to the bypass route BR.

In determining this bypass route BR, the control circuit in the circuit box 116 determines not to use the close-coupled automatic coupler 117 that is transmitting power, but to interconnect with other adjacent photovoltaic panels 110 via another non-operating close-coupled automatic coupler 117. In other words, since each individual photovoltaic panel 110 is provided with six close-coupled auto-couplers 117, in the event of a fault, the individual photovoltaic panel 110 automatically searches for close-coupled auto-couplers 117 other than the two close-coupled auto-couplers 117 connected in that state to form a new power supply path.

In the example of the faulty photovoltaic panels in FIG. 19, only the bypass route BR of photovoltaic panel 110F, located in the upper right corner of the figure, is described because of the small number of photovoltaic panels 110 shown in the figure and avoiding complication of the figure, but in reality, the plant includes 1 million photovoltaic panels 110, in most of which the photovoltaic cell modules 113 of the photovoltaic panels 110 are connected in series, i.e., only two couplers 117 are used. Therefore, even in the case where five out of six couplers 117 are used, as in a photovoltaic panel 110D provided with a bidirectional isolated DC-DC converter 141 (see FIG. 17), if photovoltaic panel 110Dr, which is a spare for the photovoltaic panel 110D, is installed in advance two or three panels away from the photovoltaic panel 110D, the power path can be rerouted to the photovoltaic panel 110Dr in the event of a fault.

Such a switchover to the bypass route in the event of a failure may be performed autonomously by the photovoltaic panel 110 as described, or in conjunction with the management and control device 710 described in the following. However, at the very least, the management and control device 710 or management and control device 700 should be notified that a fault has occurred and the route has been switched to a bypass route. In response, the management and control device 700 dispatches a transport and assembly robot 610 equipped with a replacement photovoltaic panel 110 from the nearest maintenance base to replace the failed photovoltaic panel 110F.

Photovoltaic Power Generation and Power Supply to Floating Offshore Plants

The power generated by the photovoltaic panels 110 during daylight hours is transmitted directly to the land side along the current flow shown by arrow A in FIG. 20, and is supplied to control circuits, various actuators, and diagnostic circuits provided in the circuit box 116 of each photovoltaic panel 110.

In contrast, when not generating power at night or in stormy weather and diving below the sea surface, DC current is transmitted from the energy carrier system 200 to the floating offshore plant 100 via the submarine cable 300 along the direction of arrow C (opposite the direction of arrow A) to drive control circuits and actuators of the photovoltaic panels 110. In this case, the floating offshore plant 100 operates as one of the supply destination facilities 500 of the energy conversion supply device 250.

As shown in FIG. 20, a diode D is provided in the power supply path, but instead of diode D1 on the photovoltaic cell G output side, a control circuit controls the circuit breaker (e.g., insulated gate bipolar transistor: IGBT) on and off according to the power generation state of the photovoltaic cell.

Hierarchical Structure of the Communication System of Floating Offshore Plant

FIG. 21 shows the logical hierarchical structure of the communication system in one embodiment of the carbon-free energy supply system 10.

The communication method in the carbon-free energy supply system 10 is a TCP/IP-based packet communication method, wherein a portion of the 128-bit long IPv6 address space is hierarchically allocated to an address for identifying the floating offshore plant 100, an address for identifying the large aggregate LC, an address for identifying the medium aggregate MC, an address for identifying the small aggregate SC, and an address for identifying the photovoltaic panel 110. Each component of the carbon-free energy supply system 10 is assigned an identifier or physical address (MAC address) and a logical address (IP address) based on each component's hierarchical location within the carbon-free energy supply system 10.

The objects that must be managed and controlled in the carbon-free energy supply system 10 (hereinafter referred to as "communication nodes") are, for example, 1 million communication nodes for one floating offshore plant 100 alone, and IPv4 cannot accommodate all 10 nodes ($10^9$) of the total 963 carbon-free energy supply systems that meet TPESj.

If almost all communication nodes send, for example, 100 bytes of notification information simultaneously to the management and control device 700 using the SNMP-Trap command, which is described later, during stormy weather, this may cause serious congestion and communication failure, in spite of the total amount of information of about 200 MB. Therefore, the carbon-free energy supply system 10 of this embodiment uses a TCP/IP-based packet communication method to solve the address shortage by allocating the 128-bit long IPv6 address space hierarchically to addresses along the logical hierarchical structure (tree structure) of the communication nodes.

The Interface Identifier (IFID) for IPv6 is usually generated from the MAC address assigned in the manufacturing process, but it appears random in the forwarding process, making it unsuitable for efficient processing. When a large number of communication nodes exist in a single system, the size of the route table can be reduced and also the processing load can be reduced if the address space is defined hierarchically in the IFID as shown at the bottom of FIG. 21, stated as "Example of hierarchical allocation of address space to IPv6 addresses."

In addition, the carbon-free energy supply system 10 in this embodiment avoids congestion and enables efficient communication in the following way: the main communication node is determined for each large aggregate LC, medium aggregate MC and small aggregate SC, each communication node sends a packet (after a random time according to the conditions, such as stormy weather) to the main communication node of the small aggregate SC to which the communication node belongs, and the main communication node aggregates the packets as necessary, and for example, those addressed to the management and control device 710 are forwarded to the main communication node of the medium aggregate MC or the main communication node of the large aggregate LC.

For example, control information packets addressed to the coupler 117 of a specific photovoltaic panel 110 sent from the management and control device 710 are also relayed between main communication nodes in a bucket-relay manner along the address hierarchy to be delivered to the destination reliably and efficiently.

In addition, whether or not the carbon-free energy supply system is connected to the Internet, the threat of cyber-attacks will always exist as long as TCP/IP is used. In the floating offshore plant 100 of this embodiment, the cyber attack could, for example, result in the plant being forced into a submerged state, or render the energy carrier system 200 dysfunctional. Since the carbon-free energy supply system 10 is configured to supply power on a national or even global scale, there is always the fear that such conditions could lead to a national or global crisis.

Therefore, the carbon-free energy supply system 10 of this embodiment ensures energy security against cyber attacks by the following: secure communication with a verification code (digital signature) is adopted, in which the receiving side verifies the authenticity of the packet sender (to check for so-called "spoofing") and the integrity (to check for "tampering") of the contents of the packet transmission based on a public key infrastructure that guarantees the correspondence between the public keys used in public key cryptography and digital signatures, and the owners of those public keys.

The carbon-free energy supply system 10 may be configured such that a receiving node side can verify the authenticity of each communication node and the integrity of the management target information, and control information, generated and transmitted by each communication node by the following: more rigorously, for example, each communication node incorporates a tamper-resistant (a state in which it is difficult for equipment, devices, or software to analyze, read, or tamper with the internal structure or recorded data from the outside) security module TPM (Trusted Platform Module), and using the EK key (Endorsement Key) for TPM identification, the AIK key (Attestation Identity Key) for signing, and the STK key (Storage Key) for encryption, provided by the TPM, the hash value of the EK public key of each communication node and the disk image (data from the beginning to the end recorded on a hard disk) provided by a vendor or machine-learned data in case of an artificial intelligence is registered with the prescribed certification authority (not shown).

Although the verification of authenticity and integrity is the basis for security assurance of the carbon-free energy supply system 10, there can be cyber-attack threats that can slip through the verification of authenticity and integrity. Countermeasures against this are discussed later.

Construction of Floating Offshore Plant

The assembly and construction work of the floating offshore plant 100 of the carbon-free energy supply system 10 in one embodiment configured as previously described is a routine work. As shown in FIG. 22, the floating offshore plant 100 is constructed by simultaneous parallel assembly, in which transport and assembly robots 600 to 630 equipped with artificial intelligence and transport and assembly robot management control devices 760 to 763 cooperate.

After the photovoltaic panels 110 are loaded onto a large transport vessel and transported to the offshore construction site, the vessel's multiple cranes are used to lower the photovoltaic panels 110 over the ocean surface. Thereafter, under the guidance and control of the management and control device for photovoltaic panel transport and assembly robot 761, multiple photovoltaic panel transport and assembly robots 610 simultaneously and in parallel couple many photovoltaic panels 110 to assemble a small aggregate SC, according to the identifier of each photovoltaic panel 110 and the pre-prepared configuration diagram of the floating offshore plant 100.

The assembly is made as follows:

- one or more photovoltaic panels 110 to be coupled to the photovoltaic panel 110 to be assembled are lifted about 1.5 m above sea level by the transport and assembly robot 610;
- the positional relationship of the automatic coupler 117 is fine tuned with the multi-axis, multi-dimensional roller conveyor (not shown) of the transport and assembly robot 610;
- when the positional relationship is within the specified accuracy, the sealing material 120 is released simultaneously, and at the same time, dry compressed air that has been pre-filled in the compressed air tank 115 of the photovoltaic panel 110 to be assembled is injected from the compressed air injection nozzle 128;
- and the automatic coupler 117 is tightly connected after ensuring that no seawater components remain adhered to the inside of the automatic coupler 117 and the power path connector 126 (FIGS. 11A and 11B).

These are performed autonomously in coordination with the multiple photovoltaic panels 110 to be coupled, the transport and assembly robot 610, and the management and control device for photovoltaic panel transport and assembly robot 761.

Then, under the guidance and control of the transport and assembly robot management control device 762, multiple small aggregate SCs are transported by multiple small aggregate transport and assembly robots 620 to assemble the medium aggregate simultaneously, and under the guidance and control of the transport and assembly robot management control device 763, multiple medium aggregate MCs are transported by the medium aggregate transport and assembly robot 630 to assemble the large aggregate LC.

These assemblies are made in the same manner such that the photovoltaic panel 110 to be assembled are lifted about 1.5 m above sea level by the transport and assembly robot 620 or 630, the positional relationship of the automatic coupler 117 is fine tuned, and when the positional relationship is within the specified accuracy, the sealing material 120 is released simultaneously, and dry compressed air is injected to connect the coupler 117.

The laying of the submarine cable 300 will be done concurrently with the construction of the floating offshore plant 100. During and after construction of the plant 100, the submarine cable is managed and controlled by the submarine cable management and control device 730.

This concurrent assembly work of each component allows the construction of the floating offshore plant 100 in a short period of time, as shown in FIG. 23. FIG. 23 shows the process-specific assembly and total estimated plant construction time required for the construction of the floating offshore photovoltaic power generation plant according to one embodiment of the present invention.

The figure shows that a total of 1,000 photovoltaic panel transport and assembly robots 610 are used to assemble the small aggregate SC, and if each photovoltaic panel 110 is assembled in an average of 15 minutes, a total of 1 million photovoltaic panels 110 can be assembled into 10,000 small aggregate SCs in 250 hours. If a total of 100 small aggregate transport and assembly robots 620 are used to assemble the medium aggregate MC in an average of 180 minutes to assemble one small aggregate SC, a total of 1,000 small aggregate SCs can be assembled into 100 medium aggregate MCs in 300 hours. Furthermore, if one medium aggregate transport and assembly robot 630 is used to assemble the large aggregate LC with an average of 240 minutes to assemble one medium aggregate MC, 100 medium aggregate MCs can be assembled into one large aggregate LC in 400 hours.

If the next process is started after ¼ of the previous process is completed (e.g., the assembly of the medium aggregate is started after ¼ of the assembly process of the small aggregate has been completed), the total construction time per floating offshore plant is 538 hours, but assuming 10 hours/day of work and a 60% workable weather rate, construction can be completed in 90 days. Although 963 floating offshore plants need to be built to ensure the generation of TPESj, as shown in FIG. 9, assuming 26 simultaneous construction sites, construction would be completed in 9.1 years.

In this case, multiple types of artificial intelligence-equipped robots 610-640 are used as transport and assembly robots 600, both for the construction itself and for post-construction maintenance (cleaning, and other work). Artificial intelligence, which makes rapid judgments on unknown events based on past experiences when current conditions are input, is being put to practical use in automatic driving and robotics.

The robot collects a huge amount of data for learning, such as various sensor and camera information under various conditions (e.g., construction process, weather, sea conditions, mutual positioning of photovoltaic panels, and occurrence of trouble) of these photovoltaic cell panels 110 and floating offshore plant 100. Using these data, the artificial intelligence-equipped robot can be realized by performing machine learning (deep reinforcement learning) in a high-performance computing (HPC) environment to maximize the reward (e.g., minimizing the assembly time of photovoltaic cell panels 110) and implementing the learned data in the robot 600. The construction of the floating offshore plant 100 using the transport and assembly robots 600 is performed under the control of the management and control device 700 or the transport and assembly robot management and control device 760 described later, which allows the transport and assembly robots 600 to work together or cooperate with each other, enabling more efficient construction.

After construction, the replacement of photovoltaic panels 110F that fail during operation (not shown) is performed autonomously by the transport and assembly robot 610 under management and control of the management and control device 760. The management and control device for the photovoltaic panel transport and assembly robot 761 submerges and guides the transport and assembly robot 610 equipped with the replacement photovoltaic panel 110 directly under the target floating offshore plant 100 and the photovoltaic panel 110F within the plant. After confirming the identifier of the photovoltaic panel 110F and the identifier of the adjacent photovoltaic panel 110, and draining the seawater in the panel housing 112 of the six photovoltaic panels 110 adjacent to the photovoltaic panel 110F and the twelve photovoltaic panels 110 surrounding the six photovoltaic panels 110, the transport and assembly robot 610 lifts the photovoltaic panel 110F and six adjacent photovoltaic panels 110 to about 1.5 m above sea level. The six couplers 117 that connect the photovoltaic panel 110F to the adjacent photovoltaic panel 110 are released and removed, and the transport and assembly robot 610 shifts the captured photovoltaic panel 110F sideways by a multi-axis, multi-dimensional roller conveyor.

The replacement photovoltaic panel 110 is then moved to the original position of the photovoltaic panel 110F by the multi-axis, multi-dimensional roller conveyor, and is connected to the adjacent photovoltaic panel 110 while fine-tuning the three-dimensional positioning relationship with the adjacent photovoltaic panel 110 to be connected. After coupling, the transport and assembly robot 610 equipped with the photovoltaic panel 110F is submerged and evacuated, and seawater is again poured into the drained housing 112. Then, the management and control device for photovoltaic panel transport and assembly robot 761 confirms the normality of the operation. A series of replacement operations are completed after the results of the confirmation are reported to the management and control device 710, which is responsible for the management and control of the entire floating offshore plant 100, and the device 710 approves the results. The management and control commands used by the transport and assembly robot 610, and the management and control device 760 in these operations are described later.

Environmental Assessment of Floating Offshore Plant

The configuration example in FIG. 9 requires an area of 28.1 km$^2$ per floating offshore plant 100, and if the plants are distributed in the EEZ south of 30° N, slightly less than 2% of the area will be covered by the floating offshore plants 100. There is lack of sunlight under the floating offshore plants 100, so that declines in phytoplankton are inevitable. The shortage of sunlight could also affect fish and other organisms that feed on them. It is necessary to determine what kind of influence the floating offshore plant 100 will have and the appropriate installation method for the floating offshore plant 100 through multiple years of test operations.

Measures to address the lack of sunlight under the floating offshore plant 100 include the methods of, for example, (A) increasing the distance between adjacent photovoltaic panels 110 from 50 cm to 2.5 m, five times the distance described in FIG. 9, (B) providing a stationary function to each small aggregate SC unit (approximately 53 m on each side), and increasing the distance between adjacent small aggregate SCs to 50 m, and (C) providing a stationary function to each medium aggregate MC unit (approximately 530 m on each side) and increasing the distance between adjacent medium aggregate MCs to 500 m. Either of these methods can increase the coverage of the photovoltaic irradiated area where the floating offshore plant 100 is installed by about 50%. In the case of (A), based on actual measurement data from SolarSea, a floating offshore photovoltaic power generation system installed in Maldives of the Indian Ocean, a 5-10% increase in output can be expected due to reflected light from the sea surface.

From the perspective of marine ecosystems, it is necessary to determine during the test operation whether a distance of at least 5 km between the floating offshore plants 100 with an area of about 28.1 km$^2$ would have no significant impact, or any of the methods (A) through (C) would be better, and to what extent the coverage of the photovoltaic irradiated area would be acceptable.

The photovoltaic panel 110 includes the photovoltaic module 113, the panel housing 112, the tempered glass 112G, the coupler 117, the multifunction connector 124, and the propulsion unit 131. Even if the thickness of the panel housing 112 forming the structure is 4 mm, for example, the 963 floating offshore plants have structural components of a total of 370 million m$^3$, which is well above the remaining capacity of 170 million m$^3$ of industrial waste landfill in 2019. If the structural members of the plant including the photovoltaic module 113 are not reusable, the plant would cause a major global pollution problem.

Properties required for structural components include salt corrosion resistance, weather resistance (ultraviolet rays), recyclability (chemical recycling), insulation, thermal conductivity (cooling of the back of photovoltaic cells), rust resistance, toughness, impact resistance, antifouling properties (prevention of adhesion of marine organisms), economy, and light weight.

Glass fiber-reinforced plastics are widely used in bathtubs and ship hull materials because of their light weight, high mechanical properties, chemical stability, and low cost, but they are difficult to recycle and are currently disposed of in landfills.

In contrast, metallic materials such as iron must be insulated against high voltage and treated against salt corrosion, and must be coated with antifouling paint that provides high weather resistance and salt corrosion resistance and prevents the adhesion of marine organisms, but they have excellent thermal conductivity and are effective in keeping the back surface temperature of the photovoltaic cell module 113 at seawater temperature.

Polyethylene fiber is a light and strong material that can be chemically recycled by depolymerization (monomerization) and then re-polymerization. Polyethylene fiber has excellent salt corrosion resistance, rust resistance, insulation, weather resistance, impact resistance, and economic efficiency, and its thermal conductivity is high among plastics (equivalent to glass and water), which makes polyethylene fiber a good candidate for the structural material of the panel housing 112.

There is also a risk that migratory birds may fly in and scavenge wood chips, plastic trash. and other debris that have drifted onto the floating offshore plants 100, building nests and using them as breeding grounds. As a countermeasure, it is considered to use a photovoltaic panel cleaning robot 640 with a cleaning function, which periodically cleans the top, bottom, and sides of the photovoltaic panels 110 to remove feces, nests, and attached marine organisms. It is necessary to confirm the frequency of arrival of migratory birds and the performance of the cleaning robots through test operations.

Management and Control of Carbon-Free Energy Supply System by Management and Control Device As previously mentioned, the floating offshore plant 100, energy carrier system 200, submarine cable 300, offshore wind power generation plant 400, supply destination facilities 500, and transport and assembly robot 600 are managed and controlled by one or more management and control devices 700. A specific example of the management and control by the management and control device 700 is the application of the Simple Network Management Protocol (SNMP) defined in the Internet standard RFC 1157.

SNMP includes an SNMP manager that performs management, an SNMP agent that is to be managed, and a Management Information Base (MIB) as the basic elements. SNMP has five functions of configuration management (managing information on network devices, servers, interfaces, and services, as a database), performance management (collecting information on traffic on the network, number of errors, number of packets lost to manage overall network performance), fault management (detecting faults in the network or equipment and providing information for fault treatment), billing management (recording and managing the usage of resources in the network for each user), and confidentiality management (monitoring unauthorized access and intrusion, and controlling access beyond authorization).

The MIB identifies and holds the information to be managed by the SNMP agent by means of a tree structure of Object Identifier (OID), which are unique numbers. There are two types of methods: polling and trapping. The polling is requested by the SNMP manager and responded to by the SNMP agent, which includes commands such as information acquisition request (GetRequest), response (GetResponse), and configuration change request (SetRequest). In the trapping, SNMP agents that have detected anomalies notify the SNMP manager (SNMP-Trap) of the incident.

For example, if an SNMP manager wants to get the number of unicast packets received by a certain device, it specifies an SNMP agent by IP address and queries the OIDs in the tree structure from the root (•). The SNMP agent in question returns a response with GetResponse (.1.3.6.1.2.1.2.1.11:4937832). Multiple items for the query can be specified at the same time.

The management and control devices 700-760 act as SNMP managers for their respective management targets, while the floating offshore plant 100, the photovoltaic panel 110, and the first through third energy conversion devices 210-230, to which IP addresses are assigned and which are to be managed, function as SNMP agents. The extended MIB identifies the following items of the carbon-free energy supply system 10 with unique numbers: each component (floating offshore plant 100, 1 million photovoltaic panels 110, panel housing 112, photovoltaic cell module 113, compressed air tank 115, circuit box 116, close-coupled automatic coupler 117, bidirectional isolated DC-DC converter 141, energy conversion devices 210-230, energy storage device 240, energy conversion supply device 250, submarine cable 300, offshore wind power generation plant 400, supply destination facilities 500, transport and assembly robots 600-630 and various component parts) and information to be managed (solar radiation, ocean current velocity/direction, wind power/wind direction, current position/direction information using GPS, tilt/shake/shock, diving depth, surveillance camera images, air temperature/seawater temperature/temperature in seawater tank/temperature behind photovoltaic cell module, humidity inside coupler/residual salinity, generated power [W], energy per unit time (input/output volume/excess/deficiency [W, kg/sec-$H_2$, kL/sec-$NH_3$], power generation/transmission volume [Wh], energy carrier input/output volume [kg, kL, kJ, kcal]). The unique numbers are maintained by each SNMP agent.

Here, the management and control device 700 is responsible for the overall management and control of the entire carbon-free energy supply system. The management and control device 710 manages and controls the floating offshore plant 100, the management and control device 720 manages and controls the energy carrier system 200, the management and control device 730 manages and controls the submarine cable 300, the management and control device 740 manages and controls the offshore wind power generation plant, the management and control device 750 manages and controls the supply destination facilities, and the management and control device 760 manages and controls the transport and assembly robot 600, respectively.

For example, the management and control device 710 that has detected that the power generated is decreasing in relation to the solar radiation of the floating offshore plant 100 uses the GetRequest command to query the large aggregate LC first, then the medium aggregate MC, and then the small aggregate SC, whereby the management and control device 710 identifies which photovoltaic cell module of which photovoltaic cell panel 110 has deteriorated in power generation. The management and control device 710 then requests the management and control device 760 to replace the failed photovoltaic panel 110F using the SetRequest command. Upon receiving the request, the management and control device 760 dispatches the transport and assembly robot 610 equipped with a replacement photovoltaic panel 110 from the maintenance base using the SetRequest command, and manages and controls the transport and assembly robot 610 equipped with artificial intelligence using SetRequest and GetRequest commands to replace the photovoltaic panel 110F whose power generation efficiency has deteriorated with a photovoltaic panel 110.

When the management and control device 750 learns by the SNMP-Trap notification that there is an excess of power supplied to the AC power system, which is one of the supply destination facilities 500, the management and control device 750 communicates the excess amount to the management and control device 720 using the SetRequest command. The management and control device 720 instructs the energy conversion device 210 to divert the generated power to the energy conversion device 220 to generate hydrogen, convert the generated hydrogen to an energy carrier in the energy conversion device 230, and store the energy carrier in the energy carrier storage device 240. If the storage capacity of the energy carrier storage device 240 under management is full, the management and control device 720 asks the management controller 700 to find an available energy carrier storage device using the SetRequest command. Upon receiving the request, the management and control device 700 inquires another management and control device 720 under its management, or a partner management and control device 700, using the GetRequest command, and directs performing pipeline transport of the energy carrier to an available energy carrier storage device 240 using the SetRequest command.

When a typhoon approaches and there is a risk of damage to the floating offshore plant 100, the management and control device 700 instructs the management and control device 710, which manages the floating offshore plant 100, to dive using the SetRequest command, and simultaneously instructs the management and control device 720 to take action in the event of a dive using the SetRequest command. The management controller 720 instructs the floating offshore plant 100 to take out an energy carrier from the energy carrier storage device 240, convert the energy carrier to DC power in the energy conversion supply device 250, and transmit the power to the floating offshore plant 100 via the submarine cable 300. These linkages prevent damage to the floating offshore plant 100 and even while diving, allow the GPS receiver 143, the propulsion unit 131, and rudder unit 132 to operate to keep the plant 100 stationary at a predetermined position, whereby the plant 100 maintains a predetermined heading or direction.

If the energy carrier system 200 detects unauthorized access (frequent occurrence of packets that fail to verify authenticity and integrity) from the communication log records, the energy carrier system 200 notifies the management and control device 720 of the unauthorized access along with the communication log records using the SNMP-Trap command. The management and control device 720 generates a discard request message including the unauthorized access source IP address, the destination IP address, and the destination port number from the communication log records, and sends the message to the management and control device 700 using the SetRequest command. If the management and control device 700 sends the message to the unauthorized access source IP address using a dedicated command, the router closest to the unauthorized access source that can deal with the message will henceforth prevent the forwarding of the unauthorized access packet.

In addition, although verification of authenticity and integrity is the basis for cybersecurity in the carbon-free energy supply system 10, it is possible that a cyber attack could be launched that bypasses the verification of authenticity and integrity if, for example, malware is embedded in the components in the supply chain process. As a countermeasure against this, since most of the components of the carbon-free energy supply system 10 are Internet of Things (IoT) devices, unauthorized packets (e.g., communications with C&C servers) may be prevented by limiting the communication partners by routers or other devices. Examples of the blocking of these malformed packets by routers and other devices are included in Japanese Patents No. 6683480, No. 6737610, No. 6780838, and No. 6896264.

The previous examples show that once the carbon-free energy supply system 10 is put into operation, the system 10 can operate 24 hours a day, 365 days a year, without stopping, and continue to supply the supply destination facilities 500 with energy in the prescribed energy form. The management and control devices 700-760 may be implemented with machine-learned data to perform management and control. Although the preceding paragraphs state that the management and control are performed based on SNMP, unique commands suitable for artificial intelligence, MIBs, and OIDs may be defined.

The transmission and reception of packets relating to the aforesaid commands are performed with a verification code for allowing the receiving end to verify at least the authenticity of the transmission source and the integrity of the transmitted content, which is previously described.

Cost Estimates for Carbon-Free Energy Supply System

According to "economies of scale," fixed costs consist of R&D expenses, depreciation of manufacturing equipment and others, and generally, if production doubles, costs will be about 30% lower. In contrast, variable costs consist of raw materials, labor costs, and others, and even if the production of raw materials were doubled, the cost reduction would be 5 to 10%. From this, the following findings can be made.

(i) The more electricity is generated, the lower the unit cost of electricity generation due to the effect of economies of scale.

(ii) The higher the production volume, the more profitable it is to invest in R&D and manufacturing equipment to produce high-performance products with cheaper raw materials.

(iii) Labor costs required for manufacturing and construction can also be fixed with the introduction of robots, making the concept of economies of scale suitable for industries operating under conditions of a declining birthrate and aging population.

Developing the floating offshore plant 100 and energy carrier system 200 based on these findings would increase the ratio of fixed costs and conversely decrease the ratio of variable costs, thereby maximizing economies of scale. The floating offshore photovoltaic power generation, which generates power highly efficiently and in large volumes at sea with no need for site purchase costs and no need for fuel costs such as for crude oil or LNG, will be cost competitive enough with current renewable energy and other primary energy sources due to scaling up. This means that although current renewable energy is being promoted in a decentralization-oriented manner, it is more economically advantageous to go large-scale.

FIG. 24 shows an estimation model based on current component prices, which illustrates the cost of equipment for the initial floating offshore plant 100 (2.48 trillion yen/plant) and its breakdown ratio, the corresponding cost of equipment for the energy carrier system 200, the costs for construction, maintenance, and operation, the unit cost of electricity, and the economic effects of scaling up.

In the floating offshore plant 100, photovoltaic modules alone account for 54% of the cost, while submarine cables account for as little as 6%. Since the energy carrier system 200 is formed by already established technology and equipment, and does not need expensive equipment such as photovoltaic cells, the cost of the equipment of the energy carrier system 200 is half that of the floating offshore plant 100. The construction cost is set at 10% of the total equipment cost (0.37 trillion yen/plant), including costs related to artificial intelligence-equipped robots, based on the assumption that the transport and assembly robot 600 would be used. Dividing these costs by the useful life of 30 years, the depreciation cost is 136.4 billion yen/year. Other maintenance and operating costs and operating income are assumed to be the ratios and costs shown in the figure. The unit cost of electricity obtained by dividing these annual costs by the power generation amount of single floating offshore plant, which is 5.71 TWh, is 33 yen/kWh at the beginning of operation.

In the estimation model for the economic effect of scale expansion based on the points mentioned in this section 0149, both the variable cost ratio and the fixed cost ratio are set at 50%, assuming that the fixed cost ratio is increased as much as possible in accordance with (i) through (iii) in the previous section 0148. The economies of scale index for variable costs when the production volume doubles $\alpha$ is set at 0.95 to 0.9 (5-10% decrease with a doubling of production), and the same index $\beta$ for fixed costs is set at 0.7 (30% decrease with a doubling of production).

The results of this estimation model for the unit cost of electricity generated by the floating offshore plant 100 are shown in FIG. 25. After five years of research and development and test operation, if the introduction of the floating offshore plant 100 is started in 2026, fixed costs are reduced to less than 3% at the time when one hundred floating offshore plants 100 are installed, and total costs are almost entirely accounted for by variable costs. Then, Japan's carbon-free status will be achieved around 2035, when the total amount of electricity generated will increase to Japan's primary energy level TPESj, and the unit price of electricity will be 6.3-10.4 yen/kWh, which is similar to the current price in Europe and the United States. Furthermore, if power generation is increased to the estimated total global primary energy demand of 2TPESw (326 PWh) in 2050, the achievement of global carbon-free status becomes a reality, and the unit cost of electricity will drop to 3.2-7.4 yen/kWh. When DC power is drawn directly from the floating offshore plant 100 without via the energy carrier system 200, as in the aforesaid steel production, the unit cost of electricity is about ⅔ via the energy carrier system 200. For comparison, the selling price for industrial photovoltaic power generation in 2019 was about 14 yen/kWh, but with the strategic introduction of renewable energy, the energy can be supplied at a price well below the current electricity rate.

If, in parallel with the introduction of the carbon-free energy supply system 10 to achieve carbon-free, the capture of greenhouse gases (such as $CO_2$ and methane gas), which are believed to remain in the atmosphere for thousands of years, is promoted, the goal of the Paris Agreement, "to limit the increase in global average temperature to less than 1.5° C. above pre-industrial revolution levels," can be achieved by 2100.

Workings and Effects

In the carbon-free energy supply system 10 according to one embodiment configured as described in the preceding, renewable energy that does not emit $CO_2$ but whose output power is unstable and cannot be stockpiled in large quantities and over long periods of time is generated, so that nearly all primary energy can be converted to carbon-free energy in the following ways.

The floating offshore plant 100 generates enough electricity to meet the total energy demand of a country and the globe;

- the electricity generated is converted into energy carriers by the first energy conversion device 210, the second energy conversion device 220, and the third energy conversion device 230, and stored in the energy carrier storage device 240 for up to six months, for example;
- and the energy conversion supply device 250 converts the energy output from or taken out from any of these devices into an energy form suitable for the supply destination facilities 500, whereby nearly all primary energy can be made carbon-free.

The management and control devices 700-760 are connected to each other for management and control, enabling the carbon-free energy supply system 10 to operate 24 hours a day, 365 days a year to continue supplying energy.

Further, in the carbon-free energy supply system 10 according to one embodiment configured as described in the preceding, by using TCP/IP-based packet communication and by allowing the receiving end to verify the authenticity of the transmission source and the integrity of the transmitted content, there is no room for cyber attacks on the carbon-free energy supply system 10, which ensures energy security.

In the carbon-free energy supply system 10 according to one embodiment configured as described in the preceding, liquefied ammonia, methylcyclohexane, liquid hydrogen, and high-pressure hydrogen gas can be selected as energy carriers that can be stably stored, depending on the characteristics of the supply destination facilities 500. Among these, liquefied ammonia or methylcyclohexane, which have high volumetric and mass energy densities and can be stockpiled in large quantities at room temperature for a long period of time, can be stockpiled for up to six months, which makes it possible to use renewable energy, whose power generation varies greatly from day to day, season to season, and in abnormal weather conditions. This enables the use of renewable energy as an energy infrastructure.

Moreover, the carbon-free energy supply system 10 according to one embodiment configured as described in the preceding enables various industries to become carbon-free by the energy conversion supply device 250, which efficiently converts renewable energy-derived energy into an energy form suitable for each of the supply destination facilities 500 and stably and inexpensively supplies the energy. The supply destination facilities 500 include AC power systems, high-voltage DC power systems, $NH_3$ dedicated generators and $NH_3$ mixed combustion generators in thermal power plants, hydrogen-fired generators, liquid hydrogen storage tanks at airports, where high purity liquid hydrogen is required, hydrogen stations, which supply high-purity hydrogen fuel for fuel cell vehicles, $NH_3$ storage tanks in ports, where ships operated by $NH_3$ dedicated combustion engines arrive and depart, and blast furnaces that perform hydrogen reduction steelmaking.

Also, while the carbon-free energy supply system 10 according to one embodiment configured as described in the preceding mainly uses the floating offshore plant 100, which is considered to have the highest power generation capacity in Japan, its coexistence with power generation plants using other renewable energy resources will increase the diversity of renewable energy resources and level out the temporal variability and seasonal unevenness of power generated using renewable energy resources, and enable a stable supply of low-cost energy by increasing the utilization efficiency of the energy carrier system 200.

In the floating offshore plant 100 according to one embodiment configured as described in the preceding, each photovoltaic panel 110 forming the floating offshore plant 100 itself functions as a floating body, and the photovoltaic panels 110 adjacent to each other can swing between each other in the vertical direction, which provides a floating offshore plant 100 with a robust structure that can withstand tsunami, waves, and ocean currents.

This makes it possible to realize a large-area floating offshore plant 100 on a scale that is impossible to achieve with conventional technology. Thus, by locating one or more of these large-scale, large-area floating offshore plants 100 on an offshore location with high annual average solar radiation, it is possible to realize a large amount of renewable energy production, or offshore photovoltaic power generation, that can meet the energy needs of a country or even the entire globe.

At sea, the effects of tsunamis, waves, and ocean currents must be considered. In this case, the tsunami, by its nature, has a greater impact as the wave height increases as it gets closer to land and the water depth becomes shallower. However, offshore, where the water depth is 50 m or deeper, even in the event of a tsunami, the sea surface will only repeat up and down movements of several to several hundred kilometers in wavelength with a cycle of several tens of minutes, and the floating offshore plant 100, which is formed by floating objects, is not significantly affected by tsunamis there.

In addition, although waves generated by typhoons have wavelengths ranging from several tens to several hundred meters, and they can reach wave heights of 20 meters, the resonance wavelength of the photovoltaic panel 110 in the floating offshore plant 100 according to one embodiment configured as described in the preceding is sufficiently shorter than the wavelength of the waves, and the floating offshore plant 100 will not be destroyed by resonance with the waves.

Moreover, in the floating offshore plant 100 according to one embodiment configured as described in the preceding by seawater W being poured into and drained from the panel housing 112 of each photovoltaic panel 110, it is possible to avoid the destructive force of a giant typhoon by diving to a predetermined diving depth or surfacing at the sea surface.

Thus, the floating offshore plant 100 can operate while floating on the sea surface when the sea is not rough, and in rough weather, it can be submerged to a predetermined diving depth by seawater W being poured into each photovoltaic panel 110 to avoid damage caused by waves and winds.

With respect to ocean currents, even if the floating offshore plant 100 of this embodiment is under the influence of the Kuroshio Current with a maximum current velocity of about 7 m/sec, and typhoons, in the case where the plant 100 is kept stationary in place to maintain a given orientation or direction, it needs thrust to be able to resist this current velocity and the effects of strong winds. In this embodiment, the floating offshore plant 100 is provided with a GPS receiver 143, a propulsion unit 131, and a rudder unit 132 to allow the plant 100 to maintain a predetermined orientation or direction in the face of currents such as the Kuroshio Current and strong winds.

According to the floating offshore plant 100 of one embodiment, the photovoltaic panels 110 adjacent to each other are flexibly connected via universal joints 119 and elastic shock absorbing members 111 provided at the apexes 110*a* of each photovoltaic panel 110 when viewed in plan. This prevents collisions between photovoltaic panels 110 adjacent to each other while allowing them to swing in the vertical direction, which provides a floating offshore plant 100 with a flexible and robust structure that can withstand tsunamis, waves, and ocean currents.

According to the floating offshore plant 100 of one embodiment, in the photovoltaic panels 110 adjacent to each other, the panel housings 112 are mechanically connected to each other via a close-coupled automatic coupler 117 provided on the sides 110*b* of each photovoltaic panel 110 when viewed in plan, and the electrical elements within the panel housing 112 are electrically connected to each other.

Also, according to the floating offshore plant 100 of one embodiment, since the close-coupled automatic coupler 117 is provided with compressed air pipe connectors 127A and 127B for discharging seawater W from within the panel housing 112, compressed air is supplied into the photovoltaic panel 110 via the close-coupled automatic coupler 117, which allows the photovoltaic panel 110 to rise out of the submerged state, and allows the compressed air to be supplied simultaneously into multiple photovoltaic panels 110 connected to each other.

Also, according to the floating offshore plant 100 of one embodiment, since the close-coupled automatic coupler 117 is provided with a floater 135 to keep the water depth of the photovoltaic panels 110 constant when diving, by pouring seawater W into the panel housing 112 of the photovoltaic panel 110, which forms the floating offshore plant 100, the floating offshore plant 100 is submerged, and by sending compressed air to the floater 135 via compressed air supply channel 134 to expand the floater 135, the floating offshore plant 100 can be maintained at a constant diving depth.

According to the floating offshore plant 100 of one embodiment, the close-coupled automatic coupler 117 is provided with power path connectors 126A and 126B for electrically connecting the power circuits of photovoltaic panels 110 adjacent to each other, and control circuits that perform control of switching the connection of an adjacent photovoltaic panel 110 to the power path of another adjacent photovoltaic panel 110 when a fault occurs on the adjacent photovoltaic panel 110. Thus, the control circuit automatically bypasses the failed photovoltaic panel 110F, i.e., automatically determines a bypass route BR consisting only of the photovoltaic panels 110 that have not failed, and switches the power path to the bypass route BR by notifying the photovoltaic panels 110 adjacent to the failed photovoltaic panel 110F of the switch of the route. This allows power transmission at the floating offshore plant 100 to continue.

Also, according to the floating offshore plant 100 of one embodiment, the close-coupled automatic coupler 117 is provided with communication path connectors 125A and 125B to connect the communication circuits of the photovoltaic panels 110 adjacent to each other to enable packet communication, which allows the formation of a packet communication network in the floating offshore plant 100, the network being formed by connecting the communication circuits of adjacent photovoltaic panels 110.

According to the floating offshore plant 100 of one embodiment, the floating offshore plant 100 includes a small aggregate SC formed by multiple photovoltaic panels 110 electrically connected in series with each other, a medium aggregate MC formed by multiple small aggregate SCs electrically connected in isolated series with each other, and a large aggregate LC formed by multiple medium aggregate MCs electrically connected in the tree structure parallel connection or in the parallel connection to each other.

The maximum voltage applied to the photovoltaic cell module 113 can be limited to ±2.6 kV by the series connection within the small aggregate SC and the grounding of the mid-potential point. The voltage is boosted to ±250 kV in the medium aggregate MC by connecting the small aggregate SCs in isolated series through a power path connector different from that within the small aggregate SC, but this high voltage is not applied directly to the photovoltaic cell module 113. Therefore, by insulating and protecting the photovoltaic cell module 113, circuit box 116, and power path connectors 126A and 126B with appropriate insulation materials, respectively, the entire photovoltaic panel 110 can be electrically connected without excessive insulation protection.

Then, by connecting the outputs of the multiple medium aggregate MCs in a tree structure parallel connection within the large aggregate LC, the currents flowing in the tree structure parallel connection power paths $\mathbf{153}^{+}$, $\mathbf{153}^{-}$ and $\mathbf{154}^{+}$, $\mathbf{154}^{-}$ are distributed, and the maximum output current of about 6 kA of the large aggregate LC can be limited to only the photovoltaic panels 110 and submarine cable 300 that accommodate the confluence nodes $\mathbf{154}^{N+}$ and $\mathbf{154}^{N-}$. As a result, the amount of copper used in the entire floating offshore plant 100 can be reduced as much as possible.

According to the carbon-free energy supply system 10 of one embodiment, the communication method in the carbon-free energy supply system 10 is a TCP/IP-based packet communication method, in which a portion of the 128-bit long IPv6 address space is hierarchically allocated for identifying various components of the floating offshore plant 100. These include addresses for identifying the large aggregate LC, the medium aggregate MC, the small aggregate SC, and the photovoltaic panel 110. This provides an orderly communication environment that enables information exchange among a vast number of communication nodes with a large number of photovoltaic panels 110 as communication nodes in multiple carbon-free energy supply systems 10.

According to the carbon-free energy supply system 10 of one embodiment, each component of the carbon-free energy supply system 10 is assigned an identifier or physical address and a logical address based on the hierarchical position of each component in the carbon-free energy supply system 10, which enables efficient processing of routing within the energy supply system 10.

According to the carbon-free energy supply system 10 in one embodiment, communication between each component is performed by packet communication with a verification code to verify the authenticity of the transmission source and the integrity of the packet, which makes it possible to build a secure packet communication environment within the carbon-free energy supply system 10.

Also, the floating offshore plant 100 of one embodiment is provided with a GPS receiver 143 for obtaining the current position and orientation of the plant 100, and a propulsion unit 131 and a rudder unit 132 are provided on the photovoltaic panel 110E located on the periphery of the floating offshore plant 100, so that even under the influence of currents, waves, and winds, the floating offshore plant 100 can be controlled to remain in a predetermined position and orientation. The floating offshore plant 100 is formed by multiple photovoltaic panels 110, which are substantially hexagonal when viewed in plan, and connected in a honeycomb structure when viewed in plan, so that the thrust from the propulsion unit 131 and rudder unit 132 is distributed throughout the floating offshore plant 100. Therefore, the collapse of the structure of the floating offshore plant 100 due to the concentration of thrust by the propulsion unit 131 and rudder unit 132 on a part of the plant 100 can be prevented.

In addition, the floating offshore plant 100 of one embodiment is provided with a floating lighthouse 136 around the plant 100, so that vessels navigating in the vicinity of the floating offshore plant 100 can be made aware of its presence, thus ensuring the safety of navigation of the vessels to prevent damage to the plant 100 due to vessel collisions with the plant 100.

According to the floating offshore plant 100 of one embodiment, the panel housings 112 of the photovoltaic panels 110 adjacent to each other, which form the floating offshore plant 100, are mechanically connected to each other, and a multifunctional connector 124 for electrically connecting the electrical elements within the panel housing 112 to each other is provided to the close-coupled automatic coupler 117, which automates the connection as well as the connection and releasing work between the photovoltaic panels 110. This enables the assembly of the floating offshore plant 100 at sea by multiple transport and assembly robots 600.

This also enables the replacement of faulty photovoltaic panels 110F using the transport and assembly robots 600.

Furthermore, seawater components can infiltrate into the ±250 kV high-voltage power paths when the paths are coupled within the close-coupled automatic couplers 177, which may cause serious insulation breakdown after the offshore plant is operational. Therefore, extreme care must be taken during offshore assembly. The compressed air tank 115 inside the panel housing 112 of the photovoltaic panel 110 that is to be transported to a predetermined sea area for assembly is pre-filled with compressed dry air, and during coupling, the compressed dry air is used to blow off seawater components inside the close-coupled automatic coupler 177 and the multi-function connector 124, thereby preventing insulation breakdown inside the coupler.

The floating offshore plant 100 configured as previously described includes one hundred photovoltaic panels 110 for the small aggregate SC, 100 small aggregate SCs for the medium aggregate MC, and 100 medium aggregate MCs for the large aggregate LC, so that the plant 100 is formed by a total of 1 million photovoltaic panels 110. As a result, a floating offshore plant 100 with an annual average power generation capacity of 652 MW/unit is realized in a sea area with an annual average solar radiation of 240 W/$m^2$.

In this case, the power generation capacity of one floating offshore plant 100 is equivalent to one large gas turbine combined cycle (GTCC) generator. When configured on this scale, the floating offshore plant 100 would cover an area of 28.1 $km^2$ and supply 5.71 TWh of electricity per year. To meet the TPESj (Total Primary Energy Consumption of Japan), 963 floating offshore plants 100 would be required, so that the floating offshore plants 100 that cover a total area of 27,000 $km^2$ (about 1.4 times the size of Shikoku) would be able to produce the equivalent of all primary energy needs in Japan.

In this case, the power is transmitted from the floating offshore plant 100 to the onshore energy carrier system 200 in Japan by a submarine cable of about 1500 km in length. Since the power is transmitted by direct current, there is no capacitance loss or dielectric loss, and as previously mentioned, the transmission loss per 1,000 km can be kept extremely low at 3%.

Therefore, if the carbon-free energy supply system 10 and the floating offshore plant 100 according to this embodiment are deployed in the entire country of Japan, and even in the sea area within 30° latitude from north to south, the system 10 and plant 100 will provide a large scale carbon-free electricity and energy supply that can meet the world's total primary energy demand, which would have a tremendous deterrent effect on global warming.

The invention is not limited to the preceding embodiments. For example, although the photovoltaic panel 110 forming a plane is approximately hexagonal in plan view in the preceding embodiments, the photovoltaic panel 110 may adopt a shape forming a plane to be approximately rectangular in plan view, or approximately parallelogrammatic in plan view; or approximately triangular in plan view. In this case, the photovoltaic panels 110 can be placed in the tightest possible configuration. This allows the top surface of the floating offshore plant 100, i.e., the side facing the sun, to be formed by the light-receiving surface of the photovoltaic panels maximally. Therefore, the power generation efficiency can be maximized by the structure of the floating offshore photovoltaic power generation plant.

Furthermore, the coverage of the photovoltaic irradiated area of the sea area where the floating offshore plant 100 is installed can be increased to about 50% by the measures including widening the spacing between adjacent photovoltaic panels 110 from 50 cm to five times larger 2.5 m, or providing a stationary function at each small aggregate SC (about 53 m on a side) with widening the spacing between adjacent small aggregate SCs to 50 m, or providing a stationary function at each medium aggregate MC (about 530) m on a side) with widening the spacing between adjacent medium aggregate MCs. This prevents phytoplankton from decreasing due to lack of sunlight under the floating offshore plant 100, thereby limiting the impact on fish and other organisms that feed on phytoplankton.

Furthermore, in the preceding embodiments, multiple polygonal photovoltaic panels connected to form a logical hierarchy are connected in series, or isolated series, or parallel, or tree-structured parallel connection between the layers of the logical hierarchy via different power path connectors, respectively. These examples provide the following functions:

a photovoltaic power generation function that generates a predetermined DC power and transmits the power via submarine cables;

a control function that switches to another photovoltaic panel via an unused power path connector to form a bypass route in the event of a fault in its own photovoltaic panel or an adjacent photovoltaic panel;

a diving and surfacing function that submerges the floating offshore photovoltaic power generation plant to a predetermined diving depth by pouring water into the panel housing of the photovoltaic panels, and surfacing the floating offshore photovoltaic power generation plant in a submerged state by draining water from the panel housing of the photovoltaic panels;

a coupling function that forms the floating offshore photovoltaic power generation plant by connecting adjacent photovoltaic panels, on each side or part of which is provided with a coupler that accommodates some or all of the power path connectors, signal path connectors, and compressed air pipe connectors, allowing adjacent panel housings to swing mechanically to each other at least vertically, and;

a shock absorbing function to absorb unexpected shocks and prevent the photovoltaic panel from riding up due to fluctuations in the sea surface by placing an elastic shock-absorbing members at some or all of the apexes of the photovoltaic panel when viewed in plan;

a current position and orientation measurement function for measuring the current position and orientation of the floating offshore photovoltaic power generation plant;

propulsion and steering functions to keep the floating offshore photovoltaic power generation plant stationary in a predetermined position and orientation;

a stationary maintenance function during non-power generation to take in power transmitted via the submarine cables at night or when diving and to keep the floating offshore photovoltaic power generation plant stationary in a predetermined position and orientation using the propulsion and steering functions;

a packet communication function to transmit and receive packets with a physical address and a logical address according to the logical hierarchical structure described in the beginning of this paragraph;

a secure communication function to transmit and receive the packets with a verification code, the code allowing the receiving end to verify the authenticity of the packet transmission source and the integrity of the transmitted content;

a compressed air generation function to generate compressed air for pouring water into the panel housing and draining water from the panel housing and for diving the floating offshore photovoltaic power generation plant to the predetermined diving depth, and to supply the compressed air to the compressed air tanks of other photovoltaic panels via compressed air pipes and compressed air pipe connectors;

and a floating lighthouse function that makes its presence known around the floating offshore photovoltaic power generation plant using some or all of the lights, radio waves, or sound waves. Nevertheless, the present invention is not limited to the preceding embodiments and can be modified as appropriate within the scope of the gist of the present invention.

DESCRIPTION OF REFERENCE SIGNS

10. carbon-free energy supply system
100. floating offshore photovoltaic power generation plant (floating offshore plant)
110. photovoltaic panel
110*a*. apex in plan view
110*b*. side in plan view
110*c*. beam material
110D. photovoltaic panel with isolated DC-DC converter
110Dr. spare photovoltaic panel
110E. photovoltaic panel around floating offshore plant
110F. faulty photovoltaic panel
110P. photovoltaic panel 110 with compressed air generator
110T. photovoltaic panel with opening for floating lighthouse
111. elastic shock-absorbing member
112. panel housing
112G. tempered glass
113. photovoltaic cell module
114. transparent insulating filler
115. compressed air tank
116. circuit box
117. close-coupled automatic coupler (coupler)
118. housing
119. universal joint
120. sealing member
121. connecting bolt
122. connecting nut
123. drive mechanism
124. multifunctional connector
125. communication path connector
126. power path connector
127. compressed air pipe connector
128. compressed air injection nozzle
129. duct
131. propulsion unit
132. rudder unit
134. compressed air supply channel
135. floater
136. floating lighthouse
136A. light section
136B. pole
136C. cylindrical body
136D. weight
137. rope
141. bidirectional isolated DC-DC converter
142. openings for floating lighthouse
143. Global Satellite Positioning System (GPS) receiver
$\mathbf{151}^{+}$, $\mathbf{151}^{-}$. small aggregate series-connected power path (+: cathode side, −: anode side)
$\mathbf{152}^{+}$, $\mathbf{152}^{-}$. medium aggregate series-connected power path (+: cathode side, −: anode side)
$\mathbf{153}^{N+}$, $\mathbf{153}^{N-}$. confluence node (+: cathode side, −: anode side)
$\mathbf{154}^{N+}$, $\mathbf{154}^{N-}$. confluence node (+: cathode side, −: anode side)
155. earth (ground)
$\mathbf{155}^{MC}$. medium aggregate ground
$\mathbf{155}^{SC}$. small aggregate ground
200. energy carrier system
210. first energy conversion device
220. second energy conversion device

230. third energy conversion device
240. energy carrier storage device
250. energy conversion supply device
300. submarine cable
310$^+$. submarine cable positive pole side power path
310$^-$. submarine cable negative pole side power path
400. offshore wind power generation plant
500. supply destination facilities
600. transport and assembly robot
610. photovoltaic panel transport and assembly robot
620. small aggregate transport and assembly robot
630. medium aggregate transport and assembly robot
640. photovoltaic panel cleaning robot
700. management and control device
710. management and control device for floating offshore plant
720. management and control devices for energy carrier system
730. management and control device for submarine cable
740. management and control device for offshore wind power generation plant
750. management and control device for supply destination facilities
760. management and control device for transport and assembly robot
761. management and control device for photovoltaic panel transport and assembly robots
762. management and control device for small aggregate transport and assembly robots
763. management and control device for medium aggregate transport and assembly robots
BR. bypass route
C1-C6. desert
D, D1. diode
d. safe diving depth for floating offshore plant
f1. forces due to tidal currents and winds
f2. thrust
F. thrust
h. height of floating lighthouse above sea level
LC. large aggregate
MC. medium aggregate
SC. small aggregate
W. seawater
S. sea level
J. Japan
x. EEZ of Japan

The invention claimed is:

1. A carbon-free energy supply system, comprising:

one or more power generation plants that generate power to meet energy demand of an entire globe or country or a certain region or a specific industry using renewable energy resources, including one or more floating offshore photovoltaic power generation plants installed in equatorial waters within approximately 30 degrees north-south latitude, the waters being vast and abundant in renewable energy resources;

one or more energy carrier systems that synthesize energy carriers from power generated at the one or more power generation plants, that store the one or more energy carrier systems up to a specified amount, that convert the power or the energy carrier into an energy form suitable for each of supply destination facilities, and that supply carbon-free energy to the supply destination facilities via energy transport means comprising one or more of predetermined pipeline transportation, tank truck transportation, tanker transportation, DC power transmission, and AC power transmission;

one or more management and control devices that manage and control some or all of the one or more power generation plants, the energy carrier system, the energy transport means, and the supply destination facilities;

each floating offshore photovoltaic power generation plant comprising:

a plurality of panel housings having spaces into which water can be poured into and drained from;

a close-contact automatic coupler that mechanically couples the plurality of panel housings to each other;

a floater that is wound onto a rope winding machine in the close-contact automatic coupler via a rope;

wherein, each floating offshore photovoltaic power generation plant is maintained at a predetermined diving depth below a surface of the waters, by the panel housings into which a certain amount of water has been poured and the floater which has floated to the surface of the waters after a lock on the rope winding device has been released.

2. The carbon-free energy supply system according to claim 1, wherein some or all of the one or more power generation plants, the energy carrier system, the energy transport means, the supply destination facilities, and the management and control devices are assigned a logical address for TCP/IP-based packet communication to exchange information through secure communication with a verification code attached, the code allowing a receiving end to verify at least the authenticity of a packet transmission source and the integrity of transmitted content.

3. The carbon-free energy supply system according to claim 1, wherein the energy carrier is one or more of liquefied ammonia, methylcyclohexane, liquid hydrogen, and hydrogen gas.

4. The carbon-free energy supply system according to claim 1, wherein the energy carrier system comprises:

one or more first energy conversion devices that stabilize power generated at each power generation plant;

one or more second energy conversion devices that generate hydrogen using power output from the first energy conversion device;

one or more third energy conversion devices that convert the hydrogen to an energy carrier that can be stably stored;

one or more energy carrier storage devices that store the energy carrier up to a specified amount; and one or more energy conversion supply devices that convert the power or the energy carrier into an energy form suitable for each of the supply destination facilities to transport carbon-free energy to the supply destination facilities via the energy transport means.

5. The carbon-free energy supply system according to claim 4, wherein the one or more energy conversion supply devices comprise at least one of:

a function that converts power output from the first energy conversion device into a predetermined high-voltage DC power to transmit the high-voltage DC power to a high-voltage DC power system, one of the supply destination facilities, through DC power transmission;

a function that converts power output from the first energy conversion device into a predetermined AC power to transmit the AC power to an AC power system, one of the supply destination facilities, through AC power transmission;

a function that converts hydrogen output from each second energy conversion device into predetermined liquid hydrogen to transport the liquid hydrogen to a facility of the supply destination facilities by pipeline transportation, tank truck transportation, or tanker transportation;

a function that pressurizes hydrogen output from each second energy conversion device to a predetermined pressure to convert the hydrogen to high-pressure hydrogen gas to transport the high-pressure hydrogen gas to a facility of the supply destination facilities by pipeline transportation, tank truck transportation, or tanker transportation;

a function that converts an energy carrier output from each third energy conversion device into liquefied ammonia to transport the liquefied ammonia to a facility of the supply destination facilities by pipeline transportation, tank truck transportation, or tanker transportation;

a function that generates predetermined high-voltage DC power using an energy carrier taken out from each energy carrier storage device to transmit the high-voltage DC power to a high-voltage DC power system, a facility of the supply destination facilities, through DC power transmission;

a function that generates predetermined AC power using an energy carrier taken out from each energy carrier storage device to transmit the AC power to an AC power system, a facility of the supply destination facilities, through AC power transmission;

a function that converts an energy carrier taken out from each energy carrier storage device into liquefied ammonia to transport the liquefied ammonia to a facility of the supply destination facilities by pipeline transportation, tank truck transportation, or tanker transportation;

a function that converts an energy carrier taken out from each energy carrier storage device into predetermined liquid hydrogen to transport the liquid hydrogen to a facility of the supply destination facilities by pipeline transportation, tank truck transportation, or tanker transportation;

a function that converts an energy carrier taken out from each energy carrier storage device into predetermined high-pressure hydrogen gas to transport the high-pressure hydrogen gas to a facility of the supply destination facilities by pipeline transportation, tank truck transportation, or tanker transportation; or a power output instruction function that instructs each first energy conversion device to output part or all of the power output from the first energy conversion device to each second energy conversion device when there is a surplus of energy to be supplied to the supply destination facilities, or in accordance with a predetermined plan.

6. The carbon-free energy supply system according to claim 1, wherein each power generation plant further generates power using other renewable energy resources to level out diurnal, weather, or temporal variability and seasonal unevenness of generated power, lowering an upper limit of the specified amount of the energy carrier.

7. The carbon-free energy supply system according to claim 6, wherein each power generation plant that generates power using other renewable energy resources is at least one of an onshore photovoltaic power generation plant, a moored offshore or floating photovoltaic power generation plant, an onshore or offshore wind power generation plant, a geothermal power plant, or a hydroelectric power generation plant.

8. The carbon-free energy supply system according to claim 1, wherein each floating offshore photovoltaic power generation plant is a plant that floats in waters that receive more than a predetermined average annual amount of solar radiation and have a water depth greater than a predetermined water depth, and wherein each floating offshore photovoltaic power generation plant comprises at least one of:

a function that connects multiple polygonal photovoltaic panels to form a logical hierarchy to be substantially hexagonal in plan view, and to connect the multiple polygonal photovoltaic panels to form a honeycomb structure in plan view;

a photovoltaic power generation function that generates a predetermined DC power by connecting the photovoltaic panels in series, or isolated series, or parallel, or tree-structured parallel via different power path connectors between the logical hierarchy layers;

a diving and surfacing function that submerges each floating offshore photovoltaic power generation plant to a predetermined diving depth by pouring water into a panel housing of the photovoltaic panel, and to surface each floating offshore photovoltaic power generation plant in a submerged state by draining water from the panel housing of the photovoltaic panel;

a coupling function that forms each floating offshore photovoltaic power generation plant by connecting the adjacent photovoltaic panels, on each side or part of which is provided with a coupler that accommodates some or all of the power path connectors, signal path connectors, and compressed air pipe connectors, the coupler allowing the adjacent panel housings to swing mechanically between each other at least vertically;

a control function that switches to the other photovoltaic panels via some or all of the power path connectors, signal line connectors, and compressed air pipe connectors that are unused to form a bypass route in the event of a fault in its own photovoltaic panel or in an adjacent photovoltaic panel, a shock absorbing function that absorbs unexpected shocks to prevent the photovoltaic panels from riding up due to fluctuations in the sea surface by placing elastic shock-absorbing members at some or all of the apexes of the photovoltaic panels in plan view;

a current position and orientation measurement function that measures the current position and orientation of each floating offshore photovoltaic power generation plant, a propulsion and steering function that keeps each floating offshore photovoltaic power generation plant stationary at a predetermined location, and that allows the plant to maintain a predetermined orientation or direction;

a stationary maintenance function during non-power generation that keeps each floating offshore photovoltaic power generation plant stationary at a predetermined position, and orientation or direction using the propulsion and steering function at night or when diving;

a mooring function that keeps each floating offshore photovoltaic power generation plant stationary at a predetermined position;

a secure communication function that exchanges information through the secure communication;

a compressed air generation function that generates compressed air for pouring water into the panel housing and draining water from the panel housing, and for diving each floating offshore photovoltaic power generation plant to the predetermined diving depth, and that supplies the compressed air to the compressed air tank of other photovoltaic panels via a compressed air pipe and the compressed air pipe connector, or a floating lighthouse function that makes presence known around each floating offshore photovoltaic power generation plant using some or all of lights, radio waves, or sound waves.

9. The carbon-free energy supply system according to claim 1, wherein each floating offshore photovoltaic power generation plant comprises one million photovoltaic panels per plant, the panels being flexibly connected to form a honeycomb structure to disperse and absorb complex impact forces caused by waves and winds, the plant comprising a small aggregate, a medium aggregate, and a large aggregate of the panels, and wherein the small aggregate comprises 100 of the photovoltaic panels connected in series, the medium aggregate comprises 100 of the small aggregates connected in insulated series, and the large aggregate comprises 100 of the medium aggregates connected in tree-structured parallel or in parallel.

10. The carbon-free energy supply system according to claim 4, wherein the floating offshore photovoltaic plant transmits generated power to the energy carrier system or the one or more first energy conversion devices through DC power transmission, and wherein during non-power generation at night or when diving, the plant is fed power from the energy carrier system or the one or more first energy conversion devices or the one or more energy conversion supply devices.

11. A carbon-free energy supply method, comprising:

generating power to meet energy demand of an entire globe or country or a certain region or a specific industry using renewable energy resources by one or more power generation plants, including one or more floating offshore photovoltaic power generation plants installed in equatorial waters within approximately 30 degrees north-south latitude, the waters being vast and abundant in renewable energy resources;

synthesizing energy carriers from power generated at each power generation plant by one or more energy carrier systems to store the energy carrier up to a specified amount, to convert, that covers the power or the energy carrier into an energy form suitable for each of supply destination facilities, and to supply carbon-free energy to the supply destination facilities via energy transport means comprising one or more of predetermined pipeline transportation, tank truck transportation, tanker transportation, DC power transmission, and AC power transmission;

managing and controlling some or all of the power generation plant, the energy carrier system, the energy transport means, and the supply destination facilities by one or more management and control devices; and each floating offshore photovoltaic power generation plant comprising:

a plurality of panel housings having spaces into which water can be poured into and drained from;

a close-contact automatic coupler that mechanically couples the plurality of panel housings to each other;

a floater that is wound onto a rope winding machine in the close-contact automatic coupler via a rope;

wherein, each floating offshore photovoltaic power generation plant is maintained at a predetermined diving depth below a surface of the waters, by the panel housings into which a certain amount of water has been poured and the floater which has floated to the surface of the waters after a lock on the rope winding device has been released.

12. The carbon-free energy supply method according to claim 11, the method performed by the energy carrier system comprising:

stabilizing power generated at each power generation plant by one or more first energy conversion devices;

generating hydrogen by power output from each first energy conversion device by one or more second energy conversion devices;

converting the hydrogen generated by the each second energy conversion device into an energy carrier that can be stably stored by one or more third energy conversion devices;

storing the energy carrier up to a specified amount by one or more energy carrier storage devices;

converting the energy carrier into an energy form suitable for each of the supply destination facilities by one or more energy conversion supply devices to transport the carbon-free energy to the supply destination facilities by the energy transport means; and managing and controlling some or all of the power generation plant, the energy carrier system, each first energy conversion device, each second energy conversion device, each third energy conversion device, each energy carrier storage device, each energy conversion supply device, the energy transport means, and the supply destination facilities by one or more management and control devices.

13. The carbon-free energy supply method according to claim 12, the method further comprising:

transmitting power generated by the floating offshore photovoltaic power generation plant to the one or more first energy conversion devices; and feeding power to the plant from the energy carrier system, the one or more first energy conversion devices, or the one or more energy conversion supply devices during non-power generation at night or when diving.

14. The carbon-free energy supply method according to claim 11, wherein each floating offshore photovoltaic power generation plant is a plant that floats in waters that receive more than a predetermined average annual amount of solar radiation and have a water depth greater than a predetermined water depth, the method further comprising at least one of:

connecting multiple polygonal photovoltaic panels to form a logical hierarchy;

connecting the photovoltaic panels being substantially hexagonal in plan view to form a honeycomb structure in plan view;

generating a predetermined DC power by connecting the photovoltaic panels in series, or isolated series, or parallel, or tree-structured parallel between the logical hierarchy layers via different power path connectors;

submerging each floating offshore photovoltaic power generation plant to a predetermined diving depth by pouring water into a panel housing of the photovoltaic panel, and surfacing each floating offshore photovoltaic power generation plant in a submerged state by draining water from the panel housing of the photovoltaic panel;

forming each floating offshore photovoltaic power generation plant by connecting the adjacent photovoltaic panels, on each side or part of which is provided with a coupler that accommodates some or all of the power path connectors, signal path connectors, and compressed air pipe connectors, the coupler allowing the adjacent panel housings of the photovoltaic panels to swing mechanically between each other at least vertically;

controlling to switch to the other photovoltaic panels via some or all of the power path connectors, signal line connectors, and compressed air pipe connectors that are unused to form a bypass route in the event of a fault in its own photovoltaic panel or in an adjacent photovoltaic panel;

absorbing unexpected shocks to prevent the photovoltaic panels from riding up due to fluctuations in the sea surface by placing elastic shock-absorbing members at some or all of the apexes of the photovoltaic panels in plan view;

measuring a current position and orientation of each floating offshore photovoltaic power generation plant;

propelling and steering each floating offshore photovoltaic power generation plant to keep the plant stationary at a predetermined location, and to allow the plant to maintain a predetermined orientation or direction;

keeping each floating offshore photovoltaic power generation plant stationary at a predetermined position, and orientation or direction, using the propulsion and steering function at night or when diving;

mooring each floating offshore photovoltaic power generation plant to keep the plant stationary at a predetermined position;

assigning elements of each plant a logical address for TCP/IP-based packet communication to exchange information through secure communication with a verification code attached, the code allowing a receiving end to verify at least the authenticity of a packet transmission source and the integrity of transmitted content;

generating compressed air for pouring water into the panel housing and draining water from the panel housing, the pouring water allowing each floating offshore photovoltaic power generation plant to dive to the predetermined diving depth, and supplying the compressed air to a compressed air tank of the other photovoltaic panels via a compressed air pipe and the compressed air pipe connector; or installing a floating lighthouse around the floating offshore photovoltaic power generation plant to make known the presence of the plant using some or all of lights, radio waves, or sound waves.

* * * * *